(12) United States Patent
Liu et al.

(10) Patent No.: US 7,052,532 B1
(45) Date of Patent: May 30, 2006

(54) HIGH TEMPERATURE NANOFILTER, SYSTEM AND METHOD

(75) Inventors: Z. Gerald Liu, Madison, WI (US); Matthew P. Henrichsen, Evansville, WI (US); William C. Haberkamp, Cookeville, TN (US); Elaine M. Yorkgitis, St. Paul, MN (US); Robert K. Miller, Indianapolis, IN (US); Thomas E. Wood, Stillwater, MN (US); Zhongshu Tan, St. Paul, MN (US); Barry M. Verdegan, Stoughton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 124 days.

(21) Appl. No.: 10/325,001

(22) Filed: Dec. 20, 2002

Related U.S. Application Data

(63) Continuation-in-part of application No. 09/935,847, filed on Aug. 23, 2001, now Pat. No. 6,582,490, which is a continuation-in-part of application No. 09/573,747, filed on May 18, 2000, now Pat. No. 6,444,006, and a continuation-in-part of application No. 10/075,035, filed on Feb. 12, 2002, and a continuation-in-part of application No. PCT/US02/02133, filed on Jan. 25, 2002, which is a continuation-in-part of application No. 09/522,152, filed on Mar. 9, 2000, now Pat. No. 6,669,913, and a continuation-in-part of application No. 09/851,300, filed on May 8, 2001, now Pat. No. 6,776,814.

(60) Provisional application No. 60/303,563, filed on Jul. 6, 2001.

(51) Int. Cl.
*B01D 29/07* (2006.01)

(52) U.S. Cl. ............................ 96/154; 55/520; 55/521; 55/523; 55/524; 55/527; 55/DIG. 5; 977/DIG. 1

(58) Field of Classification Search .................. 96/154; 55/520, 521, 524, 527, DIG. 5, 523; 977/DIG. 1
See application file for complete search history.

(56) References Cited

U.S. PATENT DOCUMENTS

| 1,893,372 A | 1/1933 | Krzanowsky | 422/173 |
| 1,924,472 A | 8/1933 | Thomson | 156/150 |

(Continued)

FOREIGN PATENT DOCUMENTS

| GB | 563768 | 1/1943 |

(Continued)

OTHER PUBLICATIONS

"A New 'Incipient-Wetness' Method for the Synthesis of Chemically Stablized β-Cristobalite", Alcala, M.D., C. Real, and J.M. Criado, J. Am. Ceram. Soc., 79[6] 1681-84 (1996).

(Continued)

*Primary Examiner*—Richard L. Chiesa
(74) *Attorney, Agent, or Firm*—Harold C. Knecht III

(57) ABSTRACT

A filter, system and method is provided for filtering nanoparticles in a hot gas, namely particles <about 1 micron in a gas >about 200° C. and further particularly >about 450° C. including diesel exhaust. The filter includes filter media material composed of fibrous filter media having a plurality of fibers and granular filter media having a plurality of granules extending from the surfaces of the fibers. The filter is characterized by a permeability >about $3 \times 10^{-12}$ m$^2$ and an inertial resistance coefficient <about $1 \times 10^6$ m$^{-1}$. The filter captures particles in the Most Penetrating Region (MPR). A filter system includes a nanoparticle filter in series with a diesel exhaust treatment element.

25 Claims, 28 Drawing Sheets

U.S. PATENT DOCUMENTS

| | | | |
|---|---|---|---|
| 2,410,371 A | 10/1946 | Vokes | 55/500 |
| 2,553,054 A | 5/1951 | Lincoln et al. | 156/197 |
| 2,973,828 A * | 3/1961 | Engle | 96/118 |
| 3,025,964 A | 3/1962 | Summers et al. | 55/500 |
| 3,112,184 A | 11/1963 | Hollenbach | 156/89.22 |
| 3,308,853 A | 3/1967 | O'Brien | 138/177 |
| 3,441,381 A | 4/1969 | Keith et al. | 422/179 |
| 3,445,252 A | 5/1969 | MacDowell | 501/4 |
| 3,664,095 A * | 5/1972 | Asker et al. | 96/154 |
| 3,692,184 A | 9/1972 | Miller, Jr. et al. | 55/449 |
| 3,708,957 A | 1/1973 | Labadie | 95/277 |
| 3,799,354 A | 3/1974 | Buckman et al. | 55/498 |
| 3,800,515 A * | 4/1974 | Asker et al. | 96/154 |
| 3,844,749 A | 10/1974 | Carter, Sr. | 55/358 |
| 3,899,555 A | 8/1975 | Takao et al. | 156/89.22 |
| 3,966,646 A | 6/1976 | Noakes et al. | 502/439 |
| 4,017,347 A | 4/1977 | Cleveland | 156/89.27 |
| 4,028,252 A | 6/1977 | Morris | 210/321.77 |
| 4,056,375 A | 11/1977 | Ringel et al. | 96/381 |
| 4,073,655 A | 2/1978 | Li | 501/4 |
| 4,130,487 A | 12/1978 | Hunter et al. | 96/131 |
| 4,157,902 A | 6/1979 | Tokar | 55/327 |
| 4,276,071 A | 6/1981 | Outland | 55/523 |
| 4,398,931 A | 8/1983 | Shevlin | 55/341.1 |
| 4,410,427 A | 10/1983 | Wydeven | 210/317 |
| 4,419,108 A | 12/1983 | Frost et al. | 422/180 |
| 4,430,223 A | 2/1984 | Miyakawa et al. | 55/498 |
| 4,441,899 A | 4/1984 | Takagai et al. | 55/485 |
| 4,455,823 A | 6/1984 | Bly et al. | 96/405 |
| 4,485,621 A | 12/1984 | Wong et al. | 60/274 |
| 4,498,989 A | 2/1985 | Miyakawa et al. | 55/492 |
| 4,510,193 A * | 4/1985 | Blucher et al. | 428/196 |
| 4,512,147 A | 4/1985 | Wong | 60/274 |
| 4,548,626 A | 10/1985 | Ackley et al. | 96/139 |
| 4,589,983 A | 5/1986 | Wydevan | 55/498 |
| 4,608,361 A | 8/1986 | Kanamori et al. | 502/232 |
| 4,619,675 A | 10/1986 | Watanabe | 55/498 |
| 4,652,286 A | 3/1987 | Kusuda et al. | 235/377 |
| 4,712,643 A | 12/1987 | Iles et al. | 181/231 |
| 4,718,926 A | 1/1988 | Nakamoto et al. | 55/523 |
| 4,818,729 A | 4/1989 | Perrotta et al. | 501/4 |
| RE33,118 E | 11/1989 | Scheitlin et al. | 60/299 |
| 4,878,929 A | 11/1989 | Tofsland et al. | 55/486 |
| 4,902,487 A | 2/1990 | Cooper et al. | 422/215.5 |
| 4,925,561 A | 5/1990 | Ishii et al. | 55/499 |
| 4,960,449 A | 10/1990 | Yonushonis | 55/523 |
| 5,008,086 A | 4/1991 | Merry | 422/180 |
| 5,014,509 A | 5/1991 | Broering et al. | 60/274 |
| 5,015,376 A | 5/1991 | Picek | 55/381 |
| 5,030,263 A | 7/1991 | Kemp | 55/477 |
| 5,035,236 A | 7/1991 | Kanegaonkar | 55/498 |
| 5,042,249 A | 8/1991 | Erdmannsdoerfer | 60/299 |
| 5,052,178 A | 10/1991 | Clerc et al. | 60/274 |
| 5,063,736 A | 11/1991 | Hough et al. | 60/286 |
| 5,075,160 A | 12/1991 | Stinton et al. | 428/282 |
| 5,082,479 A | 1/1992 | Miller | 55/379 |
| 5,106,397 A | 4/1992 | Jaroszczyk et al. | 96/388 |
| 5,137,696 A | 8/1992 | Hitachi et al. | 422/180 |
| 5,174,895 A | 12/1992 | Drori | 96/233 |
| 5,194,078 A | 3/1993 | Yonemura et al. | 55/466 |
| 5,196,120 A | 3/1993 | White | 210/504 |
| 5,196,170 A | 3/1993 | Patashnick et al. | 422/83 |
| 5,207,807 A | 5/1993 | Manfre et al. | 55/282.1 |
| 5,250,476 A | 10/1993 | Mogensen et al. | 501/94 |
| 5,252,299 A | 10/1993 | Retallick | 422/174 |
| D342,990 S | 1/1994 | Jaroszczyk | D23/365 |
| 5,298,046 A | 3/1994 | Peisert | 55/486 |
| 5,304,351 A | 4/1994 | Tanaka et al. | 422/180 |
| 5,322,537 A | 6/1994 | Nakamura et al. | 55/523 |
| 5,328,758 A * | 7/1994 | Markell et al. | 442/351 |
| 5,346,675 A | 9/1994 | Usui et al. | 422/180 |
| 5,376,218 A | 12/1994 | Mito et al. | 156/474 |
| 5,380,501 A | 1/1995 | Hitachi et al. | 422/180 |
| 5,385,873 A | 1/1995 | MacNeill | 501/95.1 |
| 5,395,428 A * | 3/1995 | von Blucher et al. | 95/104 |
| 5,456,069 A | 10/1995 | Haerle | 55/498 |
| 5,468,384 A | 11/1995 | Garcera et al. | 55/523 |
| 5,480,621 A | 1/1996 | Breuer et al. | 422/174 |
| 5,486,410 A * | 1/1996 | Groeger et al. | 442/353 |
| 5,505,769 A * | 4/1996 | Dinnage et al. | 96/153 |
| 5,546,069 A | 8/1996 | Holden et al. | 340/407.1 |
| 5,549,722 A | 8/1996 | Zemaitis et al. | 55/463 |
| 5,562,825 A | 10/1996 | Yamada et al. | 55/498 |
| 5,567,536 A | 10/1996 | Lintz et al. | 428/688 |
| 5,611,832 A | 3/1997 | Suzuki et al. | 55/523 |
| 5,632,792 A | 5/1997 | Haggard | 55/497 |
| 5,662,728 A * | 9/1997 | Groeger | 96/153 |
| 5,682,740 A * | 11/1997 | Kawamura | 60/297 |
| 5,772,883 A | 6/1998 | Rothman et al. | 55/500 |
| 5,792,247 A | 8/1998 | Gillingham et al. | 96/386 |
| 5,820,646 A | 10/1998 | Gillingham et al. | 55/488 |
| 5,846,276 A | 12/1998 | Nagai et al. | 55/523 |
| 5,846,641 A | 12/1998 | Abeles et al. | 428/312.8 |
| 5,863,311 A | 1/1999 | Nagai et al. | 55/483 |
| 5,876,537 A | 3/1999 | Hill et al. | 156/89.11 |
| 5,876,637 A | 3/1999 | Martin | 252/584 |
| 5,891,402 A | 4/1999 | Sassa et al. | 422/171 |
| 5,895,574 A | 4/1999 | Friedmann et al. | 210/443 |
| 5,902,364 A | 5/1999 | Tokar et al. | 55/498 |
| 5,908,480 A | 6/1999 | Ban et al. | 60/311 |
| 5,925,561 A | 7/1999 | Posselius, Jr. et al. | 435/286.1 |
| 5,961,931 A | 10/1999 | Ban et al. | 422/171 |
| 6,093,378 A | 7/2000 | Deeba et al. | 423/213.5 |
| 6,099,901 A * | 8/2000 | Cronia et al. | 427/244 |
| 6,101,793 A | 8/2000 | Nagai et al. | 55/523 |
| 6,146,451 A * | 11/2000 | Sakata et al. | 96/135 |
| 6,238,561 B1 | 5/2001 | Liu et al. | 210/493.4 |
| 6,245,301 B1 | 6/2001 | Stroom et al. | 422/179 |
| 6,294,141 B1 | 9/2001 | Twigg et al. | 423/213.7 |
| 6,413,303 B1 * | 7/2002 | Gelderland et al. | 96/135 |
| 6,444,006 B1 | 9/2002 | Haberkamp et al. | 55/521 |
| 6,582,490 B1 * | 6/2003 | Miller et al. | 55/520 |
| 6,669,913 B1 * | 12/2003 | Haberkamp | 422/180 |
| 2001/0027645 A1 | 10/2001 | Itoh et al. | 60/288 |
| 2001/0027646 A1 | 10/2001 | Itoh et al. | 60/297 |
| 2001/0027647 A1 | 10/2001 | Itoh et al. | 60/297 |
| 2002/0090324 A1 | 7/2002 | Badeau et al. | 422/171 |

FOREIGN PATENT DOCUMENTS

| | | | |
|---|---|---|---|
| JP | 2-79024 | 3/1990 | |
| JP | 4-161213 | * 6/1992 | 96/154 |
| JP | 9-125931 | 5/1997 | |
| JP | 2-53442 | 2/1999 | |
| JP | 2001-200715 | 7/2001 | |
| JP | 2001-342818 | 12/2001 | |
| WO | 88/03431 | 5/1988 | |

OTHER PUBLICATIONS

ASTM D737-97 "Standard Test Method for Air Permeability of Textile Fabrics", ASTM International, pp. 1-5 (Apr. 24, 2003).

"Attenuation of Perfluoropolymer Fume Pulmonary Toxicity: Effect of Filters, Combustion Method and Aerosol Age", D. Warheit, W. Seidel, M. Carakostas and M. Hartsky, Pulmonary Toxicity of Perfluropolymer Fumes, Academic Press, pp. 309-329, 1990.

"Diesel Particulate Trap of Corrugated Honeycomb Fabricated with Mullite Fiber Ceramics", Toshihiro Mihara et al., Central Research Library, Matsushita Electric Industrial Co., Ltd. No. 860010, pp. 31-39, undated.

"Filtration of Aerosols", C.N. Davies, Journal of Aerosol Science, vol. 14, No. 2, pp. 147-161, 1983.

Kirk-Othmer Encyclopedia of Chemical Technology, 4th Edition, vol. 6, John Wiley and Sons, New York, NY, p. 405 (1993).

"Characterization of Chemically Stabilized β-cristobalite Synthesized by Solution-Polymerization Route", Lee, Sang-Jin, Korean J. Ceramics, 3[2] 116-123 (1997).

"Monolithic Metal Oxide Thin-Wall Substrates with Closed and Open Cells: Optimal Designs by Theoretical Modeling and Experiment", Eugene Shustorovich, Victor Shustorovich, Konstantin Solntsev, SAE 2001 World Congress, Mar. 5-8, 2001.

"Critical Size Effect for Chemically doped β-cristobalite Transformation", Lee, S.J. and C.H. Lee, Materials Letters, 45, 175-179 (Sep. 2000).

"Numerical Investigation of Particle Filtration Process in Fibrous Filters", Z.G. Liu Ph.D. Thesis, University of Wisconsin-Madison, 1993.

"Chemical Stablization of β-Cristobalite", Perrotta, A.J., D.K. Grubbs, E.S. Martin, N.R. Dando, H.A. McKinstry, and C.Y. Huang, J. Am. Ceram. Soc., 72[3] 441-447 (1989).

"Test Equipment and Methods at The 3M Company Diesel Filter Products Laboratory", SAE Paper 950516, Nathan R. Bruner, pp. 1-12 (1995).

"Measuring the Fractional Efficiency of Diesel Particulate Filters", SAE Technical Paper 2002-010-1007, Z.G. Liu, B.M. Verdegan, K.M.A. Badeau and T.P. Sonsalla, pp. 1-9 (Mar. 2002).

"Synthesis of Chemically Stabilized Cristobalite", Saltzberg, M.A., S.L. Bors, H. Bergna and S.C. Winchester, J. Am. Ceram. Soc., 75[1] 89-95 (1992).

"Further Investigation of the Stabilization of β-Cristobalite", Thomas, E.S., J.G. Thompson, R.L. Withers, M. Sterns, Y. Xiao and R.J. Kirkpatrick, J. Am. Ceram. Soc., 77[1] 49-56 (1994).

"Filtration Mechanisms", L. Ph.D. Thesis, 1993, pp. 13-26. Design, Development and Performance of a Composite Diesel Particulate Filter, Robert K. Miller et al., SAE Technical Paper Series 2002-01-0323, SAE 2002 World Congress, Mar. 4-7, 2002, pp. 1-16.

* cited by examiner

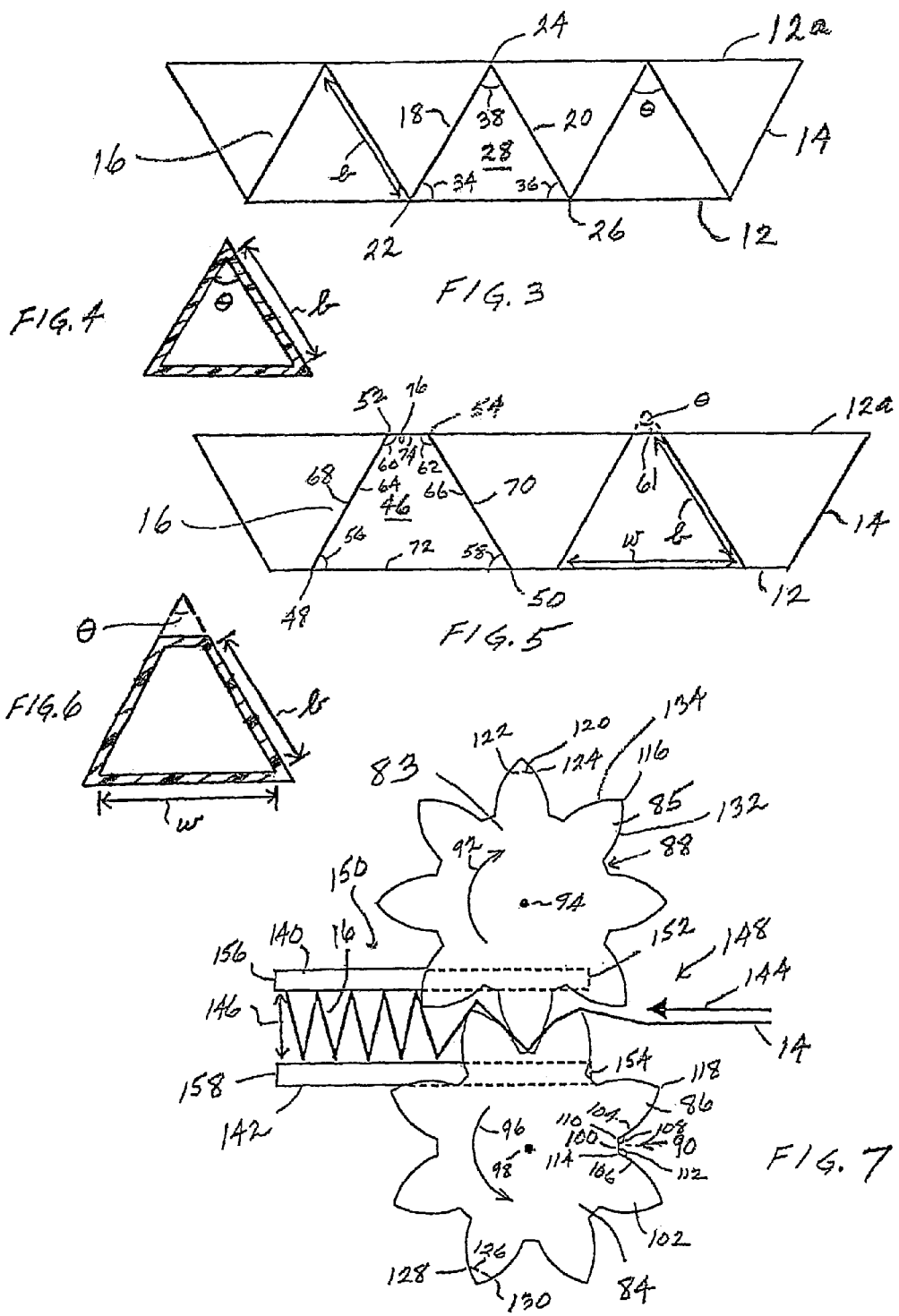

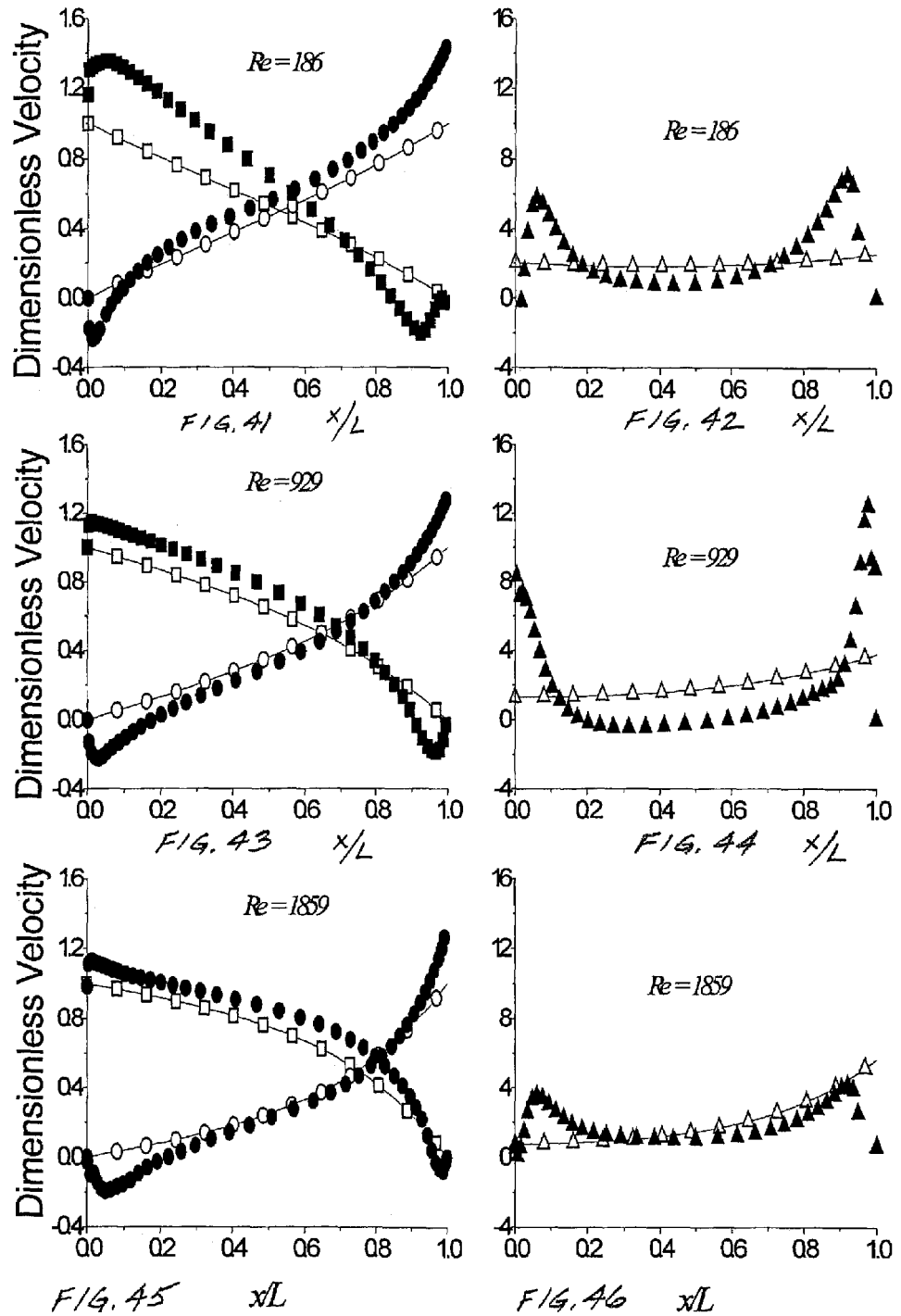

HIGH TEMPERATURE NANOFILTER, SYSTEM AND METHOD

CROSS REFERENCE TO RELATED APPLICATIONS

This application is a continuation-in-part of U.S. patent application Ser. No. 09/935,847, filed Aug. 23, 2001, now U.S. Pat. No. 6,585,490, which is a continuation-in-part of U.S. patent application Ser. No. 09/573,747, filed May 18, 2000, now U.S. Pat. No. 6,444,006, and a continuation-in-part of International Patent Application No. PCT/US02/2133, filed Jan. 25, 2002, claiming priority from provisional U.S. Patent Application No. 60/303,563, filed Jul. 6, 2001, and a continuation-in-part of U.S. patent application Ser. No. 10/075,035, filed Feb. 12, 2002, which is a continuation-in-part of U.S. patent application Ser. No. 09/522,152, filed Mar. 9, 2000, now U.S. Pat. No. 6,669,913 and a continuation-in-part of U.S. patent application Ser. No. 09/851,300, filed May 8, 2001, now U.S. Pat. No. 6,776,814 all incorporated herein by reference and from which priority is claimed.

FIELD, BACKGROUND AND SUMMARY

The invention relates to high temperature filters, including diesel exhaust filters.

Section I—U.S. Pat. No. 6,582,490

The invention arose during continuing development efforts relating to the subject matter of U.S. patent application Ser. No. 09/935,847, filed Aug. 23, 2001, now U.S. Pat. No. 6,582,490, the subject matter of which is incorporated herein by reference (hereinafter the '490 patent/invention). The application '490 patent is a continuation-in- part of U.S. patent application Ser. No. 09/573,747, filed May 18, 2000, now U.S. Pat. No. 6,444,006, the subject matter of which is incorporated herein by reference (hereinafter the '006 patent/invention).

The noted '006 patent relates to a high temperature, composite ceramic filter having particular use as a diesel engine exhaust filter, and to a method of forming the same.

As regulatory agencies have recently mandated the reduction of particulate emissions in diesel engines, there has been increased activity in the development of exhaust gas filters for diesel engines. A typical exhaust filter will trap the particulate material contained in the exhaust stream, and to prevent clogging of the filter and the resultant increase of load on the engine due to increased back pressure, the particulate material is then burned from the filter.

As a diesel engine exhaust filter must have high temperature resistance and durability, it has been proposed to utilize ceramic materials as the filter media. For example, a ceramic filter for use in gas turbine engines is described in U.S. Pat. No. 4,017,347. In this patent, a ceramic tape or sheet is prepared from a slurry containing ceramic particles and a two-resin binder system composed of a thermoplastic resin and a thermosetting resin. The tape is formed into a filter structure and the structure is then fired to sinter the ceramic particles and burn out the organic constituents, thus producing a sintered ceramic cellular structure.

U.S. Pat. No. 5,322,537 discloses an exhaust gas filter for diesel engines composed of ceramic fibers, such as alumina-silicate fibers, and an inorganic binder having a softening temperature lower than that of the ceramic fiber.

U.S. Pat. No. 4,652,286 also describes a ceramic exhaust filter for diesel engines having a corrugated or honeycomb structure made of sheets consisting of ceramic fibers and a fire clay binder.

A variety of structures are used to control diesel exhaust emissions, including extruded monolithic structures and corrugated spiral structures. These suffer a variety of shortcomings, depending on the specific design, including high thermal mass, high restriction, low capacity, and poor durability. Diesel emission control filters (DECF) including diesel particulate filters (DPF), diesel oxidation catalyst (DOC), and other types of flow-through and wall-flow filters, typically use a cylindrical geometry with flow in an axial direction through channels, also oriented axially. To create the axial channels, the diesel emission control filter element may be an extruded honeycomb monolith, or a spiral wound structure of alternating layers of corrugated and flat filter media, or a spiral wound structure of alternating layers of pleated and flat filter media. The '006 invention provides improvements in the latter type.

The '006 invention is directed to a high temperature composite ceramic filter having particular use as a diesel engine exhaust filter, and to a method of making the same.

In carrying out the '006 invention, an aqueous slurry is initially produced containing random length ceramic fibers, organic fibers and a water soluble thermo- plastic binder. The ceramic fibers, such as alumina, have high temperature resistance, being stable to temperatures above 1000° C. The organic fibers can take the form of natural or synthetic materials.

The slurry is formed into a paper-like sheet by conventional papermaking techniques, and the sheet is subsequently dried to evaporate the water and provide a dry flexible sheet.

The sheet is then formed into a green three-dimensional article suitable for filtering. Preferably, the final shape is that of a spirally wound, honeycomb element, composed of flat and corrugated layers, with a colloidal solution of a ceramic material used as an adhesive to join the sheets together along contiguous areas. Opposite ends of alternate channels within the honeycomb structure are sealed by a high temperature cement.

As a feature of the '006 invention, the green filter structure is coated with an intermediate binder to increase its temperature stability. In one form of the '006 invention, the intermediate binder consists of a solvent solution of an uncured thermosetting resin, such as a phenol-formaldehyde resin. The coated part is then air dried and heated to a temperature generally in the range of about 150° C. to 250° C. to cross-link the resin and rigidify the structure. The structure is then pyrolyzed at a temperature generally in the range of 900° C. to 1000° C. in an inert or non-oxidizing atmosphere to convert the organic constituents, i.e. the organic fibers and thermoplastic binder, to carbon char. Firing the structure in the inert atmosphere eliminates gassing of the organic constituents and yields a part suitable for final binder application.

A final coating of silicon carbide is then applied to the filter structure using a conventional chemical vapor deposition process. The silicon carbide coats the haphazardly arranged ceramic fibers, as well as the junctions or intersections between the fibers. The resulting structure is a composite of ceramic fibers, inorganic binders and carbon char, coated with silicon carbide.

In a modified form of the '006 invention, the green filter structure is coated with an aqueous colloidal solution of an inorganic material, such as alumina or alumina-silicate binders. The part is then air dried, heated to a temperature of about 200° C. to 300° C. to remove solvents and dehydrate the colloidal material and then fired at a temperature of 900° C. to 1100° C. in air to remove the organic components. Following this, the final coating of silicon carbide is applied using the chemical vapor deposition process.

The silicon carbide coating thickness is controlled to a level of about 0.5 to 1.5 microns, so that the porosity of the filter structure is not adversely affected and is maintained at a value of 80% void or greater. Because of the silicon carbide coating, the resulting composite filter has improved mechanical strength, 6,000 kPa or greater having been shown, which is 50–100% higher than can be achieved by bonding or sintering the fibers alone. Additionally, there is no significant degradation or loss of pores within the structure so that resistance to gas flow is minimal.

With the method of the '006 invention, a green state part is produced with a production capable process and the geometry of this part is maintained throughout conversion to a high temperature ceramic composite, and this geometry will be retained at the elevated temperatures of about 650° C. to 700° C. needed to regenerate a contaminated filter.

The invention of U.S. Pat. No. 6,582,490 arose during continuing development efforts relating to the noted '006 invention. The '490 patent provides a green uncured pre-form for subsequent manufacture, e.g. by curing and rigidization, into an exhaust aftertreatment filter suitable preferably for use to control diesel exhaust emissions, for example diesel particulates, nitrous oxide ($NO_x$), carbon monoxide (CO), and/or other hydrocarbon emissions. The pre-form is preferably a cylindrical, porous, ceramic structure with alternating layers of flat and pleated fibrous media. It is formed by rolling together a pleated layer of media bound to a flat layer using a suitable adhesive which facilitates fabrication and handling and ensures structural integrity of the finished filter. The channels formed by the intersection of the rolled pleated and flat layers run in an axial direction to the cylindrical structure of the pre-form along its length. Lower restriction and greater structural strength is provided, including crush strength which is desirable for packaging and sleeving the element in the finished product. Particular geometries have been found to improve performance.

The walls of the pre-form have a porosity greater than 80% and are made from fibrous filter media. In its green uncured state, the media with both pleated and flat layers contains greater than 80% by weight of fibers with suitable thermal and chemical resistance for exhaust gas temperatures and conditions, including alumina, alumina-silica, and silicon carbide. The media contains less than 20% of fugitive and other materials and fibers, as well as intermediate binders to facilitate processing by imparting wet strength, increasing tear and cut resistance, and increasing flexibility and pliability of the media during manufacturing. These fugitive and other materials may include, inter alia: synthetic fibers, microfibers and/or pulps, such as KEVLAR®, cellulose, acrylic, acetate, polypropylene, polyester, and nylon; organic emulsion polymer resins such as acrylic, vinyl chloride, nitrite, polyvinyl acetate, or thermosetting materials, like phenolic or epoxy; inorganic glass microfibers, that are primarily $SiO_2$; miscellaneous chemicals, such as acid, alum, etc. to control pH and aid dispersion; colloidal cellulose, including carboxy methyl cellulose; and inorganic particles or colloidal material, such as alumina, alumina-silica, silicon carbide, rare earth and/or mixed metal oxides. Some of these materials may incinerate or change their physical form during curing to increase the porosity of the final filter product. The media thickness is less than 0.8 mm (millimeters), and, ideally should be 0.5 mm or less, in order to reduce restriction. Together, the high porosity and thin walls of the media reduce the thermal mass of the product making it easier to heat and regenerate the filter, relative to extruded monolithic structures.

When the pre-form is processed into a diesel particulate filter, it works in a wall-flow mode with alternating ends of the channels plugged in order to force the flow of exhaust gases through the porous walls of the filter. The plugging material must adhere to the media, plug the ends of the channels, and be able to survive exhaust conditions. Typically, a suspension with properties compatible with the filter media and containing metal oxides with or without silicon carbide is used. When used as a substrate for a catalyst for the removal of $NO_x$, CO and/or hydrocarbon emissions, the ends are not plugged and the porous wall structure of the pre-form increases the surface area available for the chemical reactions.

The '490 patent further provides forming apparatus for the above noted pre-form and methods of configuring and shaping same.

Due to the geometry of diesel emission control filters and the properties of the media, an alternative to conventional pleating and corrugation methods is needed to optimize the noted characteristics of the diesel emission control filter. In preferred form, specifically, it is desirable that the diesel emission control filter use pleated media with either triangular or trapezoidal cross-sections, rather than corrugated media with a sinusoidal shaped cross-section. The difference is significant for greater strength, stability, and structural integrity. This is particularly desirable in the '490 exhaust aftertreatment filter because force is typically applied in a radial direction to seal and hold the filter element in place. The pleat height is less than 10 mm, and preferably less than 6 mm.

Conventional methods, including score-roll pleating and corrugation, cannot produce media with the noted desired geometry and structure. Pleating is commonly done by score-rolling, wherein the media passes between two rollers with male and female spikes and slots that score the media. The media then passes through downstream gathering wheels that feed the media against an opposing force. The inherent stiffness of the media causes the media to fold or crease into pleats along the score lines. For this reason, score-roll pleating is unsuitable for pliable media with insufficient stiffness, such as the ceramic media used in the above noted diesel emission control filter. Another limitation is that the desired small pleat heights, e.g. less than 10 mm, cannot be obtained by the noted score-roll pleating method. Furthermore, creasing along the noted score lines can damage the media pleat tips for some types of filter media, including that used for the noted diesel emission control filter.

Another possibility is to use corrugation for producing a diesel emission control filter. In this method, corrugated rollers are used to imprint a shape onto the media, instead of creasing and folding the media as is done with other pleating methods. The limitation of the noted corrugation method is that the pleats have a sinusoidal cross-section, rather than triangular or trapezoidal. As above noted, triangular or trapezoidal flutes or channels are desired, with cross-sectional geometries which are more structurally stable and provide for more laminar flow.

In one aspect of the '490 patent, a star gear pleating method is used to produce the pleated media pre-form for a diesel engine control filter. Particularly designed interlocking gears pass the media between one or more sharp tips of a gear tooth on one gear and a particularly formed root of the opposing gear. The teeth can be modified to provide triangular or trapezoidal pleats. The gears fold and gather the media without crushing it and without adversely affecting the performance of the final filter product. As the media is released from the interlocking gears, it is directed forward and out of the gears by guide bars which prevent the media from tending to follow the gears and become damaged. The '490 method does not rely on media stiffness to fold and crease the media, and hence it can be used on more pliable media without damage to the pleat tips. The media is partially gathered and folded between the interlocking teeth of the gears, which partial gathering helps prevent unwanted jams or reverse pleating otherwise common with score-roll pleating. The '490 method and forming apparatus allows much shorter pleat heights and faster pleating without damaging the media or breaking the fibers. In contrast to corrugation, the '490 technique produces straight sided triangular or trapezoidal pleats. The '490 technique further eliminates the need to use extruded ceramic monoliths for diesel emission control filters.

Section II—International Patent Application No. PCT/US02/21333

The invention also arose during continuing development efforts relating to the subject matter of International Patent Application No. PCT/US02/2133, filed Jul. 3, 2002, claiming priority from Provisional U.S. Patent Application No. 60/303,563, filed Jul. 6, 2001, both incorporated herein by reference (hereinafter the '333 application/invention).

The '333 application relates to inorganic fiber substrates for use in an exhaust system, in particular, to such exhaust system substrates that include a wall-flow substrate and/or a flow-through substrate, more particularly, to such substrates useful for filtering, regenerating and/or reducing the emissions from an exhaust system and, even more particularly, to such substrates for use in the exhaust system of an internal combustion engine. The '333 invention also relates to devices incorporating such substrates and methods of making such substrates.

Internal combustion engines (e.g., vehicle engines, power generators, etc.), power plants, incinerators and other such combustion devices typically include exhaust systems which expel the products of a combustion process. Such exhaust systems typically include some form of flow-through catalyzing substrate and/or wall-flow filter substrate. These combustion products can include non-combusted and/or partially combusted byproducts such as, for example, soot particles, carbon monoxide, $NO_x$, etc. Exhaust systems are typically designed so as to limit the release of such combustion byproducts into the atmosphere.

Particulate soot combustion byproducts have been found to pose health hazards to humans and the environment. As a result, the exhaust of such soot particles has received particular attention. In response to such concerns, increasingly strict governmental regulations have been and are being promulgated to restrict and reduce the exhaust emissions from sources such as internal combustion engines and, in particular, diesel engines. Therefore, additional attention has been directed toward the development of more efficient exhaust systems capable of further restricting and reducing the release of such combustion byproducts and, in particular, of filtering particulate laden exhaust gases.

A number of combustion devices (e.g., diesel engines) produce both undesirable gaseous (e.g., carbon monoxide) and particulate (e.g., soot) combustion byproducts. The exhaust systems of such engines are usually designed with a catalytic and a filter component for limiting the exhaust of both types of combustion byproducts. Catalytic converters typically include a flow-through catalyzing substrate that has a ceramic monolithic construction. Conventional flow-through catalyzing substrates are usually effective in furthering the combustion of exhaust gases (e.g., carbon monoxide to carbon dioxide); however, they are also relatively expensive and are not effective in combusting exhaust particulate. There are various commercially available wall-flow substrates for filtering particulate from exhaust gases. Such filter substrates include porous ceramic monoliths like that disclosed, for example, in U.S. Pat. No. 4,276,071. Such extruded substrates have been made from porous materials such as cordierite or silicon carbide. These extruded ceramic filters can be durable and effective, but they are also relatively expensive. Less expensive ceramic fiber-based particulate filters have also been made for this purpose but, to date, such filters have not exhibited the characteristics (e.g., durability and effectiveness) needed to achieve commercial success. See, for example, U.S. Pat. Nos. 3,112,184, 3,899,555, 4,608,361, 4,652,286, 4,718,926, 5,194,078 and 5,322,537. It is believed that the failure of such prior ceramic fiber-based filters to achieve commercial success has been due to a lack of durability in their intended working environment.

Therefore, there is a need for relatively inexpensive and durable fiber-based substrates for exhaust systems that can be used as wall-flow substrates, flow-through substrates or both. The '333 invention satisfies this need.

In one aspect of the '333 invention, a method is provided for rigidifying a fiber-based paper suitable for use in an exhaust system of a combustion device (e.g., a diesel engine). In the method, a green ceramic fiber-based paper is impregnated with a first impregnating dispersion. The impregnated paper is then dried, calcined and fired to form a rigidified paper. This rigidification process is performed at least once and, preferably, two or more times. The green ceramic fiber-based paper comprises refractory ceramic fibers and an organic material. The organic material includes one or more organic binders and, optionally, it can be desirable to include organic fibers. The organic material, at least in part, provides the green paper with the strength and flexibility it needs to be handled and formed into a green substrate. The green paper being processed according to this method can be in the form of a green substrate designed so as to be useful, for example, as at least one of a wall-flow or flow-through substrate.

The first impregnating dispersion comprises an inorganic binder material and a penetrating agent. The inorganic binder material comprises a ceramic component. The ceramic component comprises a ceramic precursor material, a ceramic material or a combination thereof. The penetrating agent comprises an organic molecule or polymer. The penetrating agent sufficiently reduces the interfacial energy between the impregnating dispersion and the surfaces of the green substrate (i.e., the surfaces formed by the fibers and binder materials) to allow the impregnating dispersion to wet and be absorbed into the green paper, without significant flocculation or particle separation (e.g., phase separation) of the ceramic component in the impregnating dispersion. After the impregnated paper is dried and the dried paper calcined, the calcined paper is fired so as to at least partially burn the organic material and cause at least part of the ceramic component of the impregnating dispersion to bond together and to the refractory ceramic fibers of the paper. The bonding together of the ceramic component and the bonding of the ceramic component to the refractory ceramic fibers causes the fibers to be bound together and form a rigidified paper suitable for use in an exhaust system of a combustion device. When the paper is in the form of the substrate, the resulting rigidified substrate is suitable for use in an exhaust system of a combustion device.

After the firing, the refractory ceramic fibers, preferably, have a discontinuous coating (e.g., agglomerates) of the fired ceramic component that bonds the refractory ceramic fibers together at spaced locations along and at intersections of the refractory ceramic fibers such that the ceramic fibers retain much of their original flexibility while in the paper. The degree to which such bound fiber intersections are present in the paper can be varied by controlling the rigidification process and will likely depend on the degree to which the refractory ceramic fibers need to retain their original flexibility per the requirements of the particular paper or paper substrate. Therefore, some degree of continuity of the fired ceramic component coating could be acceptable.

The organic material can be burned-off in two or more firing stages (i.e., two or more rigidification processes), rather than all at once during the initial firing (i.e., the first rigidification process). Though, it is preferred for the organic material to be substantially or completely burned off during the initial firing. As used herein, the term "substantially burned" refers to almost all of the organic material being burned or combusted. The drying, calcining and firing can all be performed by the same heat source (e.g., an oven, furnace, etc.). The drying, calcining and firing can also be accomplished using one heating cycle, as well as multiple heating cycles. It is desirable to perform each of these steps at different temperatures (e.g., the drying at a lower temperature, the calcining at a middle temperature and the firing at a higher temperature).

It is desirable for at least part, and preferably most or all, of the ceramic component of the impregnating dispersion to have a charge that is opposite to the charge of at least part, and preferably most or all, of the refractory ceramic fibers so that the oppositely charged ceramic component and refractory ceramic fibers are attracted to one another. Such a difference in charge can promote adsorption of the ceramic component (e.g., nano-clay particles) onto the refractory ceramic fibers. This attraction can be accomplished by adjusting the pH of the impregnating dispersion. The impregnating dispersion can further comprise strengthening particles that have a charge (e.g., surface charge) that is the same as the charge of the refractory ceramic fibers or the ceramic component. The charge of such strengthening particles can also be converted to another charge, as desired. It can also be desirable for the impregnating dispersion to comprise different types of impregnating particles and for the charge on one or more of the different types of impregnating particles to be converted so as to effect attraction between impregnating particles that would otherwise not be attractive to one another.

It can be desirable for a coagulating agent to be included in the green paper (e.g., by being included in the slurry used to make the green paper) when the organic material comprises an organic binder material such as, for example, a latex. The coagulating agent coagulates at least the organic binder materials and causes attachment of at least the organic binder material to at least the ceramic fibers and, preferably, to organic fibers that may be in the paper.

During the impregnating of the green or rigidified paper or paper substrate, it can be desirable for surfaces of the paper or paper substrate to be exposed (e.g., dipped, sprayed, etc.) to the impregnating dispersion at a rate that is at least as fast as the rate at which the impregnating dispersion wicks into and through the paper, in order to avoid or at least minimize the physical separation of the impregnating dispersion components during the impregnation. During impregnation, it can be preferable for the rate at which the surfaces of the paper or paper substrate are exposed to the impregnating dispersion to be higher than the rate of wicking of the impregnating dispersion into and through the paper.

A rigidified paper or paper substrate can be additionally rigidified by repeating, in general, the above described rigidification process. In such an additional rigidification process, the additional firing causes at least part, and preferably most or all, of the ceramic component of the additional impregnating dispersion to bond together and to the ceramic fibers of the paper. The additional firing can also cause unreacted ceramic components of the previous impregnating dispersion, if any, to bond together and to the ceramic fibers of the paper. Such reacting of the additional ceramic components, and of the previously unreacted ceramic components, can thereby cause the refractory ceramic fibers to be further bound together, and form an additionally rigidified paper or paper substrate. After the organic binder material in the paper, or paper substrate, is substantially burned-off, it can be desirable to use an impregnating dispersion that does not include a significant amount of a penetrating agent.

The method of the '333 invention can also comprise a paper making process for making the paper from a paper slurry. The paper slurry can comprise refractory ceramic fibers and organic binder material. It can be desirable for the slurry to also contain particles of metal carbides (e.g., silicon carbide), an optional ceramic precursor in particle form, and a coagulating agent. The particles of metal carbides are in sufficient quantity to make the paper microwave receptive after the drying, calcining and firing. The optional ceramic precursor particles will form a high temperature ceramic after being fired, the coagulating agent will cause the organic binder material to coagulate onto the ceramic fibers, metal carbide particles and ceramic precursors in the slurry, and the organic binder material will impart flexibility and handling strength to the paper. It can be desirable for the paper slurry to further comprise an inorganic binder material comprising a ceramic component such as, for example, one or more colloidal clays. It may also be desirable for the ceramic component used in the paper slurry to also comprise metal oxides, metal oxide precursors and colloids of the same.

In another aspect of the '333 invention, a green ceramic fiber-based paper or paper substrate, or other three dimensional, polymer reinforced, green, ceramic fiber body, is provided that is suitable for use in an exhaust system of a combustion device (e.g., a diesel engine), after being rigidified. The green paper substrate or body comprises two or more sheets of green ceramic fiber-based paper formed into the green substrate, at least one sheet having a flat surface and at least another sheet being a creased sheet having a plurality of creases with each crease having an apex. The one sheet can be a flat sheet or another creased sheet. Each sheet of green paper comprises refractory ceramic fibers, an organic material that includes at least one organic binder and optional organic fibers. It can be desirable for one or more or each sheet of green paper used to make the green substrate to also include metal carbide particles (e.g., silicon carbide) in sufficient quantity to make the paper, after drying, calcining and firing, microwave receptive. An inorganic adhesive is disposed so as to bond the apex of each crease of the creased sheet to the flat surface or crease of the one sheet so as to laminate the two sheets together and form a plurality of tubular channels. The inorganic adhesive can comprise a high viscosity, high solids suspension of inorganic adhesive components, with optional organic adhesive components. Such inorganic adhesive components can include refractory ceramic particles (e.g., alumina, cordierite, mullite, alumino-silicate, etc.), ceramic precursors (e.g., nano-clays, boehmite, basic metal salts, metal hydroxides, metal oxyhydroxides, etc.) and combinations thereof.

Preferably, the ceramic fiber paper forming the green substrate or body is impregnated with an impregnating dispersion that comprises at least an inorganic binder material and, if the paper forming the substrate contains a high enough concentration of organic binder material, a penetrating agent. The inorganic binder material comprises a ceramic component. The impregnating dispersion in the green substrate is at least partially dried. The ceramic component is at least one of a ceramic material and a ceramic precursor. The ceramic component of the impregnating dispersion, preferably, comprises at least one or more colloidal nano-clays and, optionally, silicon carbide. It may also be desirable for the ceramic component to further include one or more of boehmite, colloidal zirconia and colloidal silica. The ceramic component is in an amount so as not to unacceptably lower the permeability of the substrate and the homogeneity of the substrate after drying, calcining and firing. It can be desirable for the ceramic component to comprise at least one nano-clay material having a charge (e.g., a negative nature) that promotes adsorption of the nano-clay onto the ceramic fibers, when the ceramic fibers have an opposite charge (e.g., when the ceramic fibers are cationic and the nano-clays are anionic). It can be also desirable for the ceramic component of the impregnating dispersion to comprise ceramic particulate (e.g., ceramic particles, ceramic precursor particles, etc.) having an average particle diameter of less than about 4 micrometers, with at least about 80% by weight of the ceramic particulate having an average particle diameter of less than about 10 micrometers and at least about 95% by weight of the ceramic particulate having an average particle diameter of less than about 20 micrometers. It can also be desirable for the ceramic particles to have an average particle diameter of up to about 5 micrometers. It may also be desirable for the ceramic particles to have an average particle diameter of up to about 6 micrometers.

The penetrating agent comprises an organic molecule or polymer that sufficiently reduces interfacial energy between the impregnating dispersion and the surfaces of the green substrate (i.e., at least the surfaces formed by the fibers and binders) to allow the impregnating dispersion to wet and be absorbed into the green paper without significant flocculation or particle separation (e.g., phase separation) of the ceramic components in the impregnating dispersion (i.e., with substantial homogeneity of the ceramic components in the absorbed impregnating dispersion). The penetrating agent is sufficiently soluble in the impregnating dispersion so as to be present in an amount that enables it to be effective as a penetrating agent during impregnation. It is desirable for the penetrating agent to comprise an organic molecule or polymer that enhances wetting of the green substrate by the impregnating dispersion by at least one of (1) reducing the surface tension of the impregnating dispersion and (2) reducing the surface energy at the interface between the impregnating dispersion and the paper of the green substrate.

In a further aspect of the '333 invention, a rigidified ceramic fiber-based paper or paper substrate is provided that is suitable for use in an exhaust system of a combustion device (e.g., a diesel engine). The rigidified substrate comprises a ceramic fiber-based paper comprising refractory ceramic fibers and agglomerates of ceramic particles. The ceramic particle agglomerates are bonded to and disposed so as to thereby bond together the refractory ceramic fibers at spaced locations along and at intersections of the refractory ceramic fibers so that the refractory ceramic fibers retain much of their original flexibility while in the paper. The ceramic particles can comprise particles derived from colloidal nano-clays, silicon carbide, boehmite, colloidal zirconia, colloidal silica, alpha-alumina, transition aluminas, ceria, ceria zirconia mixtures, aluminum titanate, cordierite, mullite, other alumino-silicates and combinations thereof. This rigidified paper substrate can be used in combination with a mounting material or mat and a housing. The substrate is disposed in the housing and the mounting material is positioned between the substrate and the housing so as to form a substrate assembly. The rigidified paper substrate can be a filter element, a catalyst support or both. The rigidified paper substrate is, preferably, suitable for use in an internal combustion engine exhaust system.

The rigidified paper or paper substrate is, preferably, regenerable with microwave heating so as to promote the combustion of carbon trapped in the paper or paper substrate, residue carbon on exposed surfaces of the paper or paper substrate, or both. To effect this regenerability, at least in part, at least some of the ceramic fibers included in the substrate can be at least partially coated with or at least partially contain oxidation catalyst material(s). Such fibers are typically introduced during the paper making process. It is also desirable, in order to effect regenerability, for the ceramic particles to include metal carbide particles (e.g., silicon carbide) in sufficient quantity to make the rigidified paper microwave receptive. In one exemplary rigidified paper, or paper substrate, useful in filtering exhaust gases, the refractory ceramic fibers comprise aluminum containing ceramic fibers and the ceramic particles comprise silicon carbide particles. This exemplary paper, or paper substrate, can also, desirably, further comprise oxide material comprising silicon.

It can be desirable for the ceramic particles in the rigidified paper to have an average particle diameter of less than about 4 micrometers, with at least about 80% by weight of the ceramic particles having a particle diameter of less than about to micrometers and at least about 95% by weight of the ceramic particles having a particle diameter of less than about 20 micrometers. It can also be desirable for the ceramic particles to have an average particle diameter of up to about 5 micrometers. It may also be desirable for the ceramic particles to have an average particle diameter of up to about 6 micrometers.

Preferably, the refractory ceramic fibers in the rigidified paper, or paper substrate, are somewhat oriented (i.e., not completely random in their orientation). It can also be preferred that greater than about 60% of the refractory ceramic fibers in the rigidified paper are aligned within about 35° of being parallel with the plane of the paper. It is further preferred that lenticular or plate-like pores be formed or otherwise present inside the paper, with the pores being aligned close to parallel with the plane of the paper. Such lenticular or plate-like pores have long axes typically in the range of from about 50 to about 300 micrometers in length and in the range of from about 10 to about 50 micrometers in height. It can be preferable for the ceramic particles to not form a contiguous phase (i.e., the particles typically form a discontiguous phase) throughout the rigidified paper substrate. Typically, the ceramic particles also do not form a continuous coating (i.e., the particles typically form a discontinuous coating) on the ceramic fibers within the rigidified paper.

The rigidified paper substrate can be a wall-flow substrate or a flow- through substrate. The rigidified paper and the rigidified paper substrate can exhibit above 70% porosity and even in the range of about 80% to 95% porosity. The rigidified paper, or paper substrate, preferably exhibits a porosity in the range of from about 80% to about 95%, with a mean flow pore diameter in the range of from about 10 to about 15 micrometers as measured by porosymmetry. It can be desirable for the rigidified paper, or paper substrate, to have a low glass content (typically glass particles) of less than 5% by weight, more desirably, less than 2% by weight and, even more desirably, less than 1% by weight. It can also be desirable for the rigidified paper substrate to have a low alkaline metal content of less than 2% by weight and, more desirably, less than 0.5% by weight.

As used in the '333 application, the term "green" refers to an article or composite comprising organic material and inorganic fibers that has not been calcined or fired, i.e., exposed to sufficient temperatures to burn away a substantial amount or all of the organic material. Examples of such an article or composite include the ceramic fiber-based paper substrate of the '333 invention and the paper used to make the substrate.

As used in the '333 application, the term "glass" refers to metal oxide or metal sulfide based materials, usually having high alkaline metal oxide contents, that react with neighboring ceramic materials in the fiber-based substrate to cause exaggerated grain growth and embrittlement of those neighboring ceramic materials or that melt during the calcining or firing steps in the present rigidification process or during the use of the fiber-based substrate in an exhaust system. Such glass materials can include, for example, glasses that fall within the following broad groups: sodium and potassium alumino-silicates, alkaline metal boro-silicates, alkaline metal alumino- boro-silicates, etc. Note that some of the glasses that fall within these broad groups may not be a glass, as that term is defined above.

As used in the '333 application, the term "ceramic" refers to ceramic materials other than a glass.

As used in the '333 application, the term "nano-clay" refers to a clay in the form of extremely fine platelets, flakes or other particles where at least one dimension of the particle is in the nano-range. It is desirable to use nano-clay particles that have at least one dimension of less than about 30 nanometers and, preferably, less than about 20 nanometers. Preferably, the primary dimension of the nano-clay particle, i.e., the largest dimension, is less than about 50 nanometers. It is preferable for the nano-clay particles to be in the form of platelets or flakes.

As used in the '333 application, a ceramic dispersion or sol refers to a liquid medium in which ceramic particles (e.g., powders, flakes) have been added and uniformly dispersed within the liquid medium.

As used in the '333 application, a primary dispersion refers to a dispersion comprising a solution containing a ceramic component and at least one penetrating agent. The primary dispersion is used in at least the first impregnating solution to impregnate a polymer reinforced green ceramic paper or paper body.

As used in the '333 application, aspect ratio refers to the ratio of the length of an item to the width of an item. In this regard, a fiber having a length of 100 micrometers and a width of 2 micrometers would be described as having an aspect ratio of 50.

As used in the '333 application, a wall-flow fiber-based paper substrate is one where the exhaust gases have to flow through the substrate walls in order to pass through the substrate (e.g., a particulate filter).

As used in the '333 application, a flow-through fiber-based paper substrate is one where the exhaust gases make contact with the external surfaces of the substrate walls but do not have to flow through the walls in order to pass through the substrate (e.g., a catalyzing support).

As used in the '333 application, the term porosity refers to connected porosity as opposed to closed-cell porosity. Connected porosity in the paper is desirable because it allows gases to penetrate through the paper, while closed-cell porosity would not.

Section III—U.S. patent application Ser. No. 10/075,035

The invention also arose during continuing development efforts relating to the subject matter of U.S. patent application Ser. No. 10/075,035, filed Feb. 12, 2002, incorporated herein by reference (hereinafter the '035 application/invention). The '035 application is a continuation-in-part of U.S. patent application Ser. No. 09/522,152, filed Mar. 9, 2000, now U.S. Pat. No. 6,669,913 the subject matter of which is incorporated herein by reference (hereinafter the '913 patent/invention), and a continuation- in-part of U.S. patent application Ser. No. 09/851,300, filed May 8, 2001, incorporated herein by reference (hereinafter the '300 application/invention). The '300 application is a continuation-in-part of the '913 patent.

The '035 invention relates to exhaust aftertreatment devices and methods, including for diesel engine exhaust, and more particularly to combined filters and catalytic converters. The '035 invention also relates to filters.

As noted in the '913 patent, various diesel exhaust aftertreatment systems require that the exhaust be directed through a catalytic component and also through a filter component to achieve emissions and/or particulate (e.g. soot) reduction. The invention of the '913 patent provides a simple system combining these devices in a singular unit. In a desirable aspect, the invention of the '913 patent further maintains exact axial alignment of catalytic and filter flow channels and simplifies packaging.

The invention of the '300 application arose during continuing development efforts, and provides in one desirable combination a combined catalytic converter and filter. In another desirable combination, improved filter regeneration is provided.

The '035 invention arose during yet further continuing development efforts. The '035 invention provides an exhaust aftertreatment combined filter and catalytic converter which is particularly simple and effective. The '035 invention also relates to an improved filter.

The '035 application references U.S. patent application Ser. No. 10/075,036, filed Feb. 12, 2002, incorporated herein by reference, which relates to exhaust aftertreatment emission control regeneration.

The '913 patent relates to exhaust emission devices for internal combustion engines, including diesel engines, and more particularly to catalytic converters and to filters.

Various diesel exhaust aftertreatment systems require that the exhaust be directed through a catalytic component and also through a filter component to achieve emissions and/or particulate (e.g. soot) reduction. The '913 patent provides a simple system combining these devices in a singular unit. In a desirable aspect, the '913 patent further maintains exact axial alignment of catalytic and filter flow channels and simplifies packaging.

The '300 invention relates to exhaust aftertreatment filters for internal combustion engines, including diesel engines. The '300 invention initially grew out of attempts to solve customer-reported problems with stalled trucks due to clogged exhaust filters. It is known in the prior art to provide a cylindrical filter roll having a hollow center and a surrounding annulus with axially extending alternately sealed flow channels providing the filtering function. The hollow center or core is plugged, to block flow therethrough, and force exhaust to flow through the filter section. During usage, as the filter section becomes clogged, the truck may stall. One possible solution is to eliminate the central blocking plug. However, this may weaken the unit by eliminating the central structural support provided by such plug, and also leads to increased particulate emission, i.e. a portion of the exhaust would be unfiltered. The '300 invention provides various solutions and trade-offs in combination. In one desirable combination, a combined catalytic converter and filter is provided. In another desirable combination, improved filter regeneration is provided.

The present invention provides improvements resulting from further and continuing efforts relating to the above development work. The present invention provides a filter and method for filtering nanoparticles in a hot gas, namely particles <1 micron in a gas 200° C. and further particularly greater than 450° C. including diesel exhaust. Advances are made in permeability, namely $<3 \times 10^{-12}$ m$^2$ and inertial resistance coefficient $<1 \times 10^6$ m$^{-1}$, and in particle capture in the MPR (Most Penetrating Region), and in staged filtration.

BRIEF DESCRIPTION OF THE DRAWINGS

Section I

FIGS. 1–7 are taken from the noted '490 patent.

FIG. 1 is a perspective view of a pre-form in accordance with the '490 patent.

FIG. 2 is a microphotograph showing the fibrous nature of the pre-form.

FIG. 3 is an enlarged cross-sectional view of a portion of FIG. 1.

FIG. 4 is a view of a portion of FIG. 3 and includes wall dimension thickness.

FIG. 5 is a view like FIG. 3 and shows an alternate embodiment.

FIG. 6 is a view of a portion of FIG. 5 and includes wall dimension thickness.

FIG. 7 is a side view showing forming apparatus in accordance with the '490 patent.

Section II

FIGS. 8–18 are taken from the noted '333 application.

Figure 8:
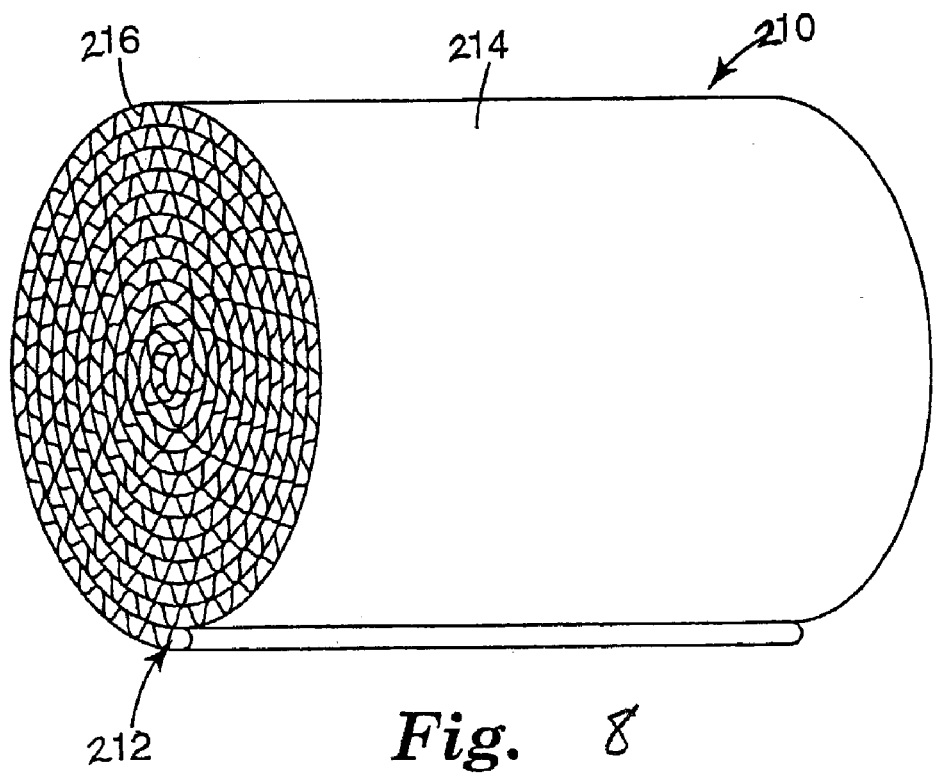

FIG. 8 is a perspective view of a fiber-based paper substrate according to the '333 invention.

Figure 9:
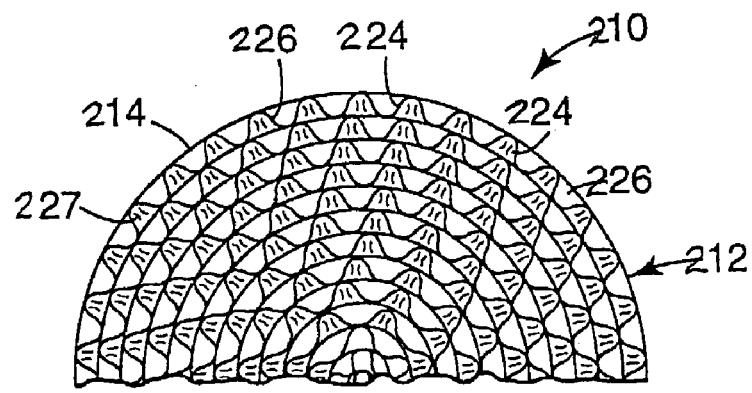

FIG. 9 is a partial end view of a wall-flow fiber-based paper substrate according to the '333 invention.

Figure 10:
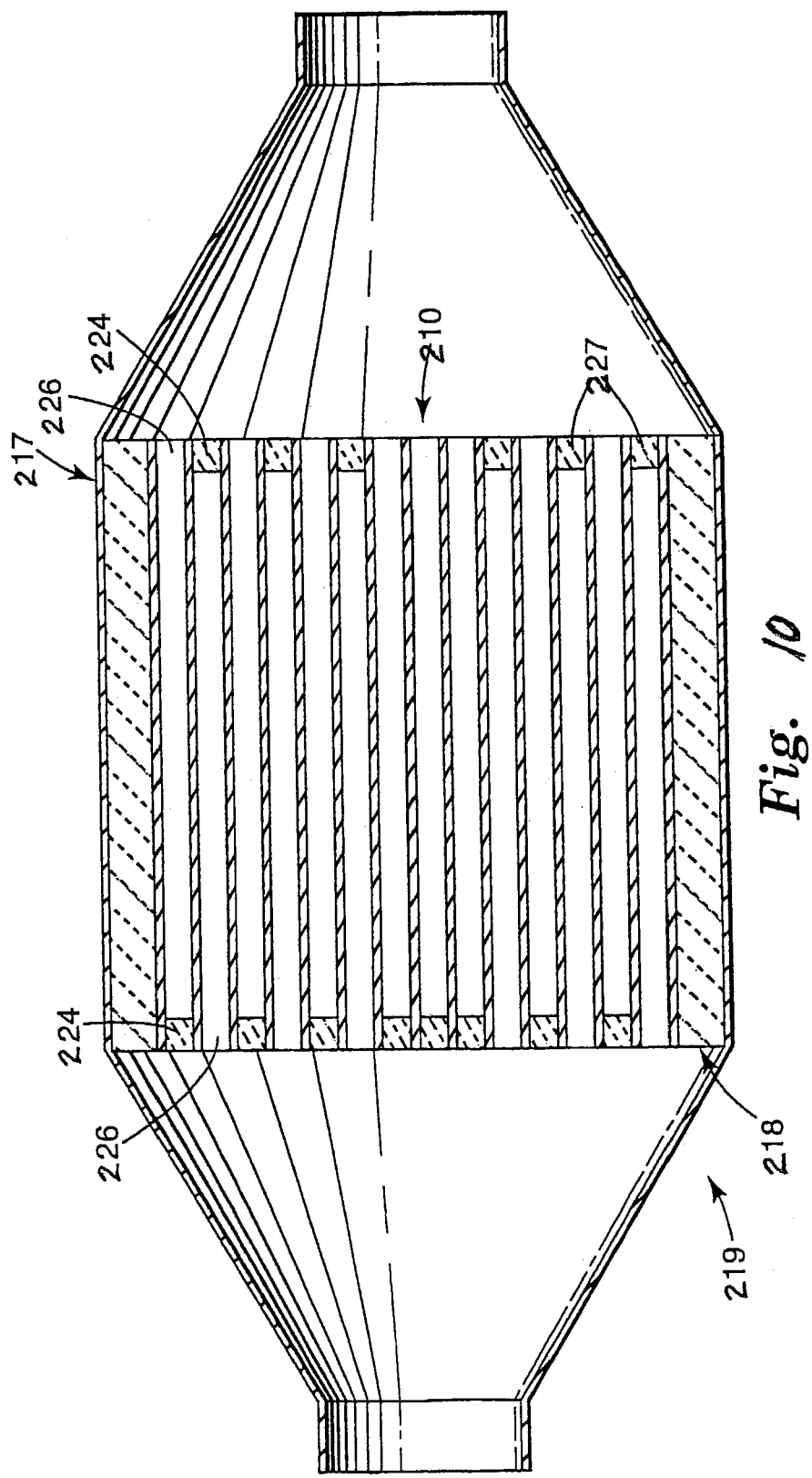

FIG. 10 is a schematic cross sectional view of a wall-flow fiber-based paper substrate assembly according to the '333 invention.

Figure 11:
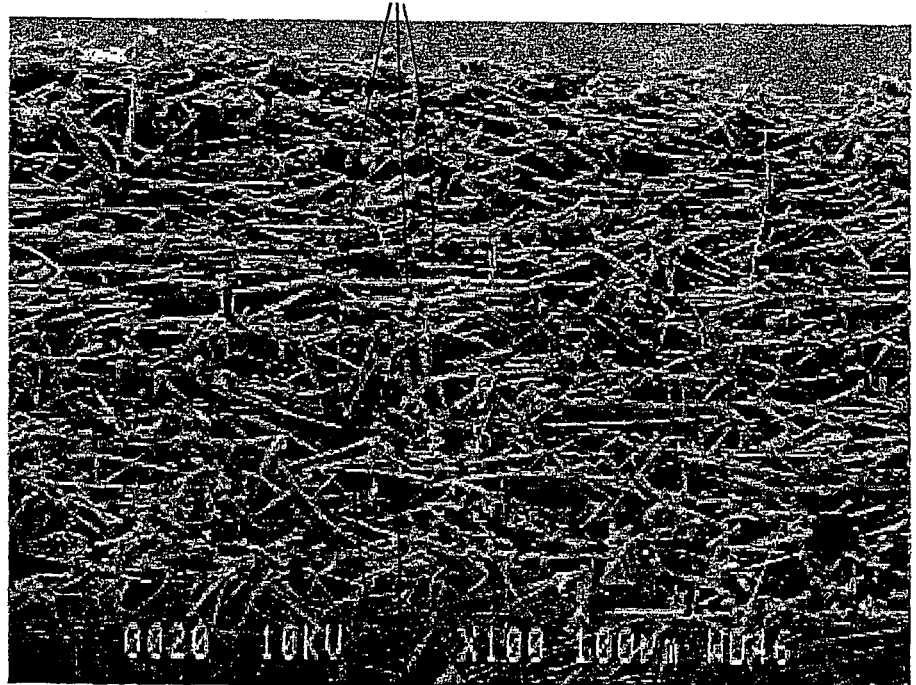

FIG. 11 is a 100× magnification photomicrograph of a cross-sectioned ceramic fiber paper that has been impregnated, dried, calcined and fired once according to the '333 invention.

Figure 12:
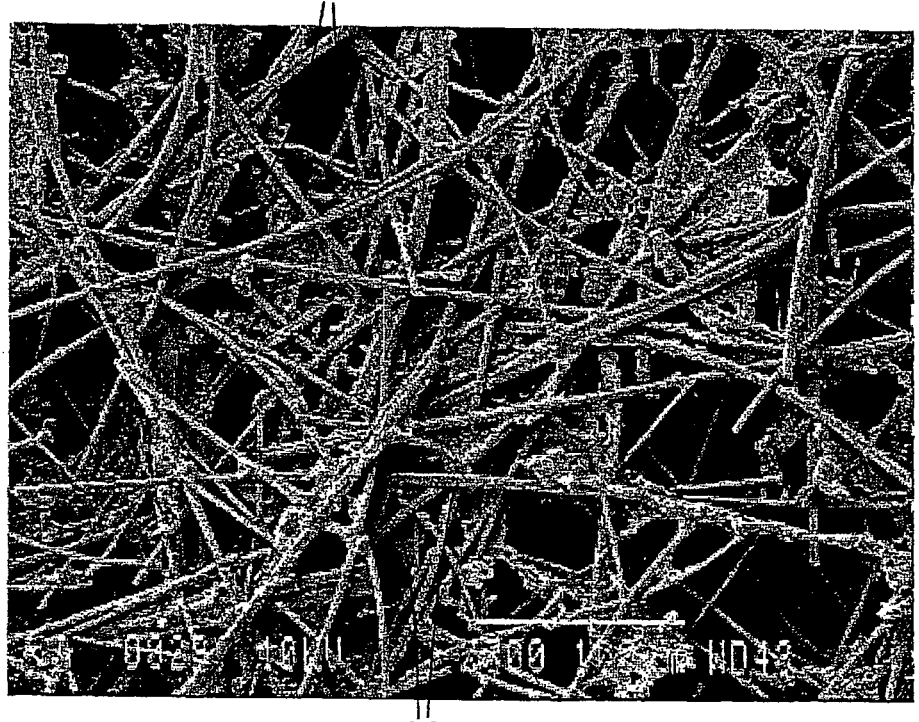

FIG. 12 is a 300× magnification photomicrograph of the surface of a ceramic fiber paper that has been impregnated, dried, calcined and fired once according to the '333 invention.

Figure 13:
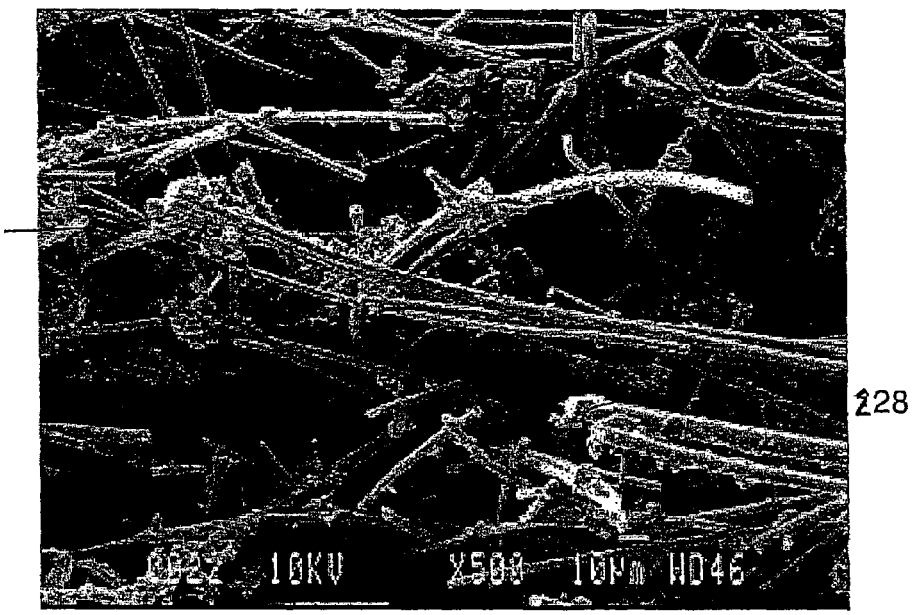

FIG. 13 is a 500× magnification photomicrograph of a cross-sectioned ceramic fiber paper that has been impregnated, dried, calcined and fired once according to the '333 invention.

Figure 14:
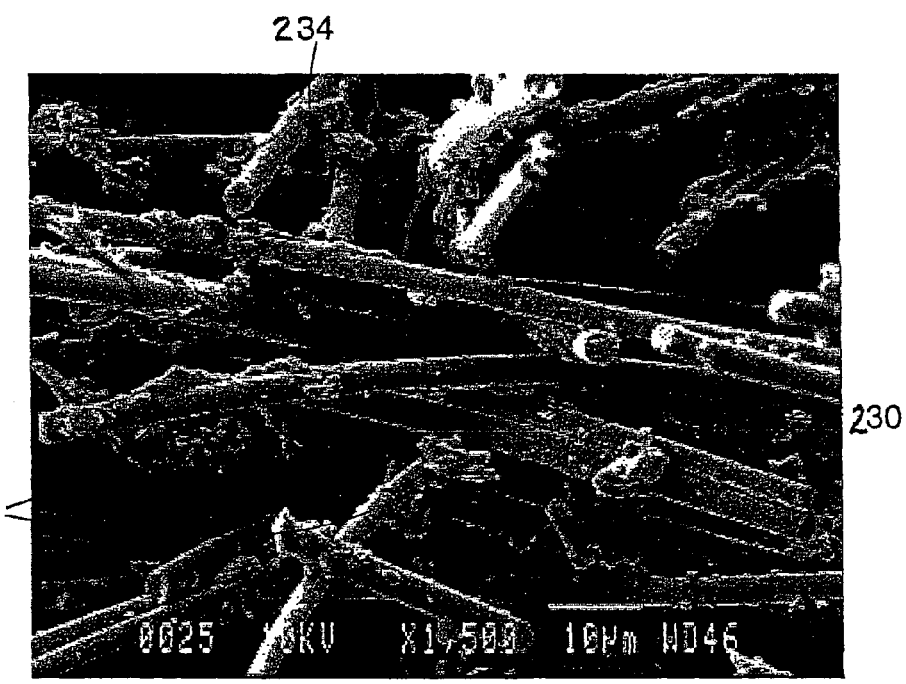

FIG. 14 is a 1,500× magnification photomicrograph of a cross-sectioned ceramic fiber paper that has been impregnated, dried, calcined and fired once according to the '333 invention.

Figure 15:
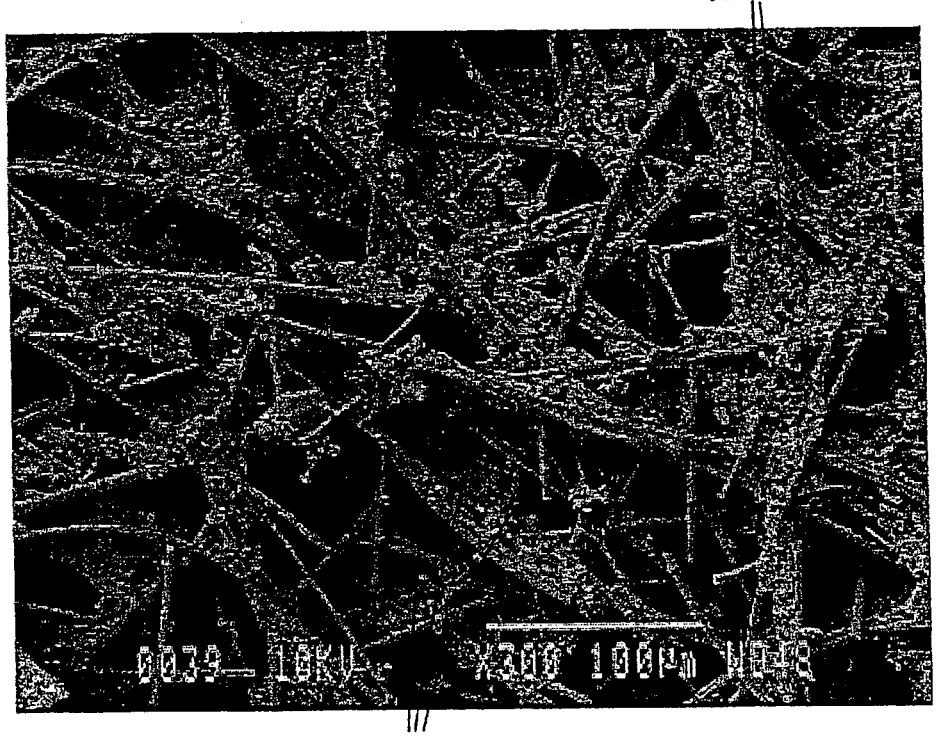

FIG. 15 is a 300× magnification photomicrograph of the surface of a ceramic fiber paper that has been impregnated, dried, calcined and fired twice according to the '333 invention.

Figure 16:
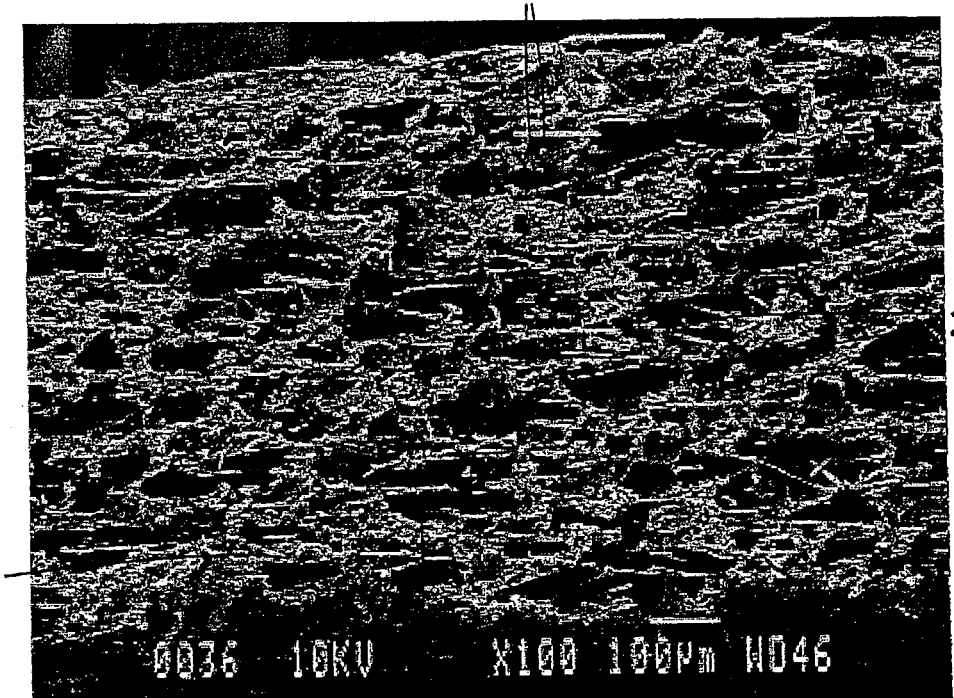

FIG. 16 is a 100× magnification photomicrograph of a cross-sectioned ceramic fiber paper that has been impregnated, dried, calcined and fired twice according to the '333 invention.

Figure 17:
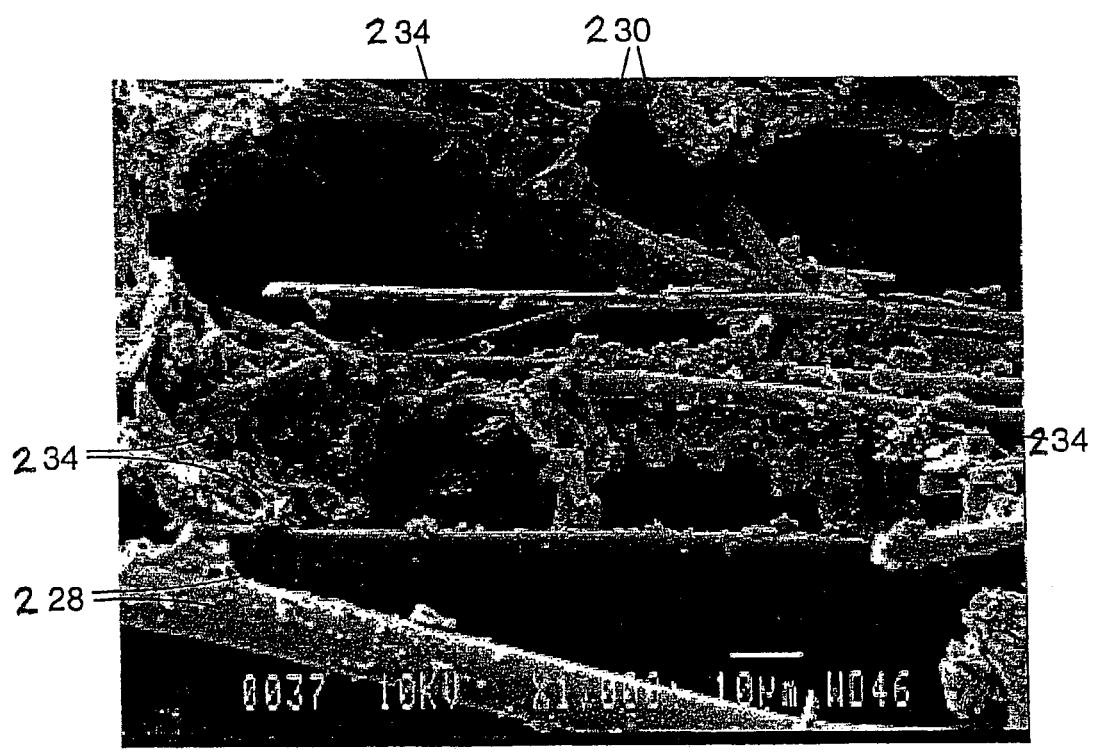

FIG. 17 is a 1,000× magnification photomicrograph of a cross-sectioned ceramic fiber paper after having been impregnated, dried, calcined and fired twice according to the '333 invention.

Figure 18A:
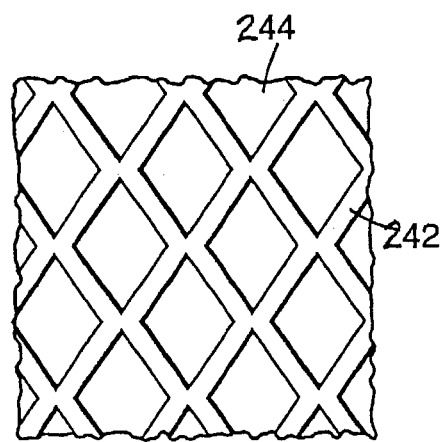

FIG. 18a is a planar view of a ceramic fiber paper that has been impregnated with reinforcing pattern.

Figure 18B:
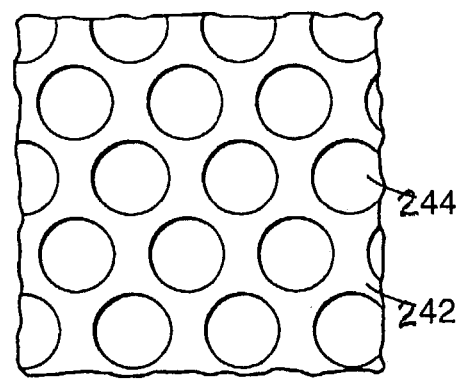

FIG. 18b is a planer view of a ceramic fiber paper that has been impregnated with an alternative reinforcing pattern.

Figure 18C:
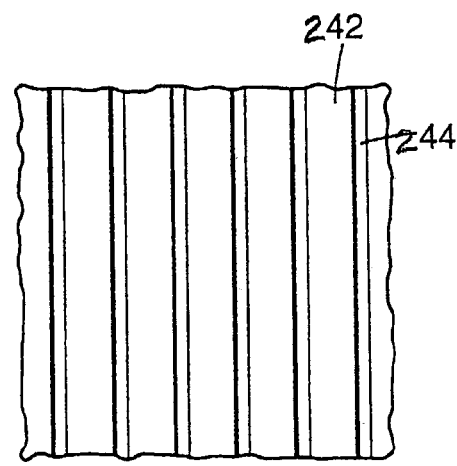

FIG. 18c is a planer view of a ceramic fiber paper that has been impregnated with another alternative reinforcing pattern.

Section III

FIGS. 19–37 are taken from the noted '035 application.

Figure 19:
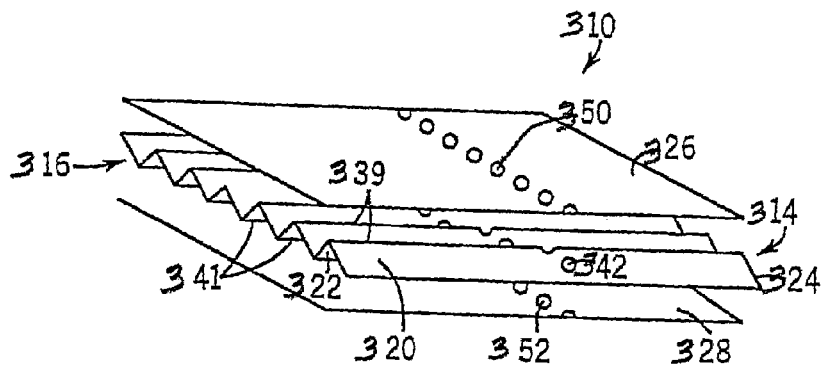

FIG. 19 is an exploded perspective view of a combination catalytic converter and filter in accordance with the noted '913 patent.

Figure 20:
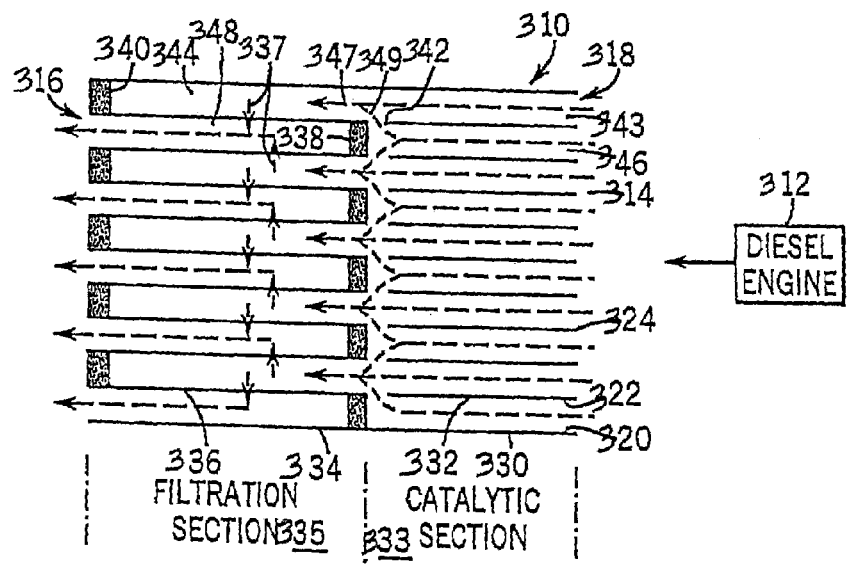

FIG. 20 is a sectional view from above of the device of FIG. 19.

Figure 21:
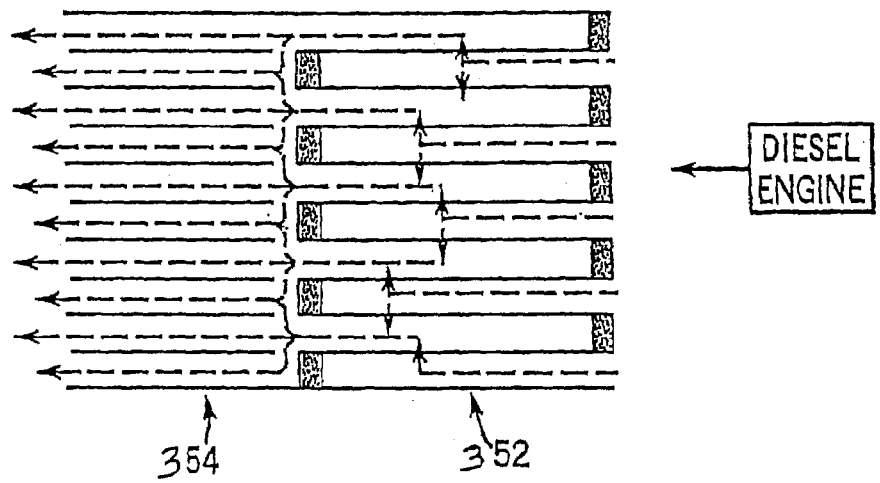

FIG. 21 is a view like FIG. 20 and shows another embodiment.

Figure 22:
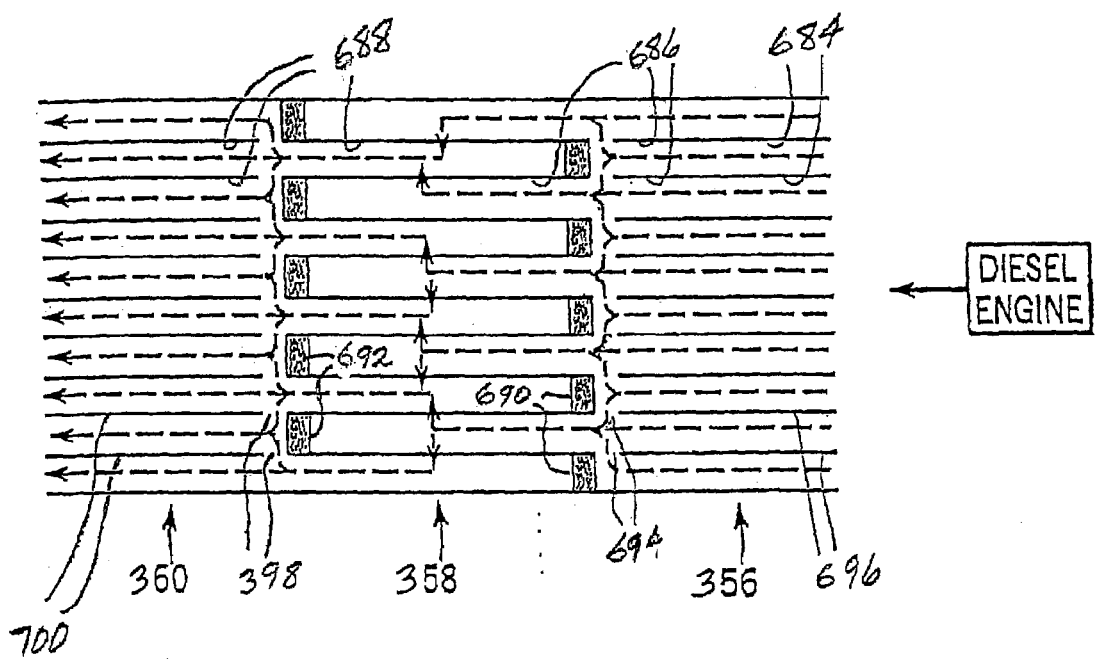

FIG. 22 is a view like FIG. 20 and shows another embodiment.

Figure 23:
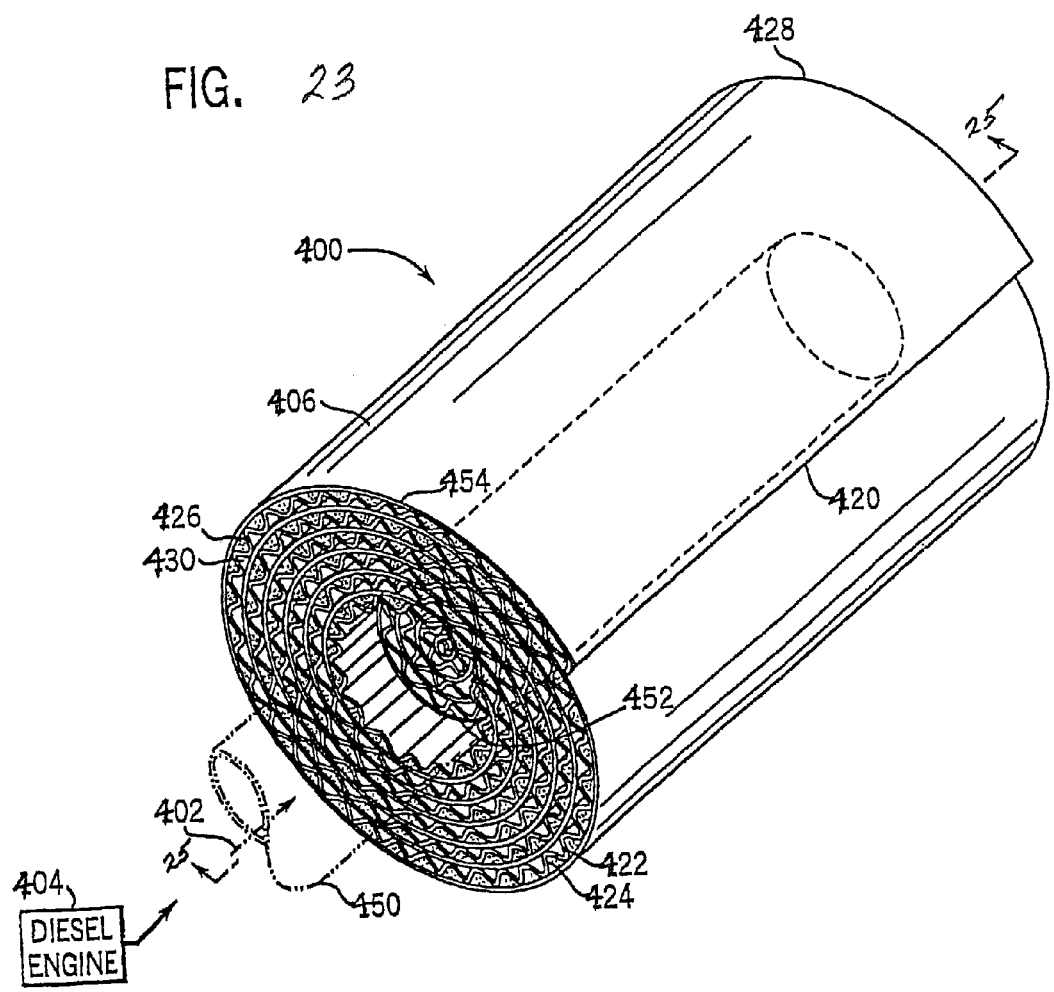

FIG. 23 is a perspective assembly view of an exhaust aftertreatment filter in accordance with the noted '300 application.

Figure 24:
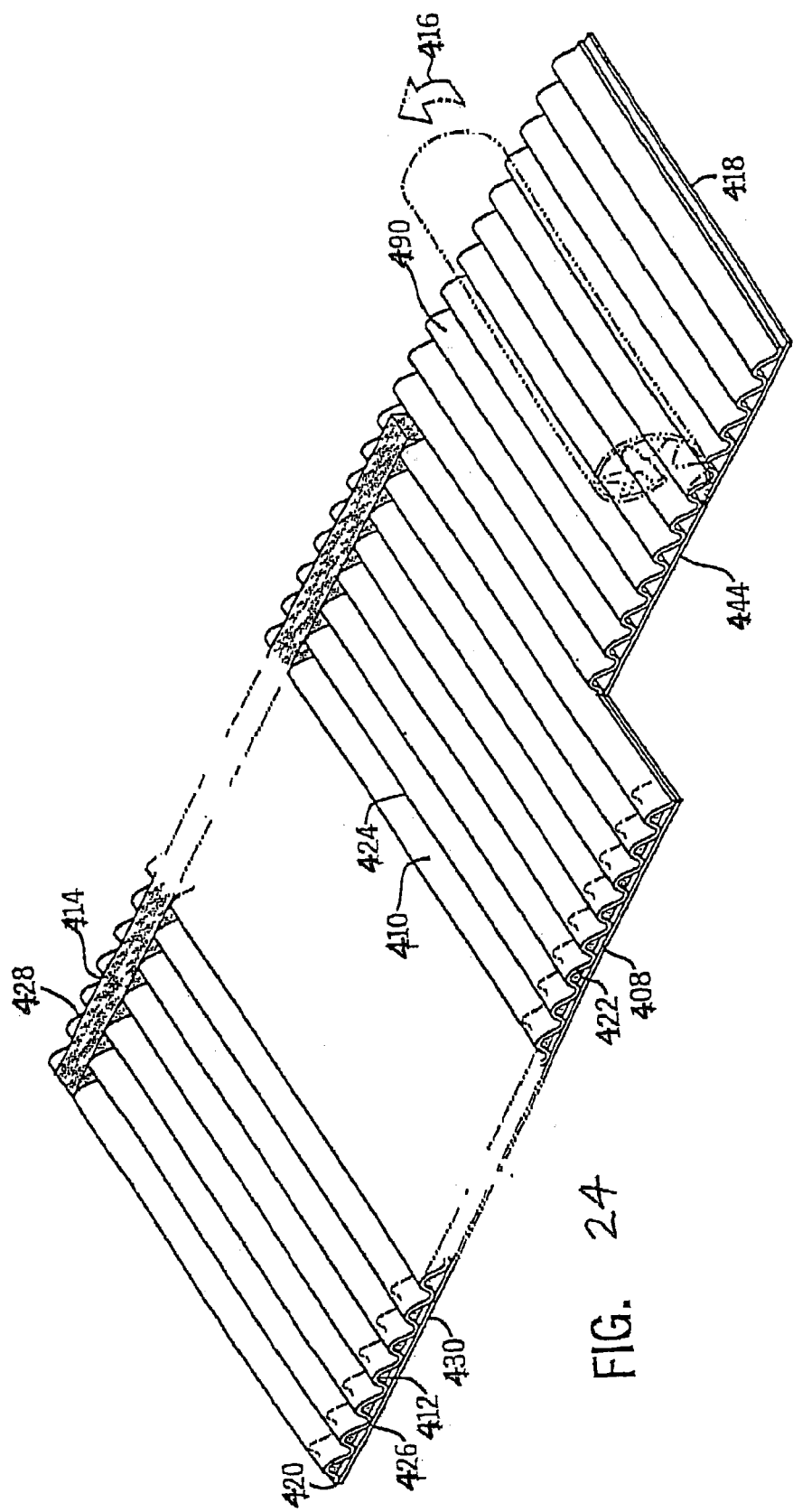

FIG. 24 is a perspective view showing an assembly step in making the filter roll of FIG. 23.

Figure 25:
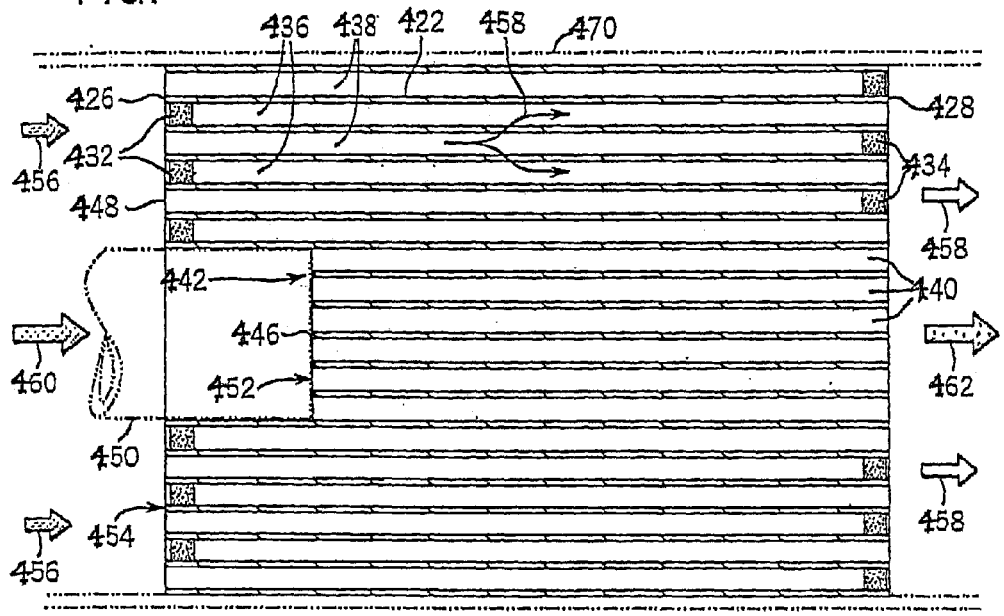

FIG. 25 is a sectional view taken along line 25—25 of FIG. 23.

Figure 26:
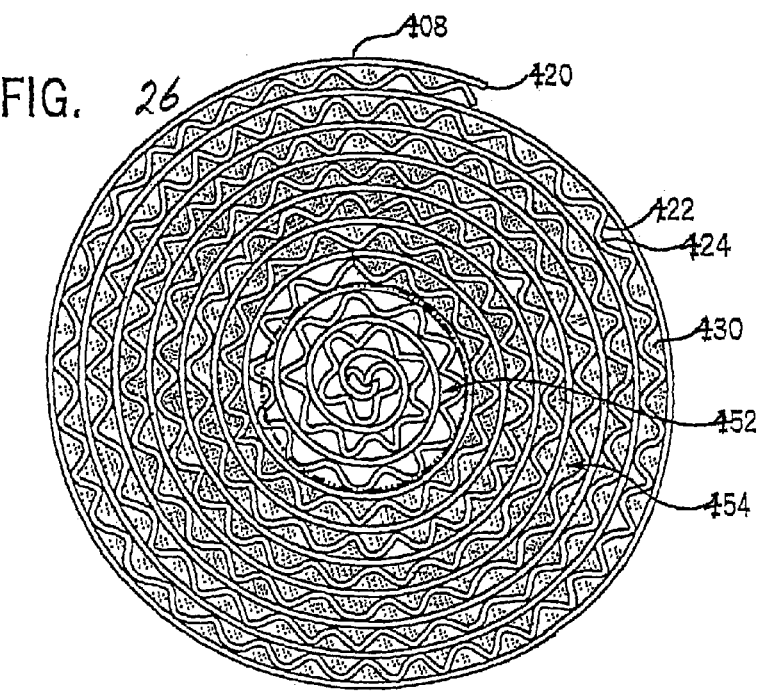

FIG. 26 is an end elevation view of the filter roll of FIG. 23.

Figure 27:
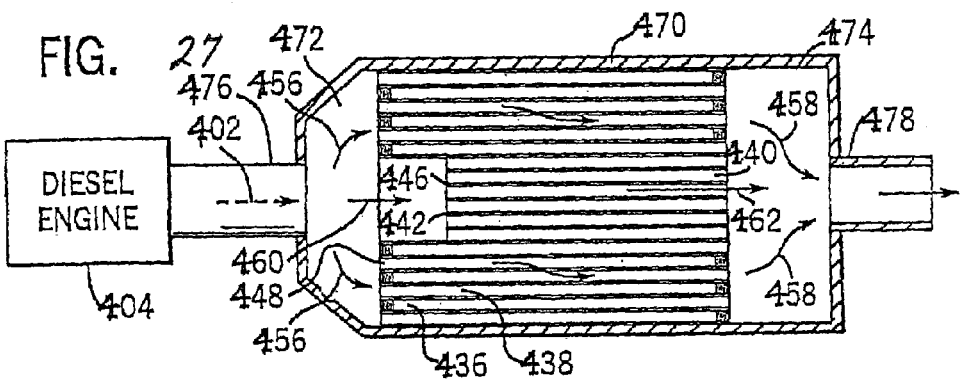

FIG. 27 is a sectional view like FIG. 25 and schematically shows a housing combination.

Figure 28:
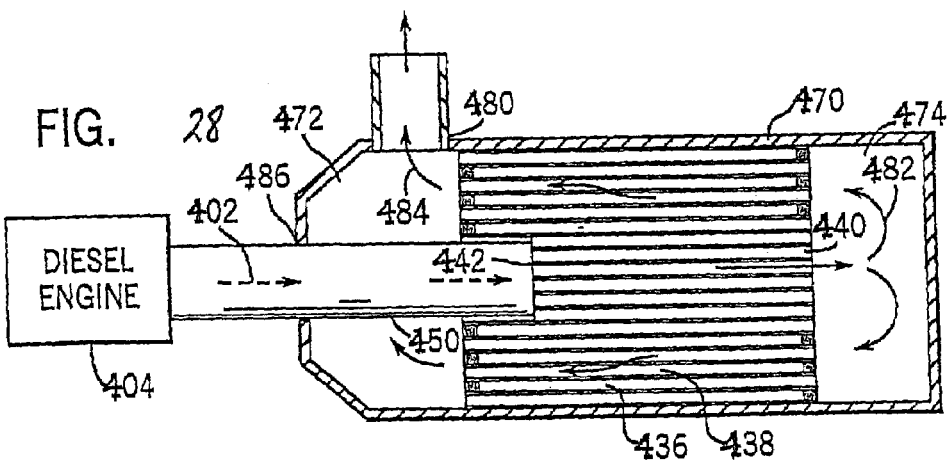

FIG. 28 is like FIG. 27 and shows another embodiment.

Figure 29:
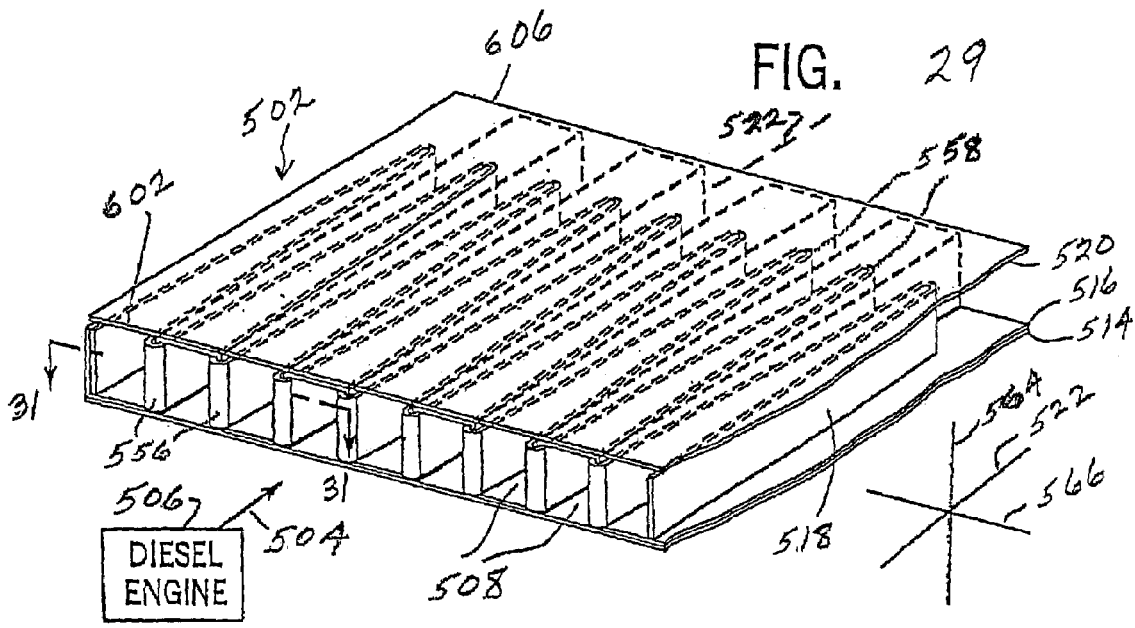

FIG. 29 is a perspective assembly view of a portion of an exhaust aftertreatment combined filter and catalytic converter in accordance with the '035 invention.

Figure 30:
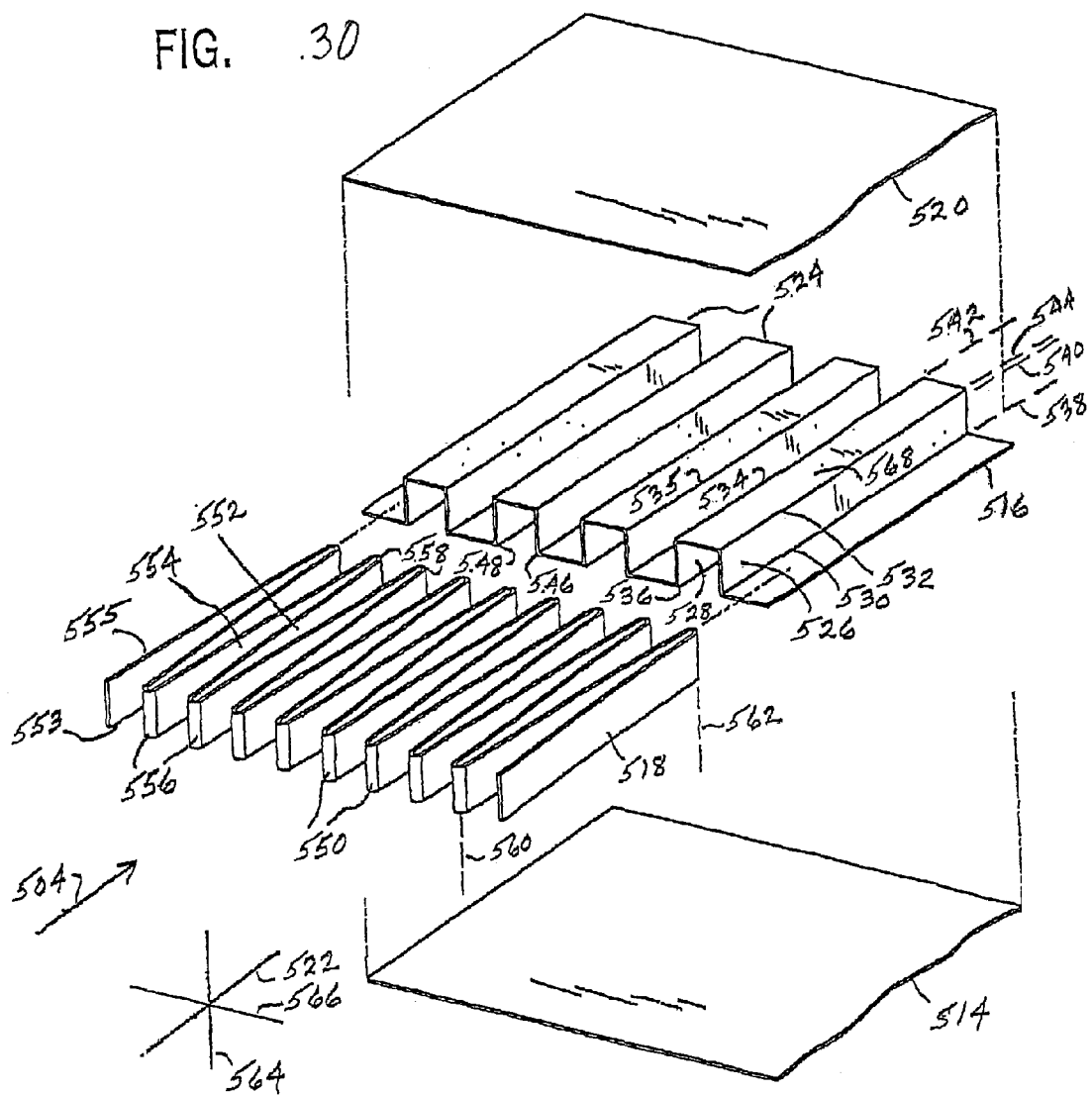

FIG. 30 is an exploded perspective view of the construction of FIG. 29.

Figure 31:
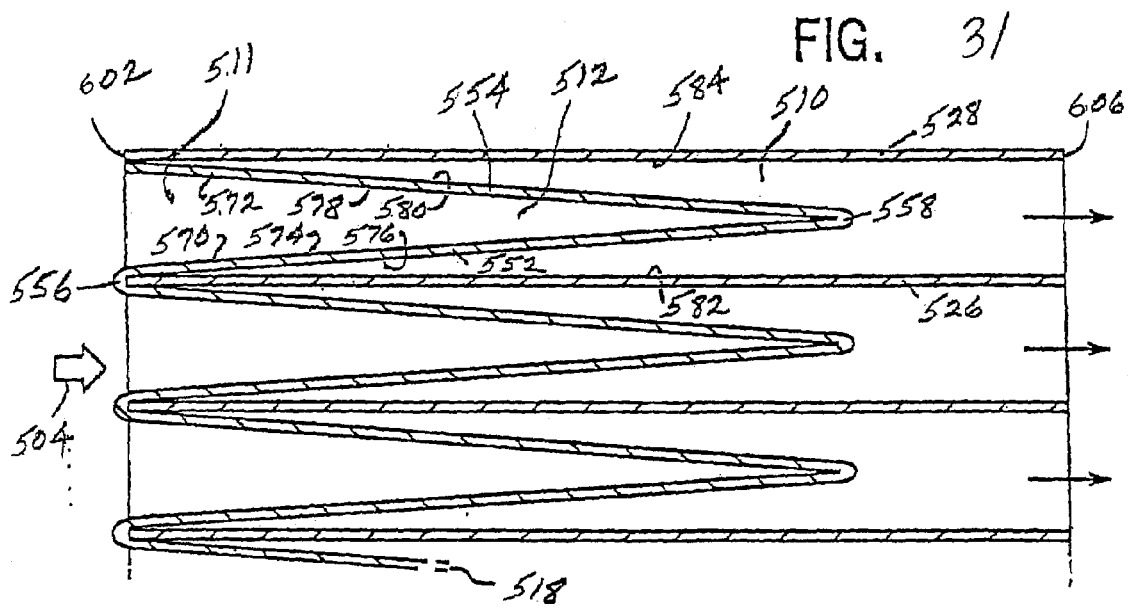

FIG. 31 is a sectional view taken along line 31—31 of FIG. 29.

Figure 32:
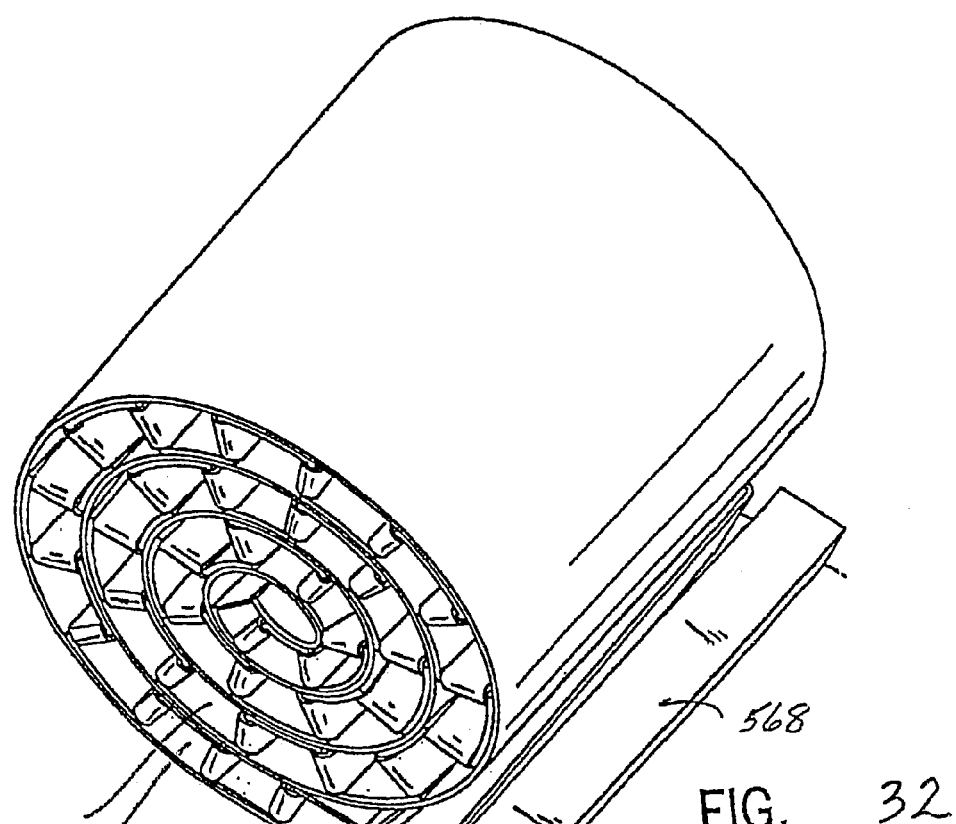

FIG. 32 is a perspective view showing the construction of FIG. 29 in a spiral wound filter roll.

Figure 33:
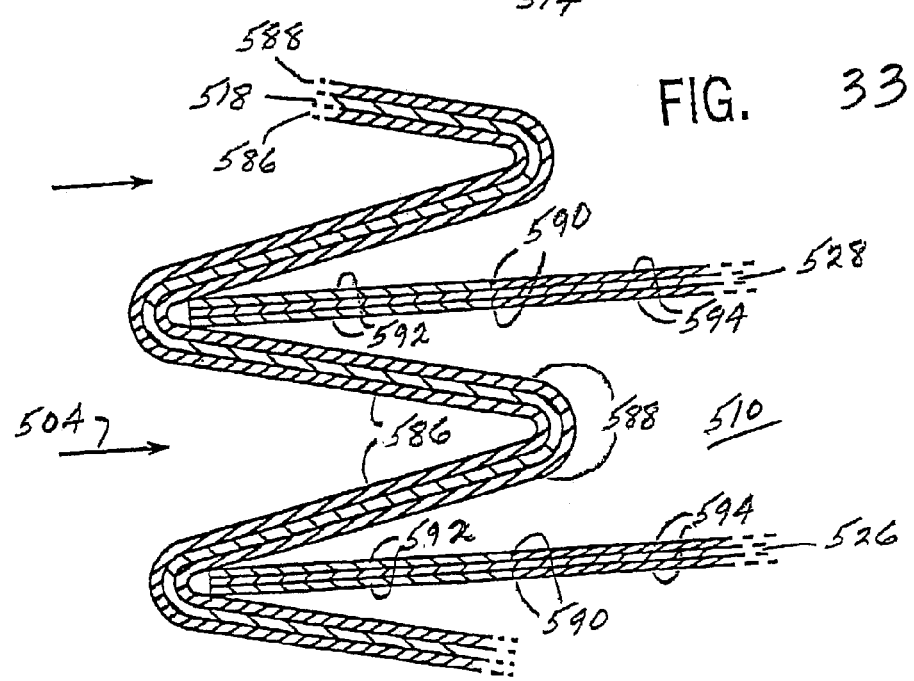

FIG. 33 is a view like a portion of FIG. 31 and shows a further embodiment.

Figure 34:
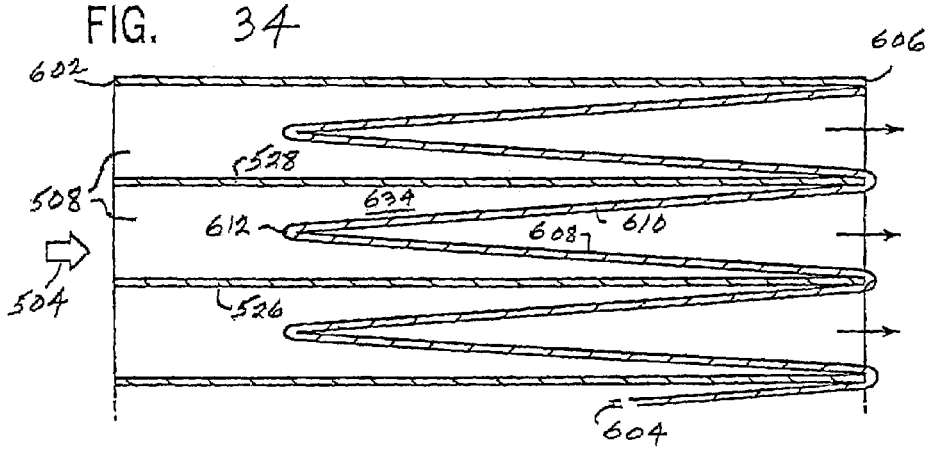

FIG. 34 is a view like a portion of FIG. 31 and shows a further embodiment.

Figure 35:
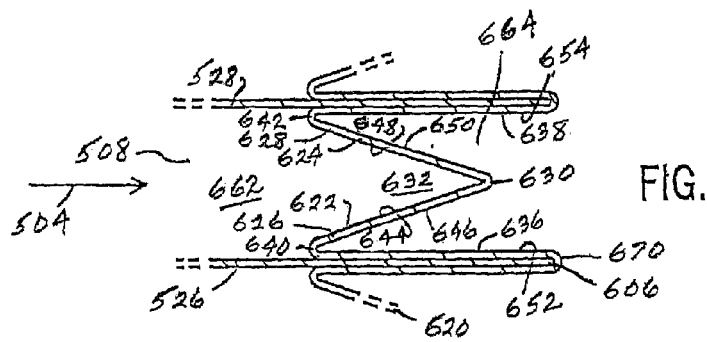

FIG. 35 is a view like a portion of FIG. 31 and shows a further embodiment.

Figure 36:
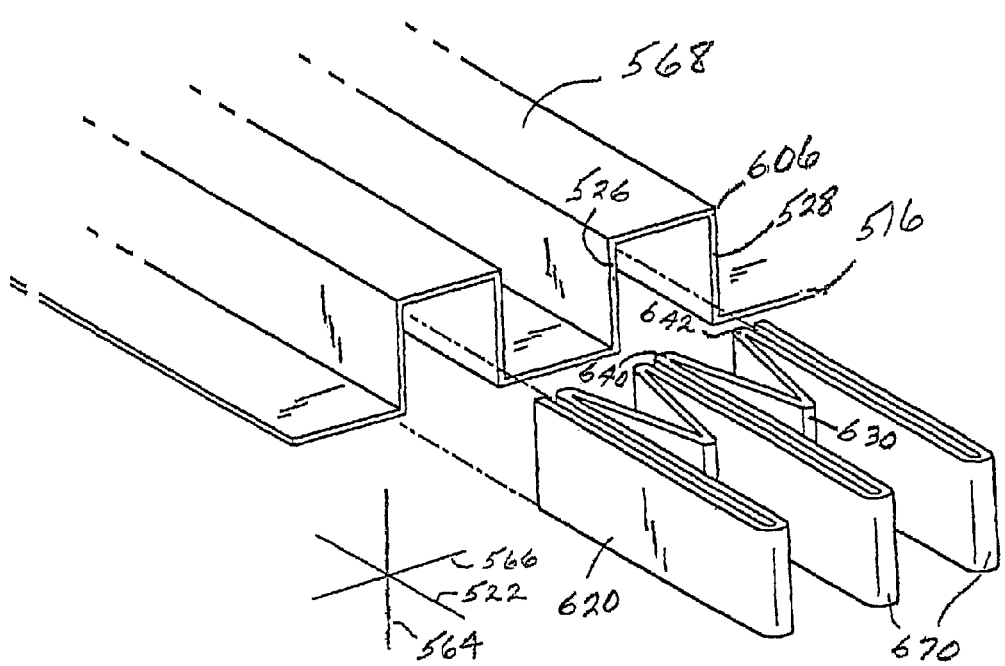

FIG. 36 is an exploded perspective view of the construction of FIG. 35.

Figure 37:
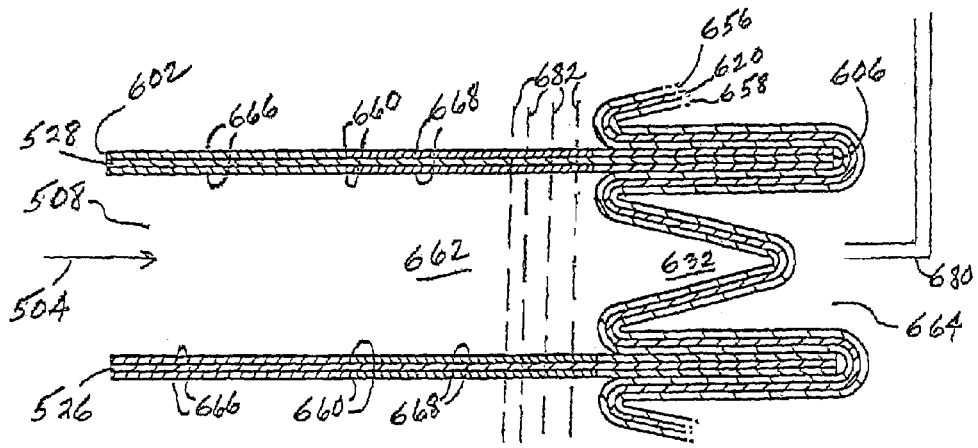

FIG. 37 is a view like FIG. 35 and shows a further embodiment.

Section IV

Figure 38:
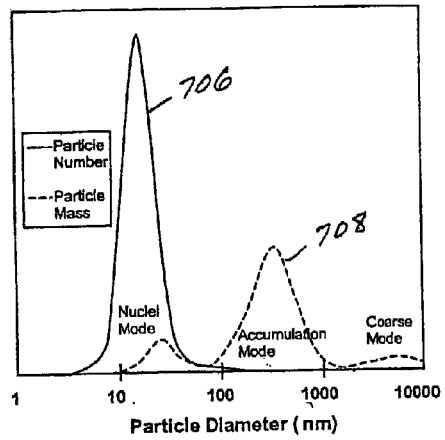

FIG. 38 is a graph of particle distribution of diesel exhaust, namely particle number and particle mass vs. particle diameter.

Figure 39:
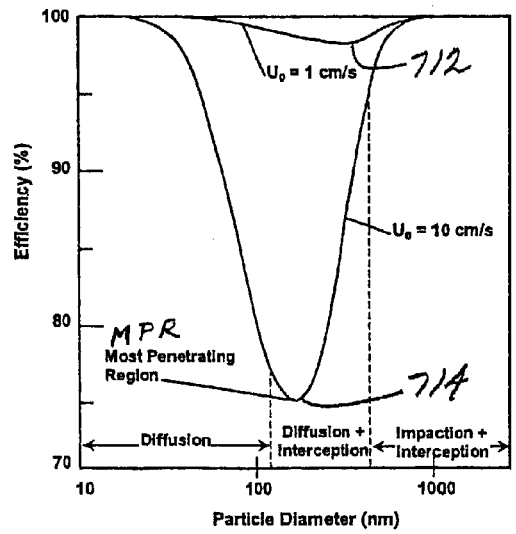

FIG. 39 is a graph of filter collection efficiency vs. particle diameter.

Figure 40:
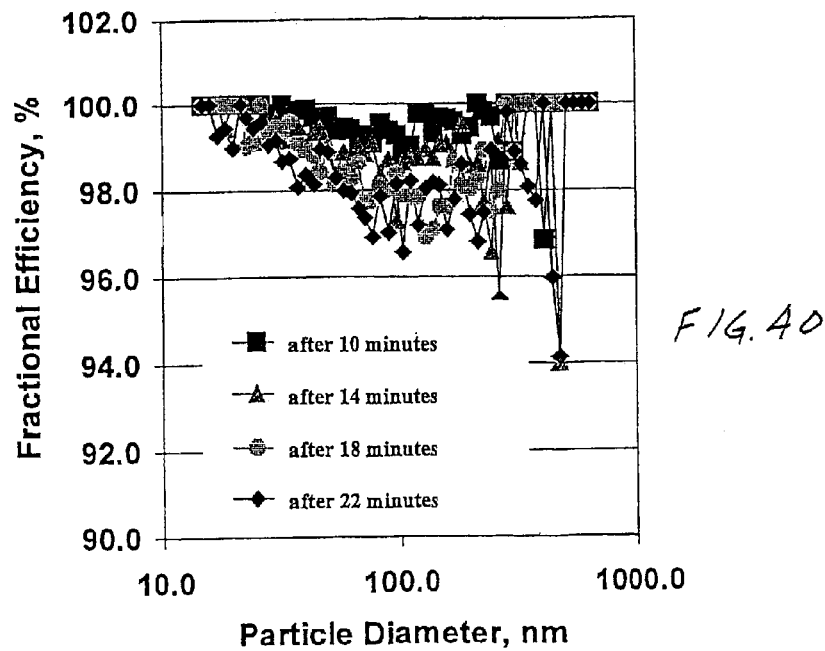

FIG. 40 is a graph of efficiency versus particle diameter.

FIGS. 41–46 show velocity profiles of exhaust flow through a diesel particulate filter, and are graphs of velocity vs. axial location along the length of the filter.

Figure 47:
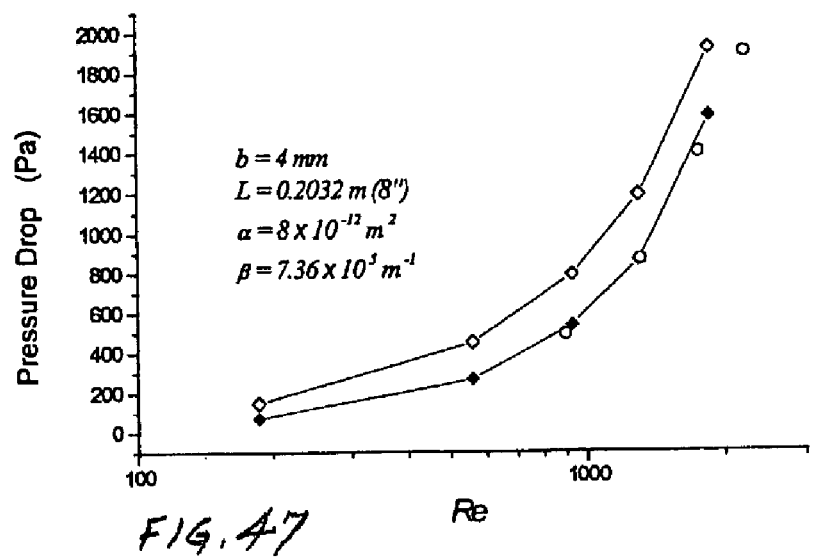

FIG. 47 is a graph of pressure drop vs. Reynolds number.

FIGS. 48–53 are graphs of fractional particle number collection efficiency vs. particle diameter.

Figure 54:
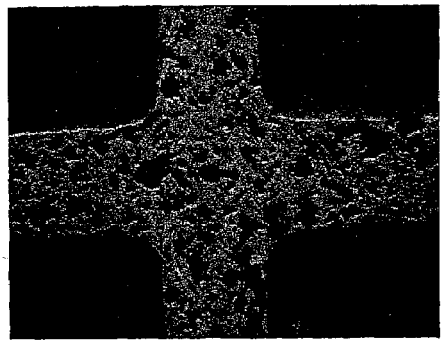

FIG. 54 is a cross-sectional microphotograph, at 50× (times) magnification, view of a monolithic cordierite diesel particulate filter.

Figure 55:
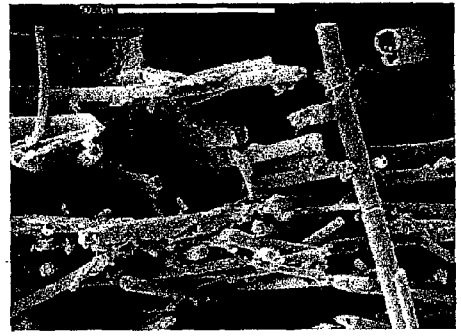

FIG. 55 is a cross-section microphotograph, at 500× magnification, of a silicon carbide coated alumina fiber diesel particulate filter.

Figure 2:
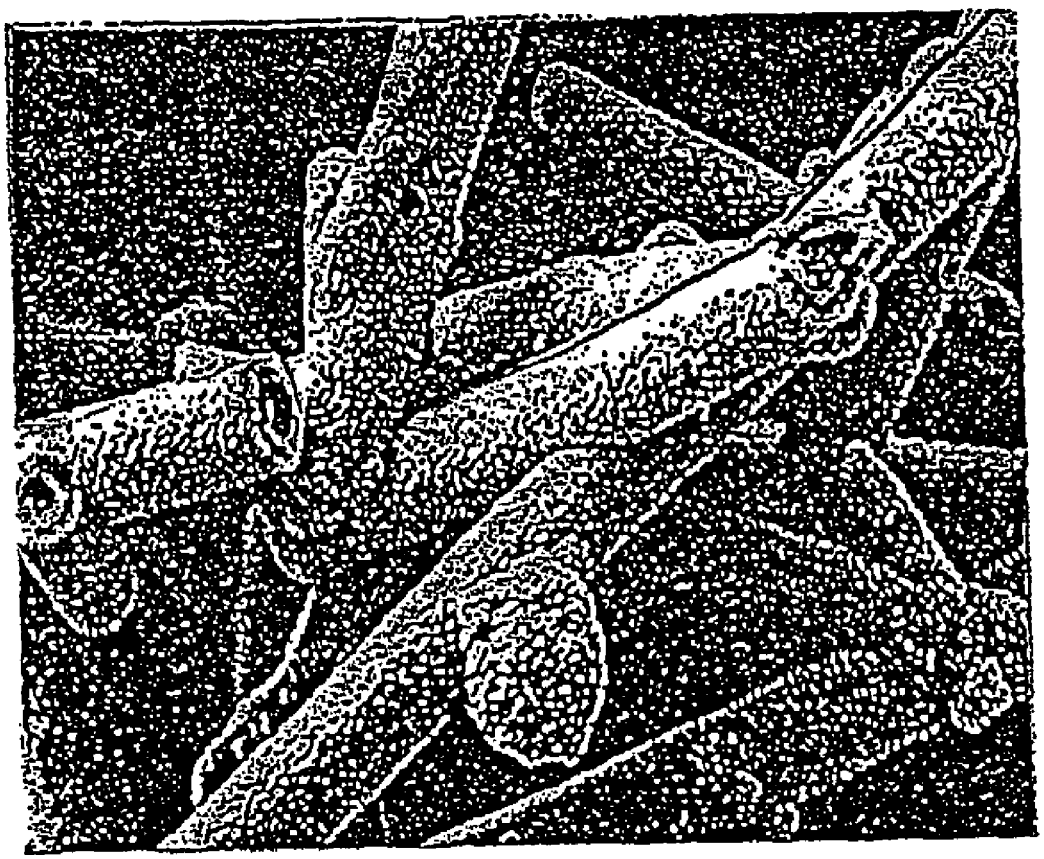
Figure 56:

FIG. 56 is a microphotograph, at 1000× magnification, of a fibrous structure coated to a rough nodular textured coating, like FIG. 2.

Figure 57:
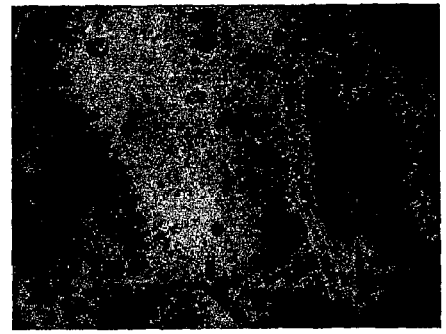

FIG. 57 shows a microphotograph, at 500× magnification, of a hybrid fibrous granular filter media with dendrites created using a CVI process similar to that disclosed in section I but with accelerated nucleation.

Figure 58:

FIG. 58 is a microphotograph, at 750× magnification, of a sol-gel hybrid fibrous-granular filter structure.

Figure 59:
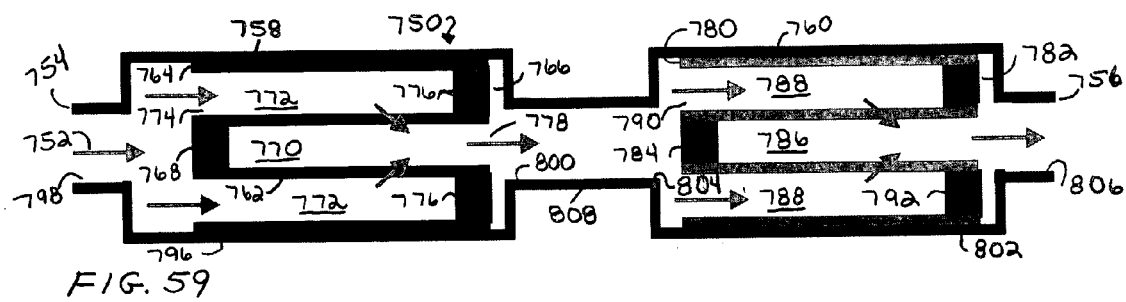

FIG. 59 schematically illustrates a filter system.

Figure 60:
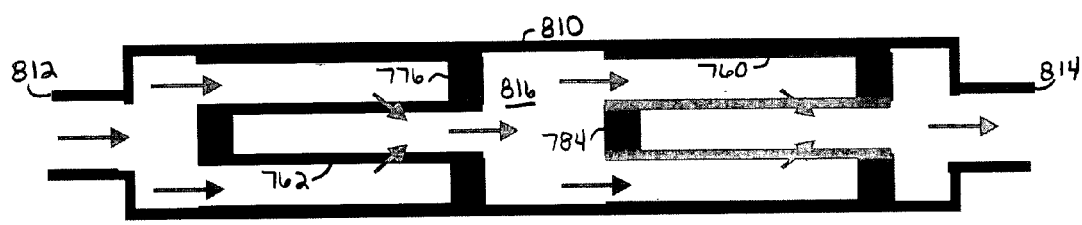

FIG. 60 is like FIG. 59 and shows another embodiment.

Figure 61:
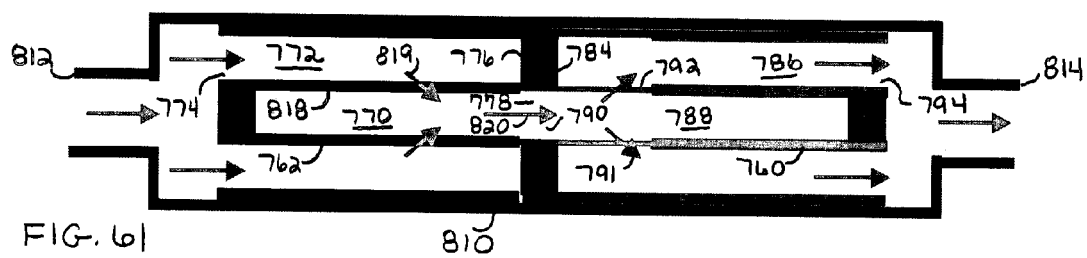

FIG. 61 is like FIG. 60 and shows another embodiment.

DETAILED DESCRIPTION

Section I—U.S. Pat. No. 6,582,490

The following description is taken from above noted U.S. Pat. No. 6,582,490 (the '490 patent).

Figure 1:
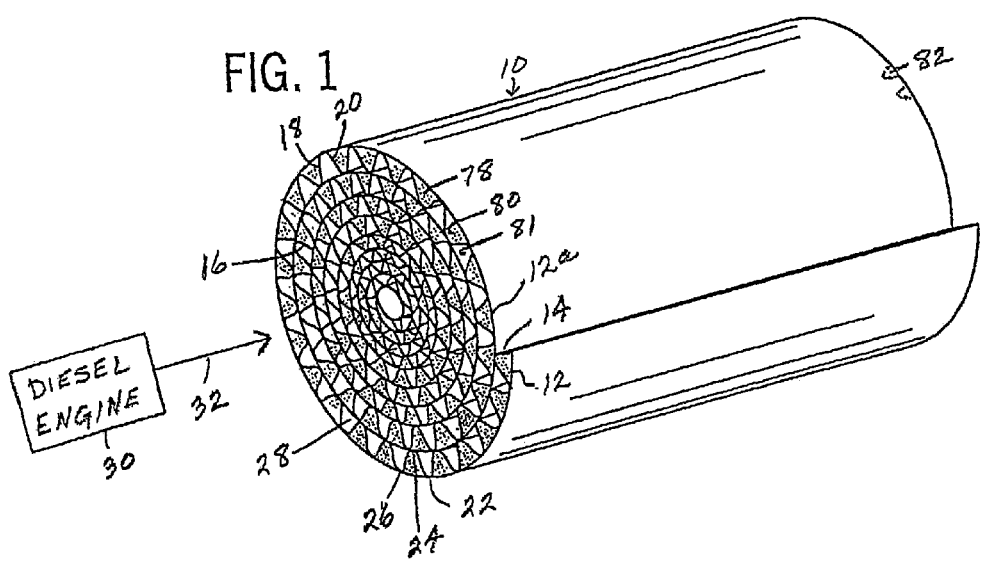

As noted in the '490 patent, description of FIGS. 1 and 2 is taken from the noted '006 patent.

In carrying out the '006 invention, a slurry is initially produced consisting of ceramic fibers, organic fibers, a thermoplastic binder, and a liquid carrier, preferably water.

The ceramic fibers are composed of a material that can withstand temperatures up to about 1200° C. and can take the form of alumina, aluminosilicate, aluminoborosilicate, mullite, and the like. The ceramic fibers have a diameter generally in the range of 1 to 20 microns, and preferably about 2 to 7 microns, and have a length in the range of 0.1 to 10 mm. In general, a length to diameter ratio greater than 100 is desired. On a solids basis, the ceramic fibers generally comprise from 50% to 80% by weight of the slurry and preferably about 70% to 80%. The ceramic fiber is preferably a high purity alumina, such as Saffil, containing less than 5% silica and other impurities.

The organic fibers can be natural fibers, such as wood fibers or hemp, or can be synthetic fibers, such as nylon, rayon, polyester, polypropylene, polyethylene, aramid, acrylic, and the like. On a solids basis, the organic fibers comprise from about 10% to 50% by weight solids of the slurry, and preferably from 15% to 25%. In a preferred form of the parent invention, the organic component can consist of a combination of about 10% to 15% by weight of wood pulp fibers and 10% to 15% by weight of synthetic aramid fibers, such as poly-paraphenylene terephthalamide (KEVLAR®). The wood pulp fibers, such as northern softwood fibers, improve the wet web strength of the sheet as it is formed on the papermaking machine.

The synthetic organic fiber component is preferably a highly refined or fibrillated type, such as KEVLAR® wet pulp, and provides mechanical entangling of the ceramic fibers and significantly improves the resistance of the sheet to cutting and tearing allowing it to be pleated or folded without damage. An organic component such as KEVLAR® maintains its integrity at elevated temperatures, required to cure thermosetting resin binders that may be subsequently added. KEVLAR® fibers also char to a high carbon content in an inert atmosphere which is beneficial in one of the methods in carrying out the '006 invention.

The thermoplastic binder is preferably a water soluble latex, such as an acrylic latex, HYCAR® 26138 (BF Goodrich), or the like, and is employed in the slurry in an amount of 2% to 20% by weight of solids, and preferably in the range of 2% to 10%. The thermoplastic binder has a glass transition temperature above normal ambient temperature, 25° C. or greater, and provides flexibility so that the sheet can be subsequently formed into a three-dimensional configuration. In addition, it may be desirable to add a pH control agent to the slurry to reduce the pH of the aqueous slurry, so that the latex will more readily attach to the fibers. A typical material is alum (ammonium aluminum sulfate) although other materials may be, used to produce a pH of about 5.5 to 6.5.

The amount of water used in the slurry is not critical and should be such that it provides the slurry with a consistency where it can be readily fed from a conventional headbox of a papermaking machine onto a porous moving belt or support in a conventional manner to provide a thin sheet or web. The sheet can be vacuum dried on the porous belt and then subsequently heat dried to remove the remaining water or carrier. The resulting dried sheet consists of haphazardly arranged ceramic and organic fibers bonded by the thermoplastic resin. The dried sheet is flexible and can be folded or deformed and has a porosity generally in the range of 80% to 95% with a mean flow pore diameter of about 10 to 15 microns. The sheet generally has a weight of about 125 to 175 grams per square meter and a thickness of about 0.75 to 1.0 mm. The tensile strength of the dried sheet is greater than 1500 kPa which is suitable for high speed pleating or corrugating processes.

The dried sheet or web can then be formed into any desired three-dimensional article suitable for a filter. The preferred configuration is that of a spirally wound element composed of alternate flat and pleated sections, thus providing a honey-comb structure. More specifically, a first section of the dried sheet is folded or scored to provide a plurality of parallel pleats or corrugations. Alternately, the section can be formed into sinusoidal, rather than angular pleats. In the preferred method, the pleats in cross section define equilateral triangles.

The formed layer or section is then laminated to a flat sheet section and an inorganic, or mixed organic/inorganic, binder is applied to the tips of the folds or flutes to increase the bonding between the layers. The inorganic binder may take the form of a high viscosity, high solids suspension of colloidal alumina or aluminosilicate that provides the high temperature resistance required in the finished filter. The organic component in the binder may take the form of an acrylic latex, polyvinyl chloride, polyvinyl alcohol or starch. The organic component acts to increase the tack and surface adhesion of the adhesive.

As the two layers are laminated, the ends of the channels defined by the pleats or flutes at one edge of the pleated sheet are then sealed using a high temperature cement or sealant, such as an alumina complex that may contain particles of alumina or other high temperature material. The sealant may also contain a small amount of an organic material, such as an acrylic latex, polyvinyl chloride, polyvinyl alcohol or starch to improve tack and a surfactant to increase its wetting of the sheet.

The composite structure can then be wound in a spiral fashion to produce a green filter structure, as illustrated in FIG. 1, and the ends of the channels at the opposite edge of the pleated sheet are sealed in a similar manner to create opposing flow channels, thus forcing gas flow through the sheet material in the final product.

In accordance with the '006 invention, an intermediate binder is then applied to the green filter structure to increase its temperature stability. In one form of the '006 invention, a liquid, uncured, thermosetting resin is applied to the green structure, preferably by dipping the structure into the liquid. Various thermosetting resins can be employed as the intermediate binder, such as phenol formaldehyde, urea formaldehyde, epoxy, and the like. The intermediate binders are applied as a solvent solution, and it is preferred to use an uncured phenol formaldehyde resin in a 2% to 5% by weight solution in alcohol.

After application of the uncured thermosetting resin, the structure is air dried to remove the alcohol or carrier and then cured at a temperature of about 150° C. to 250° C. in order to fully cross-link the resin. The resulting structure is no longer thermo- plastic in nature, and has increased rigidity so it can be readily handled without deformation.

Following the application of the thermosetting resin, the structure is pyrolyzed in an inert or non-oxidizing atmosphere to fully reduce the organic components to carbon char. The inert atmosphere may be an atmosphere such as nitrogen, and the pyrolyzing is generally carried out at a temperature of about 900° C. to 1100° C. The carbon char acts as a binder to maintain the integrity of the filter structure which is relatively weak, but is temperature stable.

After removal of the organic components through pyrolyzation, a coating of silicon carbide is applied to the structure using a conventional chemical vapor deposition process. The deposition is accomplished in near vacuum at an elevated temperature of about 100° C. The vapor deposition process is a conventional type, as described in Vapor Deposition, edited by Powell, C. F., J. H. Oxley, & J. M. Blocker, Wiley, New York (1966).

The resulting structure is a composite of haphazardly arranged ceramic fibers, inorganic binder and residual carbon char with a silicon carbide coating that fully covers the fibers, binders and intersections between the fibers. A photomicrograph of the final structure is illustrated in FIG. 2. The vapor deposition of silicon carbide is applied to the entire matrix and is controlled to a thickness of about 0.5 to 1.5 microns. With this thickness, the porosity of the sheet is maintained and is typically about 80% void or greater. Minimal blocking or clogging of the pores in the sheet occurs due to the vapor deposition of the silicon carbide.

The resulting composite filter structure consisting primarily of ceramic fibers and silicon carbide is stable at elevated temperatures of about 650° C. to 700° C. needed to regenerate a filter contaminated with particulate material.

The silicon carbide coating rigidifies the structure, so that the geometry of the structure from the green state is maintained.

In order to minimize flow restriction through the filter, it is preferred that the pleats have a generally equilateral triangle cross section, with the length of a side of the triangle being in the range of 2 to 6 mm and a channel length in the range of 7 to 42 cm. The efficiency and restriction of the complete structure can also be tailored by leaving some portion of the defined channels unsealed or similarly leaving a larger orifice or channel open in the center of the wound structure. A central core may also provide beneficial for a mechanical support mechanism.

The filter media has a degree of texture that is opposed to the flow direction and can be further textured with the addition of inorganic cement material on its outer diameter, thus, improving friction between the filter and its mounting system which is beneficial at high pressure drops encountered as the filter contaminates accumulate.

The filter structure is also suitable for the addition of catalytic materials to improve the oxidation of collected contaminants or reaction upon gaseous species.

The composite ceramic filter of the invention has a high porosity, generally above 80% voids, which reduces engine restriction.

The fibrous filter has improved particle capture efficiency and has increas- ed contaminant holding ability due to the high void content, increased surface area and depth loading. In addition, the filter has high temperature resistance and resilience because of its composite nature.

While FIG. 1 shows the filter as a spirally wound honeycomb structure, the filter can also take other configurations, such as alternate stacked flat and corrugated sheets.

The following examples illustrate the method of producing the composite ceramic filter.

EXAMPLE I 10.5 grams of alumina fibers having an average fiber diameter of 3 microns and length of about 0.01 to 10.0 mm was dispersed in 5000 grams of water to form a slurry or suspension. 1.8 grams of wood fibers were mixed along with 1.8 grams of KEVLAR® wet-pulp fibers in 1000 grams of water in a Waring blender and then added to the alumina fiber. Also added to the suspension was 2 grams of an acrylic latex binder containing 50% solids. The pH was reduced to 6.0 with the addition of aqueous alum. The suspension was further diluted with 15,000 grams of water. The slurry was then formed into a paper-like sheet using a conventional 12"×12" square papermaking mold machine. The sheet was dried at a temperature of 150° C. and the resulting dried sheet had a porosity of 90%, a mean flow pore diameter of 12 microns, a weight of 150 grams per square meter, and a thickness of 0.95 mm.

Multiple sheets of paper were cut into sections each having a width size of 7.5 cm. One strip was corrugated or pleated on a conventional pleating/corrugating machine, and the peaks of the corrugations were adhered to a flat strip section with an adhesive consisting of a high viscosity colloidal suspension of alumina and latex adhesive. Ends of the channels defined by the flutes at one edge of the corrugated sheet were then sealed by an alumina complex cement. The combined layers were then rolled into spiral form and the ends of the channels at the opposite edge of the corrugated sheet were similarly sealed to create opposing flow channels.

The green spirally wound filter structure was then dipped into a 2% by weight solution of phenol formaldehyde resin in alcohol. The structure was then air dried to evaporate the solvent and heated to a temperature of 175° C. to fully cross-link the resin.

The filter structure containing the thermosetting resin coating was then slowly heated to a temperature 1000° C. in a nitrogen atmosphere for a period of 72 hours causing the organic components to convert to carbon char.

Following the pyrolyzation, a coating of silicon carbide was applied to the structure using a conventional chemical vapor deposition process. In this process, the filter structure was maintained at near vacuum and a temperature of about 1000° C. Through this process a coating of silicon carbide having an average thickness of 0.8 microns was applied to the fibrous structure of the filter.

The resulting filter structure had a porosity of 90% and consisted of haphazardly arranged ceramic fibers, inorganic binders, carbon char and a coating of silicon carbide.

EXAMPLE II

A green filter structure was prepared as described in Example I. The filter structure was then dipped in a 7% by weight colloidal suspension of alumina and the part was then air dried and then heated to a temperature of 250° C. to remove all solvents and dehydrate water. Subsequently, the part was fired at a temperature of 1100° C. in air to remove all the organic components, thus resulting in a structure consisting primarily of haphazardly arranged ceramic fibers and inorganic binders.

The filter structure was then subjected to a chemical vapor deposition process to coat the fibers and the intersections between fibers with a coating of silicon carbide, as described in Example 1.

The '490 patent provides a green uncured pre-form 10, FIG. 1, for an exhaust aftertreatment control filter. The pre-form includes first and second sheets 12 and 14 of regenerable filter material, as described above. Sheet 14 has a plurality of pleats such as 16 defined by wall segments 18, 20, etc. extending in zig-zag manner between pleat tips 22, 24, 26, etc., FIGS. 1, 3, at axially extending bend lines. The pleat tips such as 22 and 26 on one side of sheet 14 are in contiguous relation with sheet 12 and preferably bonded thereto with an inorganic binder, as above, and define axial flow channels such as 28. Sheets 12 and 14 are preferably, though not necessarily, wound or rolled into a spiral, FIG. 1. In a spiral-wound or other multilayer stack, the pleat tips such as 24 on the other side of sheet 14 engage sheet 12 of the next layer, for example as shown at 12a, FIG. 3. In one embodiment, the green uncured pre-form is then supplied to a second stage manufacturer for curing and rigidization. The pre-form is cured and rigidized, as noted above, to an exhaust aftertreatment filter for filtering engine exhaust from an engine such diesel engine 30 flowing axially therethrough at 32. The cured and rigidized filter is regenerable by heat to burn-off contaminant particulate collected from the engine exhaust. The pre-form may be rigidized with sol-gel, chemical vapor infiltration, ceramic bond phase, silicon carbide, or in other suitable manner.

The noted flow channels such as 28 of the pre-form have a lateral cross-sectional shape having two adjacent included angles each greater than 45° and less than 75°. Sheets 12 and 14, including wall segments 18 and 20, have a thickness less than 0.8 mm, a porosity greater than 80%, and an extension b between pleat tips less than 10 mm. In the preferred embodiment, the noted thickness is less than 0.5 mm, the noted porosity is greater than 85%, and the noted extension or length b is less than 6 mm.

The noted two adjacent included angles are provided by a first angle 34, FIG. 3, between first sheet 12 and wall segment 18 of second sheet 14, and a second angle 36 between first sheet 12 and second wall segment 20 of second sheet 14. As noted above, each of angles 34 and 36 is greater than 45° and less than 75°. In the embodiment of FIG. 3, the noted lateral cross-sectional shape of flow channel 28 consists of three pleat tips 22, 24, 26 and three included angles 34, 36, 38. Third angle 38 is between first and second wall segments 18 and 20. In preferred form, the lateral cross-sectional shape of flow channel 28 is an isosceles triangle wherein $$45° < \theta < 75°$$

$$0.5 \text{ mm} < \frac{2b \cdot \sin\frac{1}{2}\theta \cdot \cos\frac{1}{2}\theta}{1 + \sin\frac{1}{2}\theta} < 2.9 \text{ mm}$$

where $\theta$ is angle 38 between wall segments 18 and 20, and b is the noted extension or length of each of wall segment 20 between pleat tips 26 and 24 and wall segment 18 between pleat tips 22 and 24, as measured along the inside dimension of the wall, FIGS. 3, 4.

FIG. 5 shows an alternate embodiment and uses like reference numerals from above where appropriate to facilitate understanding. In FIG. 5, the lateral cross-sectional shape of flow channels such as 46 consists of four pleat tips 48, 50, 52, 54 and four included angles 56, 58, 60, 62. Each of first and second angles 56 and 58 is greater than 45° and less than 75°. Each of third and fourth angles 60 and 62 is greater than 90°. The lateral cross-sectional shape is a trapezoid having first and second distally opposite sides 64 and 66 provided by wall segments 68 and 70 of pleats 20 and slanted towards each other. The trapezoid has distally opposite substantially parallel major and minor bases 72 and 74 extending laterally between sides 64 and 66. Major base 72 is longer than minor base 74. Wall segment 68 of second sheet 42 provides side 64 of the trapezoid. Wall segment 70 of second sheet 42 provides side 66 of the trapezoid. First sheet 40 provides major base 72 of the trapezoid. Second sheet 42 has a truncated wall segment 76 spanning first and second wall segments 68 and 70 and providing minor base 74 of the trapezoid. The ratio of the length of minor base 74 to the length of major base 72 is less than 0.27.

The flow channel lateral cross-sectional trapezoid shape of FIG. 5 consists of four walls, namely a first wall provided by first sheet 40 along major base 72, a second wall provided by first wall segment 68 of second sheet 42 along first side 64, a third wall provided by truncated wall segment 76 of second sheet 42 along minor base 74 and by a section of the next layer 18 of the first sheet at 40a in the spiral pattern along minor base 74, and a fourth wall provided by the second wall segment 70 of second sheet 42 along the noted second side 66. The noted first, second and fourth walls 72, 64, 66 have a single sheet thickness. The noted third wall at 74 has a double sheet thickness. The single sheet thickness of the first wall at 72 provided by first sheet 40 is less than 0.8 mm. The single sheet thickness of the second wall 64 provided by second sheet 42 at wall segment 68 is less than 0.8 mm. The double sheet thickness of the third wall 74 provided by first and second sheets 40 and 42 at 40a and 76 is less than 1.6 mm. The single sheet thickness of the fourth wall 66 provided by second sheet 42 at wall segment 70 is less than 0.8 mm. Walls 72 and 64 meet at pleat tip 48 and define angle 56. Walls 64 and 74 meet at pleat tip 52 and define angle 60. Walls 74 and 66 meet at pleat tip 54 and define angle 62. Walls 66 and 72 meet at pleat tip 50 and define angle 58. The length or height of wall 64 along wall segment 68 between pleat tips 48 and 52 is less than 10 mm, and preferably less than 6 mm. The length of wall 66 along wall segment 70 between pleat tips 50 and 54 is less than 10 mm, and preferably less than 6 mm.

In the preferred form of the embodiment of FIG. 4, $$45° < \theta < 75°,$$

$$0.5 \text{ mm} < \frac{2b \cdot \left(w - b \cdot \sin\frac{1}{2}\theta\right) \cdot \cos\frac{1}{2}\theta}{b + w - b \cdot \sin\frac{1}{2}\theta} < 2.9 \text{ mm}$$

where θ is the included angle at the intersection of projections of wall segments 68 and 70, b is the length of each of trapezoid sides 64 and 66 as measured along the inside dimension, FIGS. 5, 6, and w is the length of major base 72 as measured along the inside dimension, FIGS. 5, 6.

In one embodiment the noted wall segments are alternately sealed to each other by a first upstream set of plugs such as 78, FIG. 1, to define a first set of flow channels 80 closed by plugs 78, and a second set of flow channels 81 interdigitated with first set of flow channels 80 and having open upstream ends. The wall segments are alternately sealed to each other by a second downstream set of plugs such as shown in dashed line at 82, and as is known, closing the second set of flow channels 81. The first set of flow channels 80 have open downstream ends. This forces the exhaust from diesel engine 12 to flow through the wall segments of the media, i.e. to flow into the open upstream ends of flow channels 81, and then cross through the filter media wall segments, and then flow through the open downstream ends of flow channels 80. In an alternate embodiment, catalyst material may be disposed on the filter media, as noted above, with or without the noted plugging to provide the noted catalytic reaction.

FIG. 7 illustrates forming apparatus for the above noted pre-form. First and second star gears 83 and 84 each have a plurality of teeth 85 and 86 interdigitated with a plurality of roots 88 and 90 therebetween. The gears rotate in intermeshed relation with the tooth of one gear in the root of the other. Gear 83 rotates clockwise as shown at arrow 92 about rotation axis 94. Gear 84 rotates counterclockwise as shown at arrow 96 about rotation axis 98. Gears 83 and 84 pass second sheet 42 therebetween, and gather and fold second sheet 42 along crease lines at pleat tips 26, 28, 30, etc., which crease lines provide the noted axially extending bend lines. Each root such as 90 has a given arcuate length along an inner hub surface 100 spanning between and separating a respective pair of teeth such as 86 and 102 having sides 104 and 106 extending generally radially outwardly from opposite arcuate ends of spanning root hub surface 100. Side 104 meets spanning root hub surface 100 at a first angle 108 at a first junction point 110. Side 106 meets spanning root hub surface 100 at the second arcuate end thereof at a second angle 112 at a second junction point 114. First and second junction points 110 and 114 are spaced from each other by the noted given arcuate length of spanning root hub surface 100. Each of angles 108 and 112 is greater than 90°.

Each tooth of at least one of the gears has an outer end with a pointed tip 116 extending into a respective root and spaced from first junction point 110 by a first triangular shaped gap, and spaced from second junction point 114 by a second triangular shaped gap. In one preferred embodiment, the teeth of each of the gears have pointed tips 116 and 118 at the outer ends of the teeth. In another embodiment, each tooth of at least one of the gears has an outer end which is truncated as shown in dashed line at 120, to have first and second pointed tips 122 and 124 extending into a respective root. In a further embodiment, the teeth of the other gear may also be truncated as shown at dashed line 126, with first and second pointed tips 128 and 130 extending into a respective root.

The noted given arcuate length of spanning root hub surface 100 defines minor base 74. Sides 104 and 106 of the teeth diverge from each other as they extend radially outwardly from spanning root hub surface 100 and are spaced from each other at their outer ends along a second given arcuate length defining major base 72. In preferred form, the sides of the teeth, for example sides 132 and 134 of tooth 85, bow convexly as they extend from the outer end of the tooth generally radially inwardly to respective roots spaced on opposite sides of the tooth.

A pair of parallel guide bars 140 and 142 are spaced on opposite sides of the intermeshing of gears 83 and 84. Bars 140 and 142 extend parallel to the direction of travel 144 of second sheet 42 through the gears. The bars are spaced from each other by a gap 146 less than 10 mm along a direction perpendicular to travel direction 144 and perpendicular to the gear rotation axes 94, 98. The bars receive pleats 20 and engage pleat tips 26, 28, 30, etc. Sheet 42 is fed forwardly, leftwardly in FIG. 7, through the gears from an inlet region 148 to an outlet region 150. The guide bars have respective upstream ends 152, 154 at the gears, and downstream ends 156 and 158 at outlet region 150 and spaced leftwardly from the gears. It is preferred that upstream ends 152 and 154 of the guide bars be upstream of rotation axes 94 and 98, i.e. rightwardly of the rotation axes in FIG. 7. In the orientation of FIG. 7, the guide bars are spaced behind the gears, as illustrated in dashed line. The forming apparatus provides the preferred method of configuring and shaping the noted pre-form. In spiral wound configurations, the noted cross-sectional specifications of the channels are not met in the first several layers of pleats starting at the center.

It is recognized that various equivalents, alternatives, and modifications are possible. For example, spiral wound, annular, concentric, and so on, include shapes such as cylindrical, oval, racetrack shaped, and the like.

Section II—International Patent Application No. PCT/US02/21333

The following description is taken from above noted International Patent Application No. PCT/US02/21333 (the '333 application).

The '333 invention provides a high strength and durable refractory ceramic fiber-based paper substrate that can be used for wall-flow (e.g., filtering) and/or flow-through (e.g., catalyzing) applications. The fiber-based paper substrates of the invention are typically characterized by one or more of the following characteristics: low density, high strength, low back pressure (i.e., high percentage of porosity), high trapping efficiency, high thermal stability, and high chemical stability. For filtering applications, the present fiber-based paper substrate can exhibit above 70% porosity and up to in the range of about 80% to 95% porosity. Preferably, the present fiber-based paper substrates have a low glass content (typically glass particles), for example, of less than about 5 weight percent and preferably less than about 2 weight percent and most preferably less than about 1 weight percent. It is desirable for the present fiber-based paper substrate to have a low alkaline metal content of, for example, less than about 2% by weight, preferably less than about 0.5 weight %, and more preferably less than about 0.25 weight %. The low glass content and the low alkaline metal content impart better chemical stability and thermal stability to the fiber-based paper substrates. Thermal cycling of glass in the contact with ceramic fibers causes the glass to attack the ceramic fibers, resulting in a loss of strength of the ceramic fibers. In addition to being useful as a filter element and/or a catalyst support, the present invention can also be compatible with regeneration technologies such as, for example, microwave or direct heating, which are used to promote the combustion of carbon trapped in the substrate (e.g., filtered soot particles) or residue carbon on exposed surfaces of the substrate.

In general, one embodiment of the method of making a fiber-based paper substrate, according to the '333 invention, includes rigidifying an organic binder-containing "green" ceramic fiber-based paper substrate by impregnating the green substrate at least once, with an impregnating dispersion or sol, and then drying, calcining and firing the impregnated substrate. The drying, calcining and firing steps can be accomplished using one heating cycle or multiple heating cycles. The resulting rigidified fiber-based paper substrate can be further strengthened, if desired, by repeating the above procedure with the once-rigidified substrate as many time as necessary to achieve the strength desired.

The green ceramic fiber paper-based substrate is formed from ceramic fiber paper. This paper can be made using conventional paper making processes and equipment. In a typical process, an aqueous or solvent dispersion of ceramic fibers and other components is prepared in a solution mixer or blender. The other components include inorganic and/or organic binders, and optional materials including organic fibers, surfactants, clays, defoamers, and other particulate materials. While fiber breakage normally occurs during the mixing, it is desired to avoid excessive fiber breakage to obtain papers with higher tear strengths. In this respect it is preferred that the aspect ratio of the fibers in the paper be about 50 or greater and preferably about 100 or greater. The extent of fiber breakage, and hence, the average aspect ratio of the fibers, can vary with the time and energy of mixing, with the properties of the fibers (friability and strength), the nature of the mixing (blade conformation, size, speed) and the viscosity of the pulp mixture. The exact parameters are determined experimentally, and this process is well known to those skilled in the art of paper making.

In one experimental practice, the pulp slurry is sheared with a blender such as a Waring blender (Dynamics Corporation of America, New Hartford, Conn.) for 30 to 90 seconds to produce a uniform mixture of the ceramic and organic fibers in the slurry prior to paper making. Organic fibers and binders, such as a latex binder, are preferably included to impart flexibility and handling strength to the sheet. A coagulating agent is added to the slurry to coagulate organic and/or inorganic binders and cause attachment of the organic and/or inorganic binders to the ceramic and organic fibers. Immediately after coagulation, the slurry is wet laid onto a fine screen or felt. The water or solvent is removed e.g., by pressing or vacuuming, leaving a sheet of entangled fibers and binders. The pressed paper is then dried, e.g. in ovens between about 50–150° C., and the polymer reinforced green ceramic paper sheet is wound into rolls for further processing.

The weight of the polymer reinforced green ceramic paper sheet is, preferably, in the range of from about 125 grams per square meter (g/m2) to about 175 g/m2 and the thickness is in the range of from about 0.75 mm to about 1.1 mm. Preferably, the tensile strength of the paper is also about 1500 kPa or greater, and after firing, the porosity is typically above 70% porosity and can be up to in the range of from about 80% to about 95% with a mean flow pore diameter in the range of from about 10 to about 15 micrometers as measured by porosymmetry.

Preferably, the ceramic fibers for the present invention are made with refractory materials so that they remain virtually unchanged in performance after being heated to a temperature of 1200° C. for brief periods of time. It can be desirable for the ceramic fibers to be included in the slurry in an amount in the range of from about 50% to about 80% by weight, and preferably in the range of from about 70% to about 80% by weight, of the solids in the slurry. It can be desirable for the diameters of the ceramic fibers to be in the range of from about 1 micron to about 25 microns. Diameters in the range of from about 2 microns to about 8 microns are preferred. The length of the ceramic fibers can vary, but in general, a length to diameter ratio of greater than about 100 is preferred in order to produce papers with higher tear strengths. Ceramic fibers of different lengths and diameters, and compositions can be advantageously blended to also produce high strength, uniform papers.

Suitable ceramic fibers can be formed using refractory materials including, for example, metal oxides, metal nitrides, metal carbides or combinations thereof. It is desirable for the ceramic fibers to at least include, and preferably are mostly or completely, fibers formed from metal oxides which include alumina, alumina-silica, alumina-boria-silica, silica, zirconia, zirconia-silica, titania, titania-silica, rare earth oxides, and combinations thereof. It can also be desirable for at least some or all of the ceramic fibers included in the slurry to be at least partially coated with or at least partially contain oxidation catalyst materials. In addition, it can be desirable to at least partially coat the ceramic fibers with such a catalyst material after the fibers are put in paper form. The ceramic fibers in the paper can also comprise catalyst material(s). Such catalyst materials can include, for example, ceria; ceria-zirconia; first transition series oxides; perovskites, such as titanates and rare earth cobalt or manganese oxides; and other materials known to be active oxidation catalysts for the oxidation of diesel soot.

Organic materials such as, for example, organic fibers are, preferably, included in the slurry used to make the ceramic paper. Suitable organic fibers can include, for example, those formed from acrylic, rayon, cellulose, polyester, nylon, KEVLAR®, and combinations thereof. In a preferred embodiment, cellulose fibers and/or fibrillated synthetic organic fibers are included in a combined total amount in the range of from about 10% to about 15% by weight of the solids in the slurry. Cellulose fibers include, for example, long-length northern softwood fibers or synthetic cellulose fibers. Fibrillated organic fibers include, for example, fibrillated KEVLAR® fibers (E.I. du Pont de Nemours and Company, Wilmington, Del.) and fibrillated polyolefin fibers such as FYBREL® fibers (Mitsui Chemicals America, Incorporated, Purchase, N.Y.). Cellulose fibers are capable of hydrogen bonding and the addition of these fibers can improve the wet web strength of the green paper as it is formed on the paper making machine. The fibrillated fibers, preferably having a diameter similar to the ceramic fibers, provide added mechanical integrity to the paper. The fibrillated fibers typically have a kinked structure. It is believed that the kinked structure of the fibrillated fibers causes the fibrillated fibers to become mechanically entangled with the ceramic fibers, thereby significantly increasing the resistance of the paper to cutting or tearing. The additional structural integrity resulting from the use of fibrillated fibers is believed to enable the paper to be folded or pleated while maintaining the integrity of the fiber paper. Additionally, the high temperature resistance of KEVLAR® can allow the paper to maintain its integrity at higher temperatures, which can allow the curing of additional inorganic binders.

The green ceramic paper may include an organic binder to impart flexibility and handling strength to the green paper. The organic binder can be a latex, thermoplastic fibers or a combination thereof. Though, latex binder materials are preferred. Preferably, a thermoplastic latex binder is added to the ceramic fiber slurry in an amount in the range of from about 2% to about 10% by weight of the solids content of the slurry. Suitable organic binders include those composed of polymers that have a glass transition temperature above normal ambient temperature, e.g., about 20° C. The organic binder imparts a degree of thermoplastic character to the green ceramic fiber paper. Such thermoplasticity is desired for convenient forming (e.g., thermoforming) of pleats, creases and bends in the green paper without breakage, and to retain the shape of the formed articles after forming. Thermoplastic organic binder materials include acrylics, styrene-butadiene, butadiene, polyvinylchloride, acrylonitrile-butadiene and polyvinylacetate. Acrylic binder materials are preferred for their ability to burn without creating excessive noxious by-products. Suitable latex materials are commercially available from suppliers such as B.F. Goodrich of Cleveland, Ohio, under the HYCAR tradename.

The green paper may be impregnated with inorganic binder material such as, for example, ceramic precursors, ceramic particles (e.g., powders, fiber segments, flakes, etc.) or both, before being formed into a green ceramic fiber-based paper substrate. The inorganic binder material can be added into the paper by dipping the paper into a solution made with the inorganic binder material (e.g., an impregnating sol) and/or imbedding the inorganic binder material using ultrasonic impregnation. When the paper is dipped in such a solution, the paper is thereafter dried. This drying process can be partially or completely eliminated when ultrasonic impregnation is used in addition to or instead of the solution dipping process. Once the inorganic binder material is in the paper, it is believed that the ultrasonically impregnated paper may be further processed as if it were a dried, sol impregnated paper. It is also believed that a combination of solution dipping and ultrasonic impregnation can be used. Before and/or after the inorganic binder material is applied throughout the green paper, additional inorganic binder material can be applied to the green paper in a pattern, for reasons such as those discussed below. Alternatively, it may be desirable for the inorganic binder material to be applied to the green paper in a pattern, instead of being applied throughout the green paper.

It is believed that instead of, or in addition to, using an impregnation process, inorganic binder material such as, for example, ceramic precursors, ceramic particles (e.g., powders, fiber segments, flakes, etc.) or both, may be included in the paper slurry in order to provide additional strength to the ceramic paper and/or to alter the pore structure of the paper. Ceramic precursors are, generally, materials that will form a high temperature ceramic after being fired. Suitable ceramic precursors include, for example, metal oxy-hydroxides, low solubility metal salts and low solubility metal complexes that are low in alkali metal content. Suitable ceramic particles include powder of, for example, metal oxides, metal nitrides, metal borides and metal carbides. Representative examples of ceramic precursors that may be suitable include boehmite (aluminum oxy-hydroxide), hydrated clays, aluminum tri-hydrate, iron oxy-hydroxide, and oxalate complexes such as calcium oxalate, magnesium oxalate, copper oxalate and rare earth oxalate. Representative examples of ceramic particles that may be suitable include powders of aluminas, alumino-silicates, silicon carbide, silicon nitride, silica, titanium nitride, titanium boride, boron nitride, zirconia, ceria, iron oxide, magnesia, rare earth oxides and aluminates, barium aluminate, calcium aluminate, zirconium phosphate, and rare earth phosphates. Certain of these additives may be used to introduce catalytic activity or microwave receptivity to the resulting ceramic fiber-based paper substrate. For example, metal carbides (e.g., silicon carbide) can be used to introduce microwave receptivity. In addition, for example, a ceria-zirconia alloy and iron oxide can be used to introduce catalytic activity. Large amounts of these additives can lower the tensile strength and the flexibility of the green ceramic fiber paper, thereby making it difficult to high speed wind and pleat the green ceramic paper. In addition, in large amounts these additives can lower the filtering capability of the rigidified ceramic fiber-based paper substrate, by reducing the porosity and/or the average pore size of the ceramic paper. In general, it is believed that these ceramic precursors and ceramic particles can be added in amounts up to about 30%, and possibly up to about 40%, by weight of the ceramic solids in the paper slurry.

It can be desirable to add chemical agents to induce coagulation of the organic binder and cause attachment of the organic binder to the fibers and particles in the slurry. When a latex material is used as the organic binder, it is desirable to add chemical agents to induce coagulation of the latex binder and cause attachment of the latex material to the fibers and particles in the slurry. For example, with a latex binder, ammonium aluminum sulfate can be used as a coagulating chemical agent. The ammonium aluminum sulfate lowers the pH of the slurry and provides a polycationic metal complex that destabilizes anionic particle suspensions. Other coagulating chemical agents that can be useful include polyanionic complexes, anionic and cationic polymers, and other metal salts or complexes known to form polynuclear cationic species in solution.

The green ceramic paper can be formed into a green ceramic fiber-based paper substrate, or other three dimensional, polymer reinforced, green, ceramic fiber body, by conventional processes. Such processes can include, for example, pleating, corrugating, rolling, laminating, stacking, and combinations thereof. For examples of prior ceramic fiber-based filter substrates and methods of their manufacture see U.S. Pat. Nos. 3,112,184, 3,899,555, 4,608,361, 4,652,286, 4,718,926, 5,194,078 and 5,322,537. In one embodiment of the '333 invention, a sheet of polymer reinforced, green, ceramic fiber paper is pleated to form a creased paper sheet having parallel creases or folds uniformly spaced and running the width of the green ceramic paper. This creased paper sheet is laminated to a second, flat polymer reinforced, green, ceramic fiber paper sheet of similar width to form a channeled paper laminate that defines a multitude of uniformly spaced tubular channels or pathways. The tubular channels are formed by the intersection of alternating creases of the creased paper sheet with the flat paper sheet. The tubular channels extend the width of the channeled paper laminate. The tubular channels can be triangularly-shaped, simi-circular-shaped or any other shape desired. The preferred tubular channels have an equilateral, triangular cross-section with rounded corners. It is believed that such a shape allows for maximum bonding in the channeled paper laminate while maximizing the exposed surface area of the substrate (i.e., the inside surface area of the tubular channels).

At the time of lamination, an inorganic adhesive or mixed inorganic/organic adhesive can be applied at the apex or ridge of the creases or other areas of contact between the two ceramic paper sheets to increase the strength of the bond of the flat sheet to the creased sheet. A high viscosity, high solids suspension of ceramic particles (e.g., powders, fiber segments, flakes, etc.) can be suitable such as, for example, a suspension of alumina, silicon carbide, or the like particles. An organic adhesive component such as, for example, a latex, vinyl or starch based adhesive can be added to increase the tack and adhesive characteristics of the ceramic particle adhesive. After drying, calcining and firing of the fiber-based paper substrate, the inorganic components of the adhesive remain and act to bond the laminated sheets of paper together.

The channeled paper laminate is then formed into a three-dimensional article so as to provide the fiber-based paper substrate, or other polymer reinforced, green, ceramic fiber body. Channeled paper laminates can be layered or stacked to produce a structure having the tubular channels in the laminates extending in a parallel fashion. In the formation of the channeled paper laminates, an inorganic adhesive or mixed inorganic/organic adhesive can be applied at the apex or ridge of the channels of each channeled paper laminate or at other areas of contact between adjacent laminates to increase the strength of the bond between the laminates. The overall shape of such a construction can be any three dimensional shape desired (e.g., cubic, prismatoidal, cylindrical, etc.). Likewise, the cross-section of such a construction can be any desired shape (e.g., square, rectangular, oval, trapezoidal, circular, etc.). The shape and orientation of the paper laminates and sheets used to assemble the fiber-based paper substrate can be chosen to effect the desired shape.

Referring to FIGS. 8 and 10, a preferred construction for a fiber-based paper wall-flow (i.e., filter) or flow-through substrate 210 of the '333 invention is one in which a channeled paper laminate 212 is wound either upon itself or upon a mandrel to produce a cylindrical shape having a somewhat, or substantially, circular or ellipsoidal cross section and a length or longitudinal direction generally perpendicular to its cross section. The final green ceramic fiber body 210 is preferably a spirally wound element having alternating flat paper sheets 214 and creased paper sheets 216. Such a circular or ellipsoidal cylindrically shaped body 210, compared to more angular shapes (e.g., cubic, etc.), can be relatively easier to manufacture and mount in a conventional metal housing or sleeve 217, using a suitable mounting material or mat 218. Even so, the '002 invention is not intended to be so limited and may include more angular-shaped substrate bodies. The resulting filter 219, using substrate 210, can then be attached into an exhaust system of a combustion device such as, for example, an internal combustion engine (e.g., vehicle engines, power generators, etc.), power plant, incinerator, etc. During the winding of the green channeled paper laminate 212, contacting green paper surfaces would likely form some degree of bonding between adjacent windings of the laminate 212. Preferably, an inorganic or mixed organic/inorganic adhesive is applied to the flat side of the laminate 212, to the creased side of the laminate 212, or to both sides, in order to strengthen the bond, or form a bond, between adjacent wraps of the laminate 212, during and after winding.

It is preferable that any adhesive used in the construction of the fiber-based paper substrate 210, or other polymer reinforced, green, ceramic fiber body, have an inorganic component that continues to act as an adhesive between adjacent surfaces of ceramic fiber paper, after removal of the organic component by calcining and firing. The inorganic component is preferably a high viscosity, high solids suspension of colloidal alumina or other refractory ceramic material. The adhesive can also include an organic adhesive component such as a latex, vinyl or starch polymer. The organic adhesive component can be advantageously used to increase the surface tack and adhesion of adjacent surfaces of ceramic fiber paper in the channeled paper laminate 212 and in the final construction of the ceramic fiber body 210.

Referring to FIGS. 9 and 10, in one embodiment of a wall-flow fiber-based paper substrate 10, according to the '002 invention, alternating ends 224 of adjacent tubular channels 226 in the wall-flow substrate 210 are each enclosed with a plug 227 to force exhaust gases to flow though the paper walls during, for example, a filtration operation. Thus, each channel 226 has an open end and a plugged end 224. The ends 224 of these channels 226 can be most easily plugged prior to or during the winding of the channeled paper laminate 212 to form the green substrate 210. Plugging can be accomplished by extruding, or otherwise applying, a plug precursor material into the channels 226 along one edge of the green laminate 212 and coating, or otherwise applying, the plug precursor material along the opposite edge of the green laminate 212 so as to fill the open crease in an area adjacent to the opposite edge of the laminate 212. The depth or width of the applied plug precursor material (i.e., the depth of the plug) must be sufficient to enable the resulting plug 227 to withstand the back pressure developed as exhaust gases flow through the paper walls of the final substrate 210. The minimum acceptable depth of the plug 227 will vary depending on such factors, for example, as the strength of the chosen plug material and the back pressure that builds-up during the particular application. In general, it can be desirable for the depth of the plug 227 to be about 0.5 cm or more and less than about 3 cm.

Suitable plug precursor materials can comprise a ceramic material and an organic polymer. In a preferred embodiment, the plug precursor composition can comprise a ceramic material, a ceramic precursor material, and an organic polymer. The organic polymer aids adhesion of the plug precursor material to the green ceramic paper and increases the strength of the green plug so that green plug can be processed with the green fiber-based paper substrate. Useful organic polymers can include organic latex materials, organic polymer solutions, solid organic particles, organic fibers and polymerizable organic molecules, or a combinations thereof. The ceramic materials and ceramic precursor materials can be in any suitable form including, for example, particles (e.g., powders, fiber segments, flakes, etc.), salts, salt solutions, colloids, and combinations thereof. Suitable ceramic materials can include metal oxides, metal carbides, metal nitrides, metal phosphates and metal oxy-nitrides. Suitable ceramic precursor materials can include metal hydroxides, metal oxy-hydroxides, metal salts, metal complexes, metal salt solutions and metal complex solutions. Oxide materials active as catalysts for the oxidation of the diesel soot such as cerium oxide and ceramic materials comprising transition metals may also be included in the plug composition. Ceramic fibers can be included in the plug material to provide reinforcement for the plug. It is desirable for the plug material to be chosen so as to exhibit a shrinkage during thermal processing (e.g., firing) that matches or approximates the shrinkage of the ceramic fiber paper, impregnated with the inorganic binder material, that occurs during thermal processing. In this way, the plug material can maintain a tight seal with the adjacent ceramic fiber paper walls during such processing and in final use.

Generally, it can be desired that the plug precursor material have a high ceramic content, e.g. greater than about 20% by weight total ceramic solids in the plug precursor material. It can also be desirable for the plug precursor material, as applied, to have a viscosity low enough to allow easy application (e.g., extrusion and coating) of the green plug precursor material to the green channeled paper laminate, but high enough to avoid excessive dripping or sagging of the plug material after it has been applied to the laminate. Plug precursor materials that exhibit shear-thinning viscosity behavior can be desirable. For example, such a shear-thinning viscosity behavior can be obtained by including a thixotropic dispersion in the plug precursor material. Other techniques for obtaining this type of behavior may also be found in the liquid paint art.

It can be desirable for an inorganic binder material to be used in the form of a pattern 242 that adds reinforcement and strength to the green, ceramic particle enriched paper 244. This inorganic binder material may include any of the ceramic materials that are disclosed herein as being suitable for impregnating the paper and, if deemed desirable, may also include a penetrating agent. Preferably the pattern is continuous or at least semi-continuous. The reinforcing pattern 242 can be formed over all of the surface area of the paper 244, over one or more selected areas or both (i.e., a higher concentration of patterning in one or more selected areas). Such selected areas may include, for example, all or part of the areas where the pleated paper contacts the flat sheet paper. It has been found that sections of the ceramic fiber-based paper substrate may telescope and extend longitudinally out from the remainder of the substrate (i.e., push-out), if the bond between the paper layers of the substrate are too weak to withstand the pressures exerted by, for example, the engine exhaust. Therefore, a reinforcing pattern 242 can be applied, for example, only to those areas between the paper layers that are prone to telescoping or push-out.

The reinforcing pattern 242 can be (i) a cross-hatch, with square, rectangular, diamond-shaped (see FIG. 18*a*), or circular openings (see FIG. 18*b*), (ii) spaced-apart horizontal, vertical or diagonal lines (see FIG. 18*c*), or (iii) any other desired pattern. Preferably, the lines of FIG. 18*c* are connected together, for example, at adjacent ends, to form a continuous line. When the paper is to be used for filtering purposes, it is believed that the use of such a pattern can result in a stronger and more durable paper while maintaining a sufficient area of paper having a high degree of porosity, in the areas of the paper located within the cross-hatching, for filtering purposes. For filtering or non-filtering applications, it is believed that using such a pattern can also minimize the amount of inorganic binder material needed to produce a paper of sufficient strength and durability. The pattern can be applied by using any suitable process. It is believed that printing operations like screen, lithographic or flexographic printing or gravure coating can be used. After it is applied, the pattern is preferably dried and heated to a temperature sufficient to set the inorganic binder material but not to a temperature that would cause the organic binder in the green paper to fully or substantially decompose. The pattern may be dried in-line after the pattern is applied to the paper and before the paper is wound into a roll. It is believed that the patterned green paper may become stiff upon the pattern being dried and heated. Therefore, it may be necessary to first pleat and roll sheets of the patterned green paper into a substrate before drying and heating the paper to set the inorganic binder material. By using a pattern of parallel lines running transversely across the green paper (i.e., running parallel to the pleats or perpendicular to the longitudinal axis of the sheet), it is believed that patterned paper sheets may be dried and heated to set the inorganic binder material before pleating and rolling the sheets into a substrate.

When pleated and flat sheets of the patterned green paper are bonded together, a certain percentage of the surface area of the bond between the sheets is formed from overlapping reinforcing patterns of the sheets. It is believed that the bond between such overlapping reinforcing patterns, or even between patterned and non- patterned areas, may be stronger than the bond between overlapping non-patterned areas of the paper sheets, because the fibers in the patterned areas are held or bonded together more tightly.

It may be desirable to make a pattern that includes or consists of, for example, microwave receptive materials (e.g., silicon carbide and magnetic materials such as barium ferrite, rare earth containing magnetic materials, and magnetite) and/or electrically conductive materials (e.g., silicon carbide, pure and alloyed metallic materials), with the resulting pattern being useful as a heating or regeneration element in the substrate.

It is preferable for the green fiber-based paper substrate to be impregnated with an inorganic binder material comprising a ceramic component via an impregnating dispersion according to the '333 invention. In the absence of such a an inorganic binder material, calcining and firing of the green fiber-based paper substrate will produce a relatively weak and friable ceramic fiber-based paper substrate that is unusable in exhaust system applications. In addition, the strength of the substrate can be improved by introducing one or more inorganic binder materials such as, for example, colloidal clays, colloidal nano-clays, boehmite, colloidal zirconia and colloidal silica into the slurry in the paper making process. However, there are limitations to using this approach alone. Generally, high strength can be obtained using this technique but only after the introduction of large amounts of the inorganic binder materials into the green ceramic fiber paper. For wall-flow fiber-based paper substrates, such large amounts of the inorganic binder materials can unacceptably lower the permeability of the substrate walls (i.e., unacceptably increase the wall-flow substrate back pressure) and the homogeneity of the resulting ceramic fiber-based paper substrate.

The deficiencies of the prior art (e.g., low strength and low mechanical, chemical and thermal durability) can be overcome by the rigidification process of the '333 invention. One rigidification process according to the '333 invention involves impregnating the green fiber-based paper substrate with a primary dispersion containing a ceramic component and, preferably, at least one penetrating agent. The penetrating agent appears to be necessary when a green fiber-based paper substrate containing a substantial amount of organic binder material is to be impregnated. The ceramic component of the primary dispersion is a ceramic precursor material, a ceramic material or a mixture thereof. The penetrating agent comprises an organic molecule or polymer that sufficiently reduces the interfacial energy between the impregnating dispersion and the surfaces of the green fiber-based paper substrate (i.e., at least the surfaces formed by the fibers and organic binders) to allow the impregnating dispersion to wet and be absorbed into the paper forming the green substrate, without significant flocculation or particle separation (e.g., phase separation) of the ceramic components in the impregnating dispersion (i.e., with substantial homogeneity of the ceramic components in the absorbed impregnating dispersion). For example, when the penetrating agent is an anionic surfactant, it is believed that the penetrating agent at least adsorbs on the organic binder rendering the surface of the organic binder anionic and, thereby, reducing its interfacial energy with the impregnating dispersion.

In one rigidification process according to the '333 invention, the green fiber- based paper substrate is brought into intimate contact with the primary sol, preferably, by submerging the substrate into a quantity of the primary dispersion sufficient to soak all of the substrate. It may also be possible to spray, pour or otherwise bring the primary dispersion in contact so as to be absorbed into the green substrate. During this impregnation step, the present primary dispersion penetrates pores in the green fiber-based paper substrate, carrying its ceramic component into the polymer reinforced, green ceramic fiber body of the substrate. The resulting dispersion impregnated green substrate is then dried, calcined and fired to produce an initially rigidified substrate. After drying, calcining and firing, most or almost all of the impregnated ceramic component (i.e., up to about 90% or higher) remains in the pores and chemically bonds to the ceramic fibers so as to impart strength to this initially rigidified substrate. The steps of impregnating, drying, calcining and firing a substrate shall be referred to as a rigidification process.

The rigidification process can be repeated in order to sequentially deposit more and more of the ceramic component materials into the body of the fiber- based paper substrate. In this way, the fiber-based paper substrate can be strengthened to the degree needed for the particular substrate application (e.g., an exhaust filter or catalytic converter for a diesel engine exhaust system), or as otherwise desired. While a desired degree of rigidification of the inventive fiber-based paper substrate can be obtained with the impregnating dispersion containing glass and/or large inorganic binder particles, the present invention is able, and it is preferred, to accomplish the desired degree of rigidification without the use of glass or large inorganic binder particles.

Each rigidification process creates bonds between the ceramic fibers and between the layers of ceramic fiber paper to produce a more rigid and durable fiber- based paper substrate. It has been found that the use of a penetrating agent in the second impregnating dispersion used after the initial rigidification process can be unnecessary. After the initial firing, the organic binder in the green substrate is burned off, making it easier for the next dispersion to impregnate the substrate. In general, as the rigidification process is repeated, the fiber-based paper substrate becomes more rigid and less porous. The fiber-based paper substrate can attain relatively high strength and durability while retaining a relatively high degree of porosity by limiting the number of times the substrate is exposed to the rigidification process. At some point, additional exposures to the rigidification process will not have a significant beneficial effect, such as when the percent porosity of the substrate drops so low that the impregnating dispersion is no longer able to penetrate into the paper walls of the substrate. For the flow-through substrate, it can be desirable for the substrate to have a low or no percent porosity. Therefore, the impregnating dispersions used after the initial rigidification process may or may not include a penetrating agent, depending on the need for a dispersion with additional penetrating characteristics.

The impregnation of the fiber-based paper substrate with a dispersion is, preferably, carried out so as to homogeneously impregnate the entire fiber-based paper substrate. It has been found that physical separation of the impregnation dispersion components can occur during impregnation of the dispersion in the fiber-based paper substrate. This physical separation can be avoided or at least minimized by exposing (i.e., bringing into contact, e.g., by dipping, spraying, etc.) surfaces of the fiber-based paper substrate to the impregnating dispersion at least as fast as the rate at which the impregnating dispersion wicks into and through the body of the substrate. This is true whether the substrate surfaces were previously treated or are untreated. Preferably, in an effort to avoid or at least minimize such physical separation, the rate of exposure of the substrate surfaces to the impregnating dispersion is higher than the rate at which the impregnating dispersion wicks into and through the body of the substrate. It has been found that it can be desirable for the body of the fiber-based paper substrate to be immersed in the impregnating dispersion at a rate of greater than about 0.25 cm of immersion depth per second, while not trapping air. It has been found that at least at this rate, the exposure rate typically remains as fast or faster than the rate of wicking. It has also been found that the use of a penetrating agent in the impregnating dispersion can facilitate the homogeneous impregnation of the fiber-based paper substrate. In addition, it is desirable for the impregnation to be carried out so as to maximize the rate that the impregnating dispersion flows through the tubular channels into the fiber- based paper substrate, without trapping air. With this in mind, it is desirable to immerse wall-flow substrates with plugged ends so that the tubular channels are oriented to run parallel to the surface of the impregnating dispersion. Because it does not have plugged ends, it can be desirable to immerse flow-through substrates so that the tubular channels are oriented to run either perpendicular or parallel to the surface of the impregnating dispersion.

The impregnation process can be carried out at ambient pressure or the pressure can be lowered by exposure to a vacuum to accelerate penetration of the impregnating dispersion and to remove all entrained gases from the fiber-based paper substrate. The optional exposure to a vacuum can be done while the substrate is being submerged in, or otherwise exposed to, the impregnating dispersion or afterwards. The exposure of the fiber-based paper substrate to lowered pressure during or after the dispersion impregnation can provide a more uniform and rapid impregnation.

The penetrating agent is, preferably, selected from a group of organic molecules that enhance wetting of the organic binder-containing body of the green ceramic fiber-based paper substrate by the impregnating dispersion. The penetrating agent facilitates wetting of the organic binder-containing fiber-based paper substrate body by reducing the surface tension of the impregnating dispersion and by reducing the surface energy at the interface between the impregnating dispersion and the substrate body. The penetrating agent must be sufficiently soluble in the impregnating dispersion so as to be present in an amount that enables it to be effective as a penetrating agent during impregnation. The penetrating agent and the ceramic component must be compatible (i.e., must not cause significant flocculation or particle separation) in the impregnating dispersion. Examples of useful penetrating agents include alcohols, organic amines, and water-soluble polymers and macromolecules. Representative examples of alcohols that can be useful as penetrating agents in aqueous impregnating dispersions include alcohols such as isopropyl alcohol, ethyl alcohol, tert-butyl alcohol, butyl alcohol, propyl alcohol, sec-butyl alcohol and other alcohols having at least moderate solubility in water. Organic amines that are useful include nitrate and halide salts of quartenary organic amines having at least one organic moiety attached thereto wherein said moiety comprises a carbon chain greater than 2 carbons in length. Water-soluble polymers and macromolecules such as those possessing hydroxo groups, carboxylate groups, ethylene oxide or propylene oxide linkages, amido functionality, sulfanato groups, phosphate groups, ammine functionality or water soluble cyclic groups such as pyrroles can also be useful as penetrating agents. The concentration of the penetrating agent depends on the nature of the impregnating dispersion and the chosen penetrating agent. In the case of surface active penetration agents such as those having a propensity to adsorb on the surface of organic binders to induce wetting, the concentration can be very low, e.g., less than about 1% by weight of the impregnating sol. For penetrating agents such as alcohols that increase the oleophillic nature of the impregnating sol, in general, the concentration of the penetrating agent must be higher, e.g., up to about 10% by weight of the dispersion or higher. A particularly useful penetrating agent for use with aqueous sols is isopropyl alcohol.

The ceramic component in the initial impregnation dispersion can be in the form of a dissolved species, a soluble or insoluble salt, a dispersion of particles (e.g., powder, flakes), or combinations of these materials. Examples of useful dissolved species include metal salt solutions such as solutions of silicates, transition metal salts, rare earth metal salts and aluminum salts; basic metal salt solutions such as basic aluminum salt solutions and basic zirconium salt solutions; and solutions of metal complexes such as carboxylates, phosphates, alkoxides, alcoholates, amine complexes and hydroxides. In the case of the '333 impregnating dispersions, it can be desirable for the particles used therein to be fine, with an average particle diameter of less than 4 micrometers and, preferably, less than 2 micrometers. Although a portion of the particles in the dispersion can be of larger diameter, for example about 10% by weight of the particles can be larger than about 10 micrometers, it is preferred that at least about 80% by weight of the particles be less than about 10 micrometers in diameter and at least about 95% by weight of the particles be less than about 20 micrometers in diameter. Impregnation dispersions of fine particle dimensions are preferred since the pore size in the organic binder-containing ceramic fiber paper are very small. Particularly useful ceramic components in the impregnating dispersion can include colloidal dispersions of ceramic materials and ceramic precursors such as colloidal dispersions of metal carbides (e.g., silicon carbide), metal oxides, oxy-hydroxides and hydroxides. Examples of the oxides, hydroxides and oxy-hydroxides that may be useful include colloidal nano-clays, boehmite, colloidal zirconia and colloidal silica. Certain colloidal nano-clays and colloidal dispersions of fine particle size silicon carbide, as described below, can work particularly well in the impregnating dispersions of the present invention.

It is surprising that nano-clay materials can be used to impart strength via the present '333 process while at the same time retain a high degree of porosity in the final fiber-based paper substrate. Nano-clay materials are typically plate-like materials (i.e., in the form of platelets or flakes) that are typically used to make non- porous coatings. The U.S. Bureau of Mines classifies clays into six groups: kaolin, ball clay, fire clay, bentonite, fuller's earth, and common clay and shale (Kirk-Othmer Encyclopedia of Chemical Technology, 4th edition, Volume 6, John Wiley and Sons, New York, N.Y., page 405). Of the nano-clays, the bentonite clays are preferred, particularly those high in montmorillonite content. Besides their fine particles size and water dispensability, the montmorillonite clays have the capability of being cation exchanged so as to lower the content of cations such as, for example, sodium and potassium in the montmorillonite clay. Cations such as sodium and potassium can have negative effects on the thermal stability of the resulting ceramic materials, because such cations can react to form glass materials. The cation exchange capabilities of such ceramic components can also be used to introduce cations that form catalytic oxide species during calcination and firing. Cations that can be useful in forming catalytic sites include cations of rare earth metals, precious metals, iron, nickel, manganese, cobalt, copper, chromium, barium, vanadium, titanium and combinations thereof. Thus, the nano-clays can be beneficially modified to produce a catalytic function, as well as a binding and strengthening effect.

When montmorillonite converts to chemically stabilized β-cristobalite, it exhibits material properties that contribute to the formation of a durable subtrate paper. The montmorillonite bonds wells to both the aluminum oxide fibers of the paper and the silicon carbide particles impregnated in the paper. It has been discovered that the pyrolysis (e.g., firing) of montmorillonite at or above about 900° C. can directly form a chemically stabilized β-cristobalite. The montmorillonite at least begins to bond to the fibers and particles before the montmorillonite is transformed into the β-cristobalite structure. These bonds are at least maintained upon the transformation into β-cristobalite structure. Chemically stabilized β-cristobalite also has the added advantage of its material characteristics (e.g., low coefficient of thermal expansion and high thermal shock resistance). The low thermal coefficient of expansion coupled with high temperature stability, makes chemically stabilized β cristobalite one of the best refractory materials for applications where temperatures up to 1450° C. are encountered. Calcium montmorillonite is one such montmorillonite that can form chemically stabilized β-cristobalite. Chemically stabilized β-cristobalite has basically the same crystal structure as β-cristobalite, a high temperature polymorph of $SiO_2$ (i.e., silica). Chemically stabilized β-cristobalite is formed after the dehydration of the calcium montmorillonite in the firing process. While chemically stabilized β-cristobalite has the β-cristobalite crystal structure, the chemical composition of chemically stabilized β-cristobalite is not that of pure silica.

Pure β-cristobalite is not normally stable below about 275° C. The reason chemically stabilized β-cristobalite, as used in the '333 invention, is stable at room temperature is because the other ions that are present in the clay (e.g., calcium, aluminum, sodium and possibly iron) remain in the β-cristobalite lattice structure, thereby stabilizing the β-cristobalite crystal structure at lower temperatures. β-cristobalite is a high temperature, low pressure polymorph of silica in which the silica tetrahedral are arranged in a diamond like lattice with shared corners. The β-cristobalite has a cubic symmetry while the alpha-cristobalite is tetragonal. In the case of pure silica, the fully expanded high temperature beta structure undergoes a reversible displacive transformation to a collapsed alpha structure on cooling at about 265° C. This is accompanied by a volume decrease of about 3.2%. The temperature of the beta to alpha inversion in chemically stabilized or doped cristobalite is variable and depends on the level of doping and the nature of the doping cations. In order to stabilize the β-cristobalite down to room temperature, it must be chemically doped with a sufficient level of stuffing cations (i.e., chemically stabilized). Preferably, these cations are uniformly dispersed in the crystal structure. In particular, in the calcia- alumina-silica system, chemically stabilized β-cristobalite can be formed where the molar ratio of calcium to aluminum is one, with aluminum occupying silicon tetrahedral sites and calcium ions occupying all of the interstitial non-framework sites. The presence of foreign ion impurities in the interstices presumably inhibits the contraction of the structure that would have occurred during the beta-alpha-cristobalite transition. Thus, the reason the chemically stabilized β-cristobalite is stable at room temperature is because there is a sufficient level of non-silicon cations substituted and stuffed into the lattice structure. It has been determined, by independent analysis, that in the chemically stabilized β-cristobalite formed by the firing of calcium montmorillonite, as described herein, the aluminum (as determined by 27Al nuclear magnetic resonance spectroscopy) is essentially all in the tetrahedral form. This can only happen if the aluminum is in the lattice structure substituting for silicon at tetrahedral sites. Such substitution of a plus 3 aluminum cation for a plus 4 silicon cation results in a need for additional cations for electro neutrality in the crystal structure. The calcium and sodium cations from the calcium montmorillonite provide the additional charge needed to obtain this electroneutrality. While the chemically stabilized β-cristobalite of the present invention exhibits an x-ray diffraction pattern essentially identical to that of pure β-cristobalite, the composition is not that of pure silica.

The chemically stabilized β-cristobalite is also chemically distinct from the pure silica in the β-cristobalite form. Pure silica is an acidic oxide. The chemically stabilized β-cristobalite is closer in chemistry to a feldspartic mineral and acts as a basic oxide.

In the calcium montmorillonite, there is calcium, sodium, alumina and silica, as is required in the chemically stabilized β-cristobalite. So when the calcium montmorillonite is fired and decomposes, chemically stabilized β-cristobalite is naturally formed. This is a far easier and less expensive method of producing chemically stabilized β-cristobalite than previously known methods.

Chemically stabilized β cristobalite (CSC) has been synthesized by the Pechini process (see Sang-Jin Lee, Korean J. Ceramics, 3[2] 116 (1997); S. J. Lee and C. H. Lee, Mater. Lett., 45, 175 (2000)), by co-precipitation of silica with the requisite cations (see M. A. Saltzberg, S. L. Bors, H. Bergna and S. C. Winchester, J. Am. Ceram. Soc., 75[1] 89 (1992); A. J. Perrotta, D. K. Grubbs, E. S. Martin, N. R. Dando, H. A. McKinstry, and C. Y. Huang, J. Am. Ceram. Soc., 72[3] 441 (1989).), by spray drying sol-gel mixtures (see E. S. Thomas, J. G. Thompson, R. L. Withers, M. Stems, Y. Xiao, and R. J. Kirkpatrick, J. Am. Ceram. Soc., 77[1] 49 (1994).), and by the incipient wetness technique (see M. D. Alcala, C. Real, and J. M. Criado, J. Am. Ceram. Soc., 79[6] 1681 (1996).) and by thermal treatment of an ion-exchanged zeolite (see A. J. Perrotta, D. K. Grubbs, E. S. Martin, N. R. Dando, H. A. McKinstry, and C. Y. Huang, J. Am. Ceram. Soc., 72[3] 441 (1989).). Patented methods of synthesizing β cristobalite include precipitating crystals of the β cristobalite in a glass melt (see J. F. MacDowell, "Alpha and Beta-Cristobalite Glass-Ceramic Articles and Methods", U.S. Pat. No. 3,445,252, issued May 20, 1969; C. T. Li, "Glasses, Thermally Stable High (Beta)-Cristobalite Glass-Ceramics and Method", U.S. Pat. No. 4,073,655, issued Feb. 14, 1978.) and a sol-gel process (see A. J. Perrotta, D. K. Grubbs, and E. S. Martin, "Process for Preparing Stabilized High Cristobalite" U.S. Pat. No. 4,818,729, issued Apr. 4, 1989.). These methods of preparation suffer from high cost and difficulty in synthesizing phase pure, chemically stabilized β cristobalite.

Surprisingly, it has been discovered that essentially or at least substantially phase pure, chemically stabilized β cristobalite can be synthesized by thermal treatment of a montmorillonite clay such as, for example, a calcium montmorillonite clay. Calcium montmorillonite clay is relatively inexpensive and readily available. Further, calcium montmorillonite clay can be introduced into sol-gel compositions or mixed dispersions to generate the chemically stabilized β cristobalite during firing. In this fashion, the low thermal coefficient of expansion of the chemically stabilized β cristobalite can be used to impart greater thermal stability and thermal shock resistance to the ceramic body. If desired, the montmorillonite clay can be combined with glass precursor materials so as to generate a chemically stabilized β cristobalite glass that is toughened and thermally shock stable. It has been further discovered that the calcium montmorillonite can be ion-exchanged with other cations such as, for example, $Cu^{2+}$, $Co^{2+}$, $Ni^{2+}$, $Fe^{2+}$, $Sr^{2+}$, $K^{1+}$, and $Nh4^{1+}$, etc. to yield, after firing, a variety of CSCs having different compositions.

The exemplary montmorillonite that has been shown to convert to chemically stabilized β cristobalite by heating is a calcium montmorillonite and has been reported to have the general composition recited in the below table as Standard Bentolite SSP. In this table is also shown the composition of a low sodium version of this product. This illustrates the ion-exchangeable nature of calcium montmorillonite and also points out the ions that are exchanged in this process.

| Standard Bentolite SSP* | Weight Percent | Low Soda Bentolite | Weight Percent |
|---|---|---|---|
| Na2O | 2.52 | Na2O | 0.4 |
| MgO | 3.06 | MgO | 2.67 |
| Al2O3 | 13.8 | Al2O3 | 15.0 |
| SiO2 | 64.4 | SiO2 | 68.6 |
| K2O | 0.25 | K2O | 0.27 |
| CaO | 2.01 | CaO | 1.55 |
| Fe2O3 | 1.06 | Fe2O3 | 0.22 |
| TiO2 | 0.02 | TiO2 | 1.08 |

*Bentolite SSP is a product produced and distributed by Southern Clay Products, Incorporated, Gonzales, Texas.

Montmorillonites clays are classed as dioctahedral smectites and are layered compounds wherein the outer surface of each individual layer is comprised of MO4 tetrahedra connected to neighboring tetrahedra by shared oxygens forming a hexagonal pattern of tetrahedra. In general, the metal ions are predominantly Si4+ but substitution of Al3+ or Fe3+ for Si4+ can occur. The two surfaces of each layer sandwich an inner layer comprised of octahedrally coordinated metal ions in which one oxygen from each of the outer surface tetrahedra bond to the metal in the octahedral layer. Three out of the four oxygens on each surface tetrahedron are shared with neighboring metal ions and the fourth of the tetrahedral oxygens are shared with the inner octahedral metal ions. Anionic charge on the layers arises from substitution of a M3+ cation for Si4+ cation in the tetrahedral layer or by substitution of a M2+ cation for an M3+ cation in the octahedral layer. This charge is compensated by interlayer cations such as Na+, Al3+, K+, Mg2+, and H.+ Thus, a possible composition of the Bentolite SSP montmorillonite is [(Al2.03Mg0.50Ca0.2Fe0.05Ti0.05K0.02)Si8.0O20(OH)4](Na0.3Ca0.06Mg0.07). This formula, although approximate, illustrates the general ratio of the aluminum to the silicon and also indicates the exchangeable cations (i.e., those shown in parenthesis at the end of the formula).

Studies were done on the pyrolysis product of pure Bentolite SSP to more closely examine the nature of the beta cristobalite that is formed. Microanalysis shows a composition of the Bentolite SSP after firing of about 16.5% Al2O3, 1.9% CaO, 1.15% Fe2O3, 2.7% Na2O, and 74.0% SiO2. Since X-ray diffraction shows this material to be essentially monophasic, the material is a heavily doped beta cristobalite. Chemically, the material is very similar in composition to certain feldspars, although lower in the total of potassium plus sodium and somewhat higher in calcia (e.g., pegmatite feldspar is 74.34% SiO2, 14.45% Al2O3, 2.0% Na2O and 8.6% K2O).

In the literature, such materials, although highly doped, are still referred to as beta cristobalites (see for instance: E. S. Thomas, J. G. Thompson, R. L. Withers, M. Stems, Y. Ziao and R. J. Kirkpatrick, J. Am. Ceram. Soc., 77[1] 49–56 (1994); A. Perrotta, D. Grubbs, E. Martin, N. Dando, H. McKinstry, and C. Huang, J. Am. Ceram. Soc. 72[3] 441–47 (1989); M. D. Alcala, C. Real, and J. Criado, J. Am. Ceram. Soc., 79[6] 1681–84 (1996); C. Li, "Glasses, Thermally Stable High (beta) Cristobalite Glass-Ceramics and Method", U.S. Pat. No. 4,073,655, Apr. 4, 1977; A. Perrotta, D. Grubbs, and E. Martin, "Process for Preparing Stabilized High Cristobalite", U.S. Pat. No. 4,818,729, Oct. 13, 1987).

Additionally, in all cases, the firing of bentolite SSP either by itself or in combination with the filter ingredients, produces chemically stabilized beta-cristobalite as the major product. Thus, the composition of the impregnation solutions may be changed slightly (e.g., the ratio between silicon carbide and the nano-clays or other ceramic components, such as alumina, may be added in the ceramic binder material), without affecting whether beta-cristobalite will be formed.

Nano-clays such as the montmorillonite clays, in the presence of suitable penetrating agents, can readily penetrate the organic binder-containing green ceramic fiber paper during impregnation. Penetrating agents that are particularly suitable for montmorillonite clays include the anionic penetrating agents. The particle size of the individual nano-clay particles in the impregnating dispersion is sufficiently small (less than about 2 micrometers in primary dimension) so as not to obstruct the pores of the organic binder-containing green paper. Importantly, during the initial processing, the nano-clays adsorb onto the ceramic fibers in the green paper. It is believed that most of this nano-clay adsorption occurs during the impregnation stage, but may also occur during drying, calcining or both. Firing of the nano-clay impregnated, green ceramic fiber paper results in chemical bonding of the nano-clays to the ceramic fibers. In this way, the nano-clays rigidify the ceramic fiber network. In addition, the nano-clays possess both positively and negatively charged surfaces. This phenomenon arises from the fact that the nano-clays have a layered structure and possess a platelet morphology. The edges of the nano-clay platelets are crystallographically and elementally distinct from the faces of the nano-clay platelets. Thus, in most cases, in acidic to slightly basic pHs, the edges of the nano-clay platelets are characterized by a cationic charge whereas the faces are anionic. Because the faces predominate in terms of surface area, the overall charge of the nano-clays in most of the pH range is negative. Thus, while not wishing to be bound by theory, it is believed that the negative nature of the nano-clays promotes adsorption of the nano-clays onto the ceramic fibers in the pH range, generally from about 2.5 to about 8.5, where the ceramic fibers are cationic and the nano-clays are anionic. This pH range can vary depending on the nature of the nano- clay, i.e., depending on the composition and exchangeable cation content and identity. Within this pH range however, the edges of the nano-clays remain cationic. Ceramic component particles of the '333 impregnating dispersion that are particularly useful in the '333 invention (e.g., silicon carbide particles) have negative surfaces above a pH of about 2. Thus, the cationic sites on the edges of the nano-clays interact with the anionic sites on the ceramic component particulate with the result that the ceramic component particulate, the ceramic fibers and the nano-clays are bound together in the fiber-based paper substrate structure.

The anionic nature of the nano-clays also allows the bonding of cationic strengthening additives such as hydrated aluminas, zirconia or the like (e.g., in particle form), because the nano-clays bond to both the ceramic fibers and these strengthening additives. In general though, if large amounts of finely divided particles such as aluminas and zirconias are used (i.e., enough to negate the anionic nature of the nano-clays), the interaction of the nano-clays with the ceramic fibers can be prevented with detrimental effects on the strength of the fiber-based paper substrate. For this reason, it is believed that the ceramic component of the impregnating dispersion can beneficially include cationic or strengthening additives (e.g., in particle form) at levels where the external surface area of the added cationic particles can be up to about 90% of the available external surface area of the nano-clay particles in the formulation. In other words, it is believed that up to about 90% of the external surface of the nano-clay particles can be bound up by the cationic particles and sufficient bonding to the ceramic fibers can still result.

A most convenient method of introducing particles such as aluminas and zirconias into the '333 invention is to treat the oxide particles in such a manner as to convert their surface charge from cationic to anionic. In this way, the nano-clays can freely interact (i.e., chemically bond, electrostatically attract or both) with both the ceramic fibers and the oxide particles in the fiber-based paper substrate. Methods of converting normally cationic particles to anionic particles include the following technologies: (1) treating the oxide particles with a polyanionic material such as, for example, polycarboxylic acid functional polymers and their salts, polysulfinated functional polymers and their salts, polyphosphate functional polymers and their salts, polymethacrylic acids and their salts, or the like so that the polyanionic material is adsorbed on the surfaces of the oxide particles, thereby making the oxide particles negatively charged; (2) treating the oxide particles with a polyvalent anionic salt or complexes such as tartrates, citrates or the like so that the anionic salt or complex is absorbed on the surface of the cationic particle, thereby rendering the oxide particle negatively charged; and (3) coating the oxide particle with an oxide colloid or coating that is itself negatively charged. An example of this latter method is the formation of silica-coated oxide particles formed via treatment of the oxide particles with sodium silicate or another hydrolyzable metal complex so as to deposit, by hydrolysis, an oxide coating of the silicate on the surfaces of the oxide particles.

It has been found to be particularly effective to use small size ceramic component particulate (e.g., silicon carbide particles) with nano-clay particles in impregnating dispersions of the '333 invention. Small size ceramic particulates can be readily dispersed in a nonoclay particle dispersion to form stable dispersions that settle slowly (i.e., that stay suspended for longer periods). In addition, the small size of the ceramic component particulates can facilitate the impregnation of the dispersion into the ceramic fiber paper of the substrate. The small size of the ceramic particulates also allow for lower temperature bonding of the ceramic particles, during firing, in order to strengthen the resulting porous fiber-based paper substrate. In the impregnation of the green fiber-based paper substrate, it can be desirable for the particle size of the ceramic component particulate to be less than about 4 micrometers in average particle diameter and, preferably, less than about 2 micrometers in average particle diameter. Particle sizes of about 1 micrometer or finer in average particle diameter can also be used effectively. Although a portion of the ceramic component particles in the dispersion can be of larger diameter, for example about 10% by weight of the ceramic component particles can be larger than about 10 micrometers, it is preferred that at least about 80% by weight of the ceramic component particles be less than about 10 micrometers in diameter and at least about 95% by weight of the ceramic component particles be less than about 20 micrometers in diameter. In general, the surfaces of the silicon carbide particles, and of other such ceramic component particles, are anionic in surface charge. Such particulate can, thus, bond to both the cationic ceramic fibers and to the cationic portions of the nano-clay particles. Surprisingly, when used with a suitable penetrating agent, ceramic component particles, like the silicon carbide particles, and nano-clay particles can readily penetrate the green paper.

During calcination and firing, the nano-clay particles, ceramic component particles (e.g., silicon carbide particles) and other ceramic additives (e.g., basic metal salts, particulate metal oxides and oxy-hydroxides) bond to themselves and to the ceramic fibers and, thereby, bond the ceramic fibers together so as to form a strong yet flexible ceramic fiber paper. Referring to FIGS. 11–14, scanning electron microscopic (SEM) examination of the cross-sectioned initially fired ceramic fiber paper reveals that its microstructure contains refractory ceramic fibers 228 bound together at spaced locations along and at intersections of the fibers 228 by ceramic particle-derived filleting material 230. Prior gas phase deposition techniques, used in an attempt to rigidify fiber-based substrates, produce a relatively uniform and continuous coating of the rigidifying material. Unlike fiber-based substrates rigidified using gas phase deposition techniques, the ceramic fibers 228 in the '333 inventive paper are not uniformly coated with a continuous coating of the impregnating dispersion. Rather, the ceramic particles 230 introduced into the paper by the impregnating dispersion are bound to the surfaces of the ceramic fibers 228 (e.g., see FIGS. 14 and 17) at spaced locations along and at intersections of the ceramic fibers 228 (e.g., see Ref. No. 234). In this way, by the fibers 228 being bonded together at spaced locations along the fiber length, and not being uniformly and continuously coated, the ceramic fibers 228 of the paper retain much of their original flexibility. In addition, referring to FIGS. 11–14, the interior of the walls of the fiber-based paper substrate 210 is characterized by pores 232 having surfaces comprising ceramic fibers 228 as well as ceramic agglomerates 234 of the bound, impregnating particles 230. The particles 230 can also be present separately (i.e., not agglomerated) as well as in the form of agglomerates 234. The initial rigidification process, typically, strengthens the fiber-based paper substrate enough so it can at least survive subsequent rigidification processes.

The ceramic fibers 228 in the rigidified ceramic fiber paper, after one or more rigidification processes, are somewhat oriented (i.e., not completely random in their orientation). SEM examination of cross-sections of the rigidified ceramic fiber paper reveals that in general greater than about 60% of the fibers 228 in the ceramic paper are aligned within about 35° of being parallel with the plane of the ceramic paper. These fibers 228 are intertwined with each other, being bound to each other by particulate ceramic material 230 and having particulate ceramic materials 230 bound at random points along their length. After the first impregnation, the structure of the pores 232 seems for the most part to be uniformly random through the paper, although the orientation of the fibers 228 produces some orientation of the larger pores 232 in the plane of the paper.

Despite the fact that the particulate containing dispersion is being impregnated into a green, organic binder-containing, ceramic fiber paper, very little free or unbound particulate material 230 can be observed, using SEM examination, in the rigidified structure of the ceramic fiber-based paper substrate. It is this absence of free or unbound ceramic particles 230 in the rigidified ceramic fiber-based paper substrate 210 that causes the substrate to exhibit low dusting behavior. High dust content in the rigidified ceramic fiber-based paper substrate can be indicative of poor bonding of the ceramic fibers by the ceramic component particles. It may also be detrimental if such free or unbound particles are expelled from the exhaust system during use.

Colloidal silica or dispersions of silica can also be used to advantage in the '333 impregnating sols. The colloidal silica provides strength to the fiber-based paper substrate by bonding the fiber strands together. Excessive use of silica, however, was found to increase the brittleness of the substrate body and to increase the degree of dusting. Excessive use of silica can also reduce the chemical stability of the fired fiber-based paper substrate. In an attempt to avoid such drawbacks of using silica, it has been found that it can be desirable for the silica to be used as an additive at a level of less than about 45%, more desirably less than about 35%, preferably less than about 25% and more preferably less than about 15% by weight of the solids in the impregnating sol. It can also be desirable for the silica level in the final ceramic fiber-based paper substrate, as introduced via impregnation, to be at a level of less than about 10%, more desirably less than about 7%, preferably less than about 4% and more preferably less than about 1% by weight of the substrate.

Colloidal boehmite (i.e., alpha alumina monohydrate) may also be used as a ceramic component in the impregnating sol. The colloidal boehmite can act to bond certain ceramic fibers, particularly those containing silicon. The colloidal boehmite is particularly effective, when used in combination with colloidal silica. An advantage of the introduction of boehmite is that during calcination it converts to a high surface area transition alumina that can serve as a catalyst support for metal-based catalysts. Transition aluminas are excellent catalyst supports because of their very high surface area. They are, however, unstable with respect to transformation to the alpha phase at elevated temperatures. Such transformation is accompanied by significant shrinkage of the alumina crystal structure. Such shrinkage can cause loss of strength in the ceramic fiber substrate. For this reason, stabilizing ions can be introduced into the transition alumina crystal structure to raise the temperature of the alpha alumina transformation. This stabilization can be accomplished by introducing into the substrate during a second impregnation a small amount, up to about 20% by weight of alumina, of rare earth ions in soluble form, of silicon complexes in soluble form, of silica in colloid form, of barium ions in soluble form or combinations thereof.

By combining nano-clays and dispersions of silicon carbide, silica, and boehmite with penetrating agents, impregnating dispersions can be prepared that yield ceramic fiber-based paper substrates that are strong, handleable and exhibit high porosity after being impregnated, dried, calcined and fired. These materials (nano- clays, silicon carbide, silica and boehmite) can serve as the basis for excellent ceramic fiber-based paper substrates according to the '333 invention, particularly when combined with subsequent impregnations of strength building ceramic components, like those described herein, and of catalysts. Satisfactory substrates according to the '333 invention can also be obtained without using silica and boehmite. The penetrating agent is optional after the first rigidification process.

The strength of the ceramic fiber-based paper substrate can be dramatically increased by being subjected to at least a second rigidification process (i.e., impregnating, drying, calcining and firing). Similar impregnating dispersions can be used in subsequent rigidification processes to increase the strength and durability of the substrate, to impart catalytic activity to the substrate, or both. In general, with such subsequent rigidification processes, the use of penetrating agents is optional and larger ceramic particles and ceramic precursor particles in the impregnating dispersion, for example, average particle diameters of up to 5 micrometers or even larger, can be successfully introduced in these subsequent rigidification processes. In general, after the first rigidification process (i.e., after the organic binders have been removed), the ceramic fiber-based paper substrate can be impregnated, dried, calcined and fired again, although before being fired again, another impregnation can be carried out after only a drying step or after drying and calcining steps.

Referring to FIGS. 15–17, ceramic fiber-based paper, which was subjected to a first and second rigidification process, was sectioned and the cross- section of the paper examined by scanning electron microscopy. Surprisingly, after the second rigidification process (i.e., impregnating, drying, calcining and firing), the microstructure of the paper changes dramatically. In addition to the further densification of the paper due to the introduction of additional ceramic material 230 from the second impregnation, this cross-sectional examination also revealed that the second rigidification process can induce the formation of a distribution of lenticular or plate-like pores 236 inside of the ceramic fiber/organic binder composite paper. For the sample of ceramic fiber-based paper examined, the long axes of these pores 236 were typically in the range of from about 50 to about 300 micrometers in length and in the range of from about 10 to about 50 micrometers in height. The long axes of these plate-like pores 236 are aligned close to parallel with the plane of the ceramic paper. The internal structure of this rigidified paper can be characterized as being similar to that of open-celled foams having elongated or plate-like pores. The pores 236 have porous boundaries formed by particle-bonded ceramic fibers. The boundaries can be jagged or irregular. The density of the ceramic bonding material 230 can be slightly higher on the surfaces of the paper. When the cross-section of the paper is viewed by scanning electron microscopy at a magnification of 100 times, see FIG. 16, the density of the ceramic bonding material 230 appears to be uniform through the interior of the paper. While not wishing to be bound by theory, it is believed that the unique structure of the rigidified paper of the '333 invention enables the rigidified fiber-based paper substrates to be strong and durable yet sufficiently porous to function as excellent filters, catalyst supports or both.

The ceramic particles 230 (e.g., silicon carbide particles, metal oxide particles, etc.) in the rigidified ceramic fiber paper do not form a phase that is contiguous (i.e., the particles 230 typically form a discontiguous phase) throughout the rigidified paper substrate 210. In addition, the ceramic particles 230 typically do not form a continuous coating (i.e., the particles 230 typically form a discontinuous coating) on the fibers 228 within the paper. Instead, the particles 230 are typically found in discontinuous agglomerates 234 that help to bond the fibers 228 together. Some of the agglomerates 234 are typically bound to adjacent agglomerates 234 within the paper. Even so, it may be desirable to apply the ceramic particles 230 so as to form a continuous coating on the fibers 228, a continuous matrix in the body of the rigidified substrate 210 or both.

Silicon carbide and silicon oxy-carbide are particularly useful ceramic components in making a versatile, high performance, ceramic fiber-based paper substrate. Either or both of these components can be introduced in the paper-making process or added in one or more than one impregnation operation. These carbides of silicon are desirable because they can thermally bond to oxide ceramic fibers to form a porous refractory composite paper material that is chemically and thermally stable, strong and durable. After being processed through at least one rigidification operation, these carbide materials are capable of absorbing microwave energy to enable microwave heating of the rigidified fiber-based paper substrate. Such microwave compatibility can be desired for regeneration purposes. In addition, these carbide materials in the rigidified fiber-based paper substrate possess good thermal conductivity and including them raises the thermal conductivity of the rigidified substrate. Higher thermal conductivity can be desired, because it can allow heat to dissipate from hotter spots in the fiber-based paper substrate, during use. It has been found that the combination of these carbides of silicon with ceramic fibers containing aluminum and/or aluminum compounds (e.g., aluminum oxide) can be particularly advantageous, since the rigidified composite paper materials that are formed are stronger, more thermally stable and less brittle than rigidified composite paper materials formed from either silicon carbide or silicon oxy-carbide alone.

The twice rigidified ceramic fiber-based paper substrate can be farther processed by one or more additional rigidification treatments to increase the strength and durability of the substrate and to change the nature of the surface of the substrate.

Exterior surfaces of at least a once rigidified, and preferably at least twice rigidified, ceramic fiber-based paper substrate of the '333 invention can be selectively hardened by the application of a durable ceramic coating. Such a ceramic coating can provide a durable surface to reduce wear of the porous fiber-based paper substrate resulting from the abrasive effect of exhaust gas, produced for example by a diesel engine, passing through the substrate. Such a ceramic coating can also be applied so as to strengthen and reinforce the plugs and prevent holes from forming through or around the plug material. These ceramic coatings can also be applied to the non-filtering surfaces of the ceramic fiber-based paper substrate to increase the crush strength of the substrate so a to allow higher mounting pressures to be used during the canning process. Higher mounting pressures can help to stabilize the substrate in a housing. Ceramic coatings that can be useful in this regard include glass-ceramic coatings derived from mixtures of ceramic particles with glass particles, clay-bonded ceramic coatings comprising ceramic particles such as, for example, particles containing aluminum and/or aluminum compounds (e.g., aluminum oxide), silicon- containing particles or metal carbide particles bound together by a ceramic material derived from a clay, and coatings derived from ceramic precursor sols such as basic metal salt solutions, metal salt solutions, partially hydrolyzed metal alkoxides, and materials derived therefrom.

In general it is desirable for a ceramic fiber-based paper wall-flow substrate or filter used for the purification of diesel exhaust fumes to capture particulate exhaust byproducts and enable the oxidation of these particles so as to prevent excessive accumulation of soot in the filter. Such an accumulation of soot causes the filtration pressure or back pressure to increase and eventually results in the failure of the filter. The soot can be oxidized by the application of thermal energy, but in general, the temperatures needed to achieve complete oxidation of the soot are higher than are normally developed in a diesel engine exhaust. The filter of the '333 invention may be used in an exhaust system that includes a way to raise the temperature of the filter through the use of an external energy source. This may be accomplished by the use of any conventional technique including, for example, microwave energy, resistive heating, and the combustion of fuel added into the exhaust stream.

In another embodiment of the '333 invention, both the wall-flow and flow-through substrate of the '333 invention can be treated with solutions or dispersions of catalyst materials or catalyst precursors so as to activate the ceramic fiber-based paper substrate as a catalyst support. Additionally or alternatively, catalytic materials can be introduced during the formation of the substrate so as to become an integral part of the ceramic fiber-based paper substrate. Catalyzed filters can be used in combination with other catalyst systems and regeneration technologies so as to produce an exhaust system that is highly efficient at removing particulate and gaseous impurities from internal combustion engine exhaust fumes or from other hot gases.

The fiber-based paper substrates of the '333 invention may be used to support a number of different kinds of catalysts to assist in the oxidation of carbonaceous materials (e.g., soot, CO, hydrocarbons) and in the reduction of other pollutants (e.g., $NO_x$) in the combustion device exhaust. One way to catalyze a fiber- based paper substrate of the '333 invention is to introduce catalyst precursors, catalytic materials or a combination thereof at one or more points in the substrate manufacturing process. Such catalytic components can be introduced in the initial paper-making process, in one or more of the impregnation steps, by being applied to the rigidified fiber-based paper substrate body or a combination thereof. Suitable catalytic materials can include materials comprising metals such as platinum, palladium, rhodium, iron, nickel, silver, ruthenium, copper or combinations and alloys of these metals and compounds of these metals and metal oxides such as iron oxide, copper oxide, alkaline earth oxides and alkaline earth aluminates, rare earth oxides, rare earth aluminates, cerium oxide, vanadium oxide, manganese oxide, cobalt oxide, first row transition metal—rare earth metal oxide compounds and mixtures, oxides having perovskite and perovskite-related crystal structures, metal phosphates and phosphate—oxide mixtures.

In one form the catalyst(s) can be present as particles of catalyst material(s) or catalyst material(s) on support particles, where the particles are adsorbed on the surface of the ceramic fibers and ceramic component material of the ceramic fiber-based paper substrate of the '333 invention. A catalytic metal, mixed metal or metal alloy can be supported directly on the ceramic fibers and ceramic component material or can be supported on a catalytic oxide material which is then applied directly to the fibers and ceramic component material. These catalysts can also be present as partial coatings on the surfaces of the ceramic fibers and ceramic component materials of the fiber-based substrate of the '333 invention.

The catalytic metal or metal compound can be applied to the fiber-based paper substrate as a metal salt solution. The metal salt can then be either chemically altered (e.g., chemically reduced) to the active metal form, or thermally decomposed to the active metal form, so as to adsorb on the ceramic fibers and ceramic component material and impart catalytic activity. The catalytic metal or metal compound can also be formed as a colloidal dispersion or adsorbed on a colloidal carrier and then applied to the ceramic fibers and ceramic component material by dipping or other impregnation techniques. Catalytic metals or metal compounds can also be applied by conventional gas phase deposition techniques.

The fiber-based paper substrates of the '333 invention can be used in conjunction with other catalytic substrates and catalytic materials (e.g., $NO_x$). $NO_x$ reduction catalysts include, for example, rhodium supported on alumina, ceria or alumina-ceria, and can be used in conjunction with the fiber-based paper substrates of the '333 invention to remove $NO_x$ from the exhaust gases, for example, by reducing the $NO_x$ to nitrogen (i.e., N2) gas. If desired, $NO_x$ oxidation catalysts can also be used in conjunction with the fiber-based paper substrates of the '333 invention. With $NO_x$ oxidation catalysts, the $NO_x$ is oxidized to $NO_2$, and the $NO_2$ can be used to assist in the oxidation of carbonaceous material (e.g., soot trapped in a filter). $NO_x$ oxidation catalysts can be supported on a filter or other substrate of the '333 invention, if desired, so as to generate the higher oxidation state nitrogen oxides in situ.

All percentages are weight percent unless otherwise indicated.

Test Methods

Strength and Stiffness

The strength and the stiffness of an impregnated, calcined, and fired (i.e., rigidified) ceramic fiber paper was measured using a MTS Sintech 10D (Minneapolis, Minn.) testing workstation. A 9 cm×9 cm square ceramic paper test specimen was mounted between two metal plates, each having a 2.5 cm hole. The rig with the plates was immobilized and a 2.85 mm diameter, flat-tipped rod was brought into contact with the specimen at the center of the hole. The test was run at a crosshead speed of 1 mm/min. and the force required to punch the rod through the paper was recorded using a 25 N capacity load cell. The load-vs-displacement curves were recorded using a digital data acquisition system. The Peak load was taken as the highest load in the load-displacement curve and recorded in grams. Stiffness was measured as the slope of the linear portion of the initial rise in the load-displacement curve and was recorded in Newtons/millimeter (N/mm).

Gas Permeability

The gas permeability of a ceramic fiber paper was determined according to ASTM D737-75 ("Standard Test Method for Air Permeability of Textile Fabrics") using a Geppert Engineering model MN0034 permeability tester (Geppert Engineering, Inc., St. Paul, Minn.). The test chamber was a 45.7 cm tube with an inside diameter of 7.0 cm. The ceramic fiber paper sample was mounted on the inlet end of the tube using a circular rubber-faced specimen holder to avoid damaging the sample during the test. A plate with a 4.0 mm test orifice was mounted on the other end of the tube. Air was pulled through the tube, passing through the filter, the test chamber, and the 4 mm orifice, using a Model HP33P vacuum blower (Clements National Company, Chicago, Ill.) with a variable autotransformer operating at 120 volts power to adjust the blower speed. Manometers were used to measure the pressure within the test chamber and on the vacuum side of the test chamber.

The sample was tested by mounting the sample in specimen holder on the inlet side of the test chamber. The vacuum blower speed was adjusted until the pressure in the test chamber was 1.28 cm of water. While holding the test chamber pressure at 1.28 cm of water, the permeability was determined using the pressure measurements from the test chamber and on the vacuum side of the 4 mm test orifice. The permeability was determined in cubic feet per minute per square foot and converted to cubic centimeters per second per square centimeter (cc/sec/cm2).

The strength and permeability tests were performed on paper coupons in order to optimize the impregnation process and ceramic fiber paper properties prior to forming the paper into a fiber-based paper substrate according to the '333 invention.

Efficiency and Soot Holding Test

A finished pleated paper filter was prepared for testing by wrapping a filter measuring approximately 14.4 cm in diameter by 15.2 cm long with a ceramic fiber mounting mat (Interam™ 1100HT Mounting Mat available from Minnesota Mining & Manufacturing Co., St. Paul Minn.) and placing the filter in a 304 stainless steel tourniquet sleeve measuring about 15 cm in diameter and about 15.2 cm in length. The sleeve was tightened to compress the mat, which has a density of about 1540 grams per square meter, to a thickness of about 6 mm using a strap tourniquet and hose clamps and then spot welded. Stainless steel rings were spot welded to the ends of the sleeve. The sleeve was wrapped with a second mat (Interam™100 available from Minnesota Mining & Manufacturing Co., St. Paul Minn.) and the wrapped sleeve was press fitted into a metal test canister and heated in a kiln to a temperature of 600° C. to expand the intumescent mounting mat. The metal test canister simulates a diesel filter canister. The canned filter was weighed, thermocouples positioned, and end cones were bolted on each end of the canister. The canned filter was weighed again with the end cones.

The canned filter was then taken and mounted onto the exhaust pipe of a 6A3.4 Cummins diesel engine. The exhaust pipe had sampling ports before and after the canned filter in which sample efficiency filter holders were mounted. The ports were located ten pipe diameters from the nearest flow transition. Two sample efficiency filters were used for the inlet port and two were used for the outlet port. The sample efficiency filters were Pallflex Membrane quartz filters (available from Pall Corp., Ann Arbor, Mich.) and were conditioned and stored in the filter holders in an oven at 82° C. for at least 4 hours before using. The engine exhaust by-passed the filter until an engine coolant temperature of about 95° C. was attained. The engine speed was set at 2400 revolutions per minute and the hydraulic pressure load was about 12.4 megapascals. Once the desired engine speed and pressure load were reached, the settings were maintained by a Dimension engine controller (Research Inc., Minneapolis, Minn.)). At this point, the exhaust gas was switched to flow through the filter. Load time was recorded. The engine was run until the pressure drop across the filter reached about 10 kPa or 20 kPa, as indicated in the test results. Once the desired pressure drop was reached, the time was recorded, and the exhaust gas was sampled for 2 minutes through the sampling ports. Flow rate through the ports was about 80 liters per minute. The raw gas sampling procedure that was used is described in SAE Paper 950516 (Nathan R. Bruner). Then the exhaust was switched to the by-pass line, and the engine was brought to idle. The canister was removed and cooled for at least an hour. The filter was weighed to calculate the soot accumulated by the filter in grams. The filter was then mounted back on the exhaust line. The engine speed and hydraulic pressure load were brought up to operating conditions in the by-pass mode and then the exhaust line was switched to the filter. The engine was run until the next pressure drop was reached, usually 40 kPa.

The efficiency of a filter was measured by sampling and measuring the mass of particulate material in a volume of the exhaust stream before the filter and the exhaust stream that had passed through the filter. The two Pallflex™Membrane Filters were removed from the filter holders of each of the ports and placed in a petri dish with the filter faces facing each other to prevent soot loss, and conditioned for 8 hours at 25° C. and 55% relative humidity before weighing. The percent efficiency was based on the particulate mass collected before and after the filtering according to the following equation:

Efficiency %=(1−((DSSooted−DSClean)/(USSooted−USClean)))×100 wherein
DSSooted is the weight of the soot and filter paper downstream from the filter,
DSClean is the weight of the filter paper downstream from the filter,
USSooted is the weight of the soot and filter paper upstream from the filter, and
USClean is the weight of the filter paper upstream from the filter.

A useful filter should have an efficiency greater than about 70% and it is desired that a high performance exhaust filter have an efficiency greater than about 85% and preferably greater than about 90% and most preferably greater than about 95%.

Preparation of Green Ceramic Fiber-Based Paper

A green ceramic fiber-based paper having about 72% by weight Saffil RF ceramic fibers (Saffil Ltd., Widnes, Cheshire UK), 4% HYCAR® 26-138 acrylic latex polymer (BF Goodrich, Cleveland, Ohio), 12% cellulose fibers (Crestbrook Pine, Crestbrook Forest industries, Ltd., Cranbrook, British Columbia, Canada), and 12% fibrillated fibers (E.I. Dupont de Nemours and Company, Wilmington, Del.), was prepared using a typical paper making process. A paper pulp was formed by blending the fibers and latex in water to produce a slurry having a total solids of about 2%. A sufficient amount of an aqueous solution of approximately 70% ammonium aluminum sulfate was added to adjust the pH to between 5–6 and to coagulate the latex polymer. The slurry was poured onto a metal screen to form the paper. The paper was wet pressed slightly before drying. The resulting green ceramic fiber paper had a basis weight of about 140 grams per square meter and an average thickness of about 0.85 mm. Sheets of the paper were cut into 9 cm×9 cm square coupons for further treating and testing.

Preparation of Green Ceramic Fiber Filter

A green, ceramic fiber paper filter element was prepared by pleating the above-described green ceramic fiber paper to form approximately equilateral triangular cross sections having a length of about 3.2–3.5 mm on an edge. The pleated paper was laminated to a second flat, green, ceramic fiber paper to form a laminate. The laminate was wound around itself 16 times to form a cylindrical, green, ceramic fiber paper filter element having a diameter of about 14.4 cm and a length of about 15.2 cm. Prior to laminating, a plug material was extruded onto one end portion of the channel formed by the intersection of the pleated paper with the flat paper during lamination. The other end portion of the channel on the opposite side of the paper was likewise filled, and the laminate was wound so as to seal the opposite ends of alternating channels in the green, ceramic fiber paper filter element. The width of the plug material was approximately 10–15 mm. The plug material was prepared by mixing 23 grams of calcined alumina (Alcoa A-2/particle size ~5 micrometer (μm) available from Alcoa World Alumina LLC, Pittsburg Pa.), 45 grams of tabular alumina (48M/particle size approximately 150 μm available from C-E Minerals, King of Prussia Pa.), 30 grams of silicon carbide (F-500/particle size approximately 13 μm available from Exolon-ESK, Tonawanda N.Y.), 5 grams of a latex binder (HY-CAR® 26315 available from BF Goodrich Co., Cleveland Ohio), and about 0.5 grams of colloidal alumina (AL-20 available from Nyacol Nano Technologies, Inc., Ashland, Mass.) in about 30 grams tap water. During the winding process, a mixture having 220 grams of colloidal alumina (AL-20 available from Nyacol Nano Technologies), 44 grams spray dried colloidal alumina (AL-20SD also from Nyacol) and 14 grams silicon carbide powder (F-500 from Exolon-ESK) was applied sparingly to the peaks of the pleats to provide additional adhesion of the pleated green ceramic paper to the flat one. The resulting green ceramic fiber filter was dried for 2–3 hours at a temperature of about 150 degrees C. The amount of water can vary, depending on the viscosity desired for application of the plug material.

Preparation of Dispersions

Dispersion I—3% nano-clay dispersion: 12.0 grams (g) of powdered calcium montmorillonite nano-clay (Bentolite™SSP Nano-clay available from Southern Clay Products, Gonzales, Tex.) were dispersed in 388.0 g of deionized water in a beaker using a magnetic stir bar. Stirring was continued until the mixture was smooth and homogeneous.

Dispersion II—4% nano-clay dispersion: 16.0 g of Bentolite™SSP Nano-clay were dispersed in 384.0 g of deionized water in a beaker using a magnetic stir bar. Stirring was continued until the mixture was smooth and homogeneous.

Dispersion III—5% nano-clay dispersion: 20.0 g of Bentolite™SSP nano-clay were dispersed in 380.0 g of deionized water in a beaker using a magnetic stir bar. Stirring was continued until the mixture was smooth and homogeneous.

EXAMPLE 1

A primary dispersion was prepared by charging 87.0 g Dispersion III to a beaker and adding 13.0 g of isopropyl alcohol while stirring with a magnetic stir bar. A series of 9 cm by 9 cm green, ceramic fiber, paper coupons were impregnated by immersing the entire coupon into the primary dispersion on one side for 10 seconds, turning the coupon over and immersing it in the dispersion for an additional 10 seconds. After impregnation, the coupons were hung vertically and air dried overnight at room temperature (about 25° C.). The air dried coupons were then dried in a vented oven at 100° C. for 30 minutes, and then calcined and fired in a vented box furnace in air using the following heating sequence: room temperature to 500° C. in 3 hours; hold at 500° C. for 1 hour; heat from 500° C. to 1100° C. in 2 hours; hold at 1100° C. for 1 hour; cool in furnace to room temperature. The fired coupons are referred to as Coupon A.

EXAMPLE 2

A beaker was charged with 85.06 g of Dispersion 1, and 2.18 g of silicon carbide (SiC) powder having an approximate surface area of 5 square meters per gram (UF5 SiC available from H.C. Starch, Newton Mass.) were added while stirring. The dispersion was then sonicated, i.e., ultrasonically treated, for about 3 minutes using a Branson Sonifier Cell Disruptor 350 (Branson Ultrasonics Corporation, Danbury, Conn.) fitted with a high energy, 5.1 mm titanium horn to homogenize the dispersion. The dispersion was magnetically stirred during ultrasonic treatment. Then 12.76 g of isopropyl alcohol was stirred into the dispersion to form a primary dispersion. Green ceramic paper coupons were impregnated, dried, calcined, and fired according to the procedure in Example 1. The fired coupons are referred to as Coupon B.

EXAMPLE 3

A primary dispersion was prepared according to the procedure of Example 2 except 2.18 g of a silicon carbide powder having an average particle size of about 3 micrometer (1200 black SiC available from Electro Abrasives, Buffalo, N.Y.) were used instead of UF5 SiC. Green ceramic paper coupons were impregnated, dried, calcined, and fired according to the procedure in Example 1. The fired coupons are referred to as Coupon C.

EXAMPLE 4

A primary dispersion was prepared according to the procedure of Example 3 except 2.18 g of a silicon carbide powder having an average particle size of about 2.5 micrometers (1200/F black SiC available from ElectroAbrasives, Buffalo N.Y.) were used instead of the 3 micrometer SiC particles. Green ceramic paper coupons were impregnated, dried, calcined, and fired according to the procedure in Example 1. The fired coupons are referred to as Coupon D.

EXAMPLE 5

A primary dispersion was prepared according to the procedure of Example 2 using 84.68 g of Dispersion II, 2.62 g of UF5 SiC, and 12.70 g of isopropyl alcohol were used. Green, ceramic fiber, paper coupons were impregnated, dried, calcined, and fired according to the procedure in Example 1. The fired coupons are referred to as Coupon E.

EXAMPLES 6–35

Examples 6–35 were prepared by impregnating fired coupons (Coupon A–Coupon E) of Examples 1–5 with a second dispersion as noted below and in Table I. The coupons were impregnated with the second dispersion, air dried, and oven dried according to the procedures of Example 1. The dried coupons were then fired in a vented box furnace in air using the following heating sequence: room temperature to 500° C. in 2 hours; 500° C. to 1100° C. in 3 hours; hold at 1100° C. for 1 hour; cool with furnace to room temperature. The strength (indicated as peak load), stiffness, and permeability were tested and test results are shown in Table 1. The values for Peak Load and Stiffness are the average of three values.

Sol A (15% boehmite dispersion) was prepared by stirring 15.0 g of aluminum oxide monohydrate powder (Disperal™ boehmite, available from Condea Vista Co., Houston, Tex.) into 85 mls of deionized water, and then adding of 10 drops of concentrated nitric acid to the mixture to disperse the boehmite.

Soln A (15% zirconyl acetate solution) was prepared by diluting 100.0 g of a 21.4% zirconyl acetate solution (available from Magnesium Electron Inc., Flemington, N.J.) with 42.67 g of deionized water.

Sol B (30% silica dispersion) was prepared by diluting 100.0 g of a 50% solids colloidal silica having an average particle size of 60 nanometers (Nalco™1060 colloidal silica available from Nalco Chemical Co., Oak Brook Ill.) with 66.7 g of deionized water.

Sol C was prepared by stirring 5.0 g of UF5 SiC into 95.0 g of Sol A and sonicating for about 3 minutes.

Sol D was prepared by adding 5.0 g of UF5 SiC to 95.0 g of Soln A with rapid stirring and sonicating for about 3 minutes.

Sol E was prepared by adding 5.0 g of UF5 SiC to 95.0 g of Sol B with rapid stirring and sonicating for about 3 minutes.

Sol F was prepared by adding 5.0 g of UF5 SiC to 95.0 g of deionized water with rapid stirring and sonicating for about 3 minutes.

Sol G was prepared adding 2.5 g of UF5 SiC to 97.5 g of deionized water with rapid stirring and sonicating for about 3 minutes.

Sol H was prepared by adding 2.5 g of UF5 SiC to 97.5 g of Soln A with stirring and sonicating for about 3 minutes.

Sol I was prepared by adding 2.5 g of UF5 SiC to 97.5 g of Sol B and sonicating for about 3 minutes.

Sol J—A dispersion was prepared by mixing 31.15 g of Sol A, 52.7 g of Soln A, and 12.84 g of Sol B, and sonicating for 5 minutes. Then 3.3 g of UF5 SiC were added and sonicated for about 3 minutes to form Sol J.

Sol K was prepared by stirring 5.0 g of UF5 SiC into 95.0 g Dispersion II. The resulting dispersion was sonicated for about 3 minutes.

Sol L (15% colloidal silica dispersion) was prepared by diluting 100.0 g of Nalco 1060 colloidal silica with 233.3 g of deionized water.

Sol M was prepared by mixing 10 g of Sol L and 85 g of Dispersion I with rapid stirring and sonicating for about 3 minutes. Then 5.0 g of UF5 SiC powder were added with rapid stirring and sonicated for another 3 minutes to form Sol L.

Sol N was prepared by stirring 2.5 g of UF5 SiC powder into 97.5 g of Sol B and sonicating for about 3 minutes.

Sol O— A dispersion was prepared by stirring 2.5 g of ElectroAbrasive 1200 black SiC powder to 87.5 g of Dispersion I and sonicating for about 3 minutes. Then 10.0 g of Sol L were added with rapid stirring to the nano-clay/silicon carbide dispersion and sonicated for another 3 minutes.

Sol P was prepared according to the procedure for Sol O using 5.0 g of 1200 black SiC powder, 85 g of Dispersion I, and 10 g of Sol L.

Sol Q was prepared according to the procedure for Sol O using 7.5 g of 1200 black SiC powder, 82.5 g of Dispersion I, and 10 g of Sol L.

Sol R was prepared according to the procedure for Sol O using 10.0 g of 1200 black SiC powder, 80.0 g of Dispersion I, and 10 g of Sol L.

Sol S was prepared according to the procedure for Sol O using 12.5 g of 1200 black SiC powder, 77.5 g of Dispersion I, and 10 g of Sol L.

Sol T was prepared according to the procedure for Sol O using 15.0 g of 1200 black SiC powder, 75.0 g of Dispersion I, and 10 g of Sol L.

Sol U was prepared according to the procedure and materials for Sol O except that 1200/F black SiC powder was used.

Sol V was prepared according to the procedure and materials for Sol P except that 1200/F black SiC powder was used.

Sol W was prepared according to the procedure and materials for Sol Q except that 1200/F black SiC powder was used.

Sol X was prepared according to the procedure and materials for Sol R except that 1200/F black SiC powder was used.

Sol Y was prepared according to the procedure and materials for Sol S except that 1200/F black SiC powder was used.

Sol Z was prepared according to the procedure and materials for Sol T except that 1200/F black SiC powder was used.

TABLE I

| Ex | Coupon | Second Impregnating Dispersion | Avg Peak Load (grams) | Stiffness (N/mm) | Permeability (cc/sec/cm2) |
|---|---|---|---|---|---|
| 6 | A | Sol A | 110.18 | 3.49 | 12.78 |
| 7 | A | Soln A | 146.48 | 5.30 | 14.06 |
| 8 | A | Sol B | 540.84 | 20.84 | 8.44 |
| 9 | A | Sol C | 215.83 | 10.82 | 11.25 |
| 10 | A | Sol D | 227.57 | 9.43 | 9.97 |
| 11 | A | Sol E | 677.79 | 24.77 | 8.69 |
| 12 | A | Sol F | 230.99 | 8.53 | 17.13 |
| 13 | A | Sol G | 215.93 | 9.93 | 11.76 |
| 14 | A | Sol H | 162.27 | 6.70 | 11.50 |
| 15 | A | Sol I | 542.94 | 22.83 | 8.69 |
| 16 | A | Sol J | 219.29 | 9.10 | 9.46 |
| 17 | A | Dispersion III | 272.38 | 9.77 | 18.15 |
| 18 | A | Sol K | 368.27 | 13.46 | 13.81 |
| 19 | B | Sol L | 298.49 | 13.16 | 10.48 |
| 20 | B | Sol M | 296.82 | 13.80 | 10.48 |
| 21 | B | Sol C | 228.87 | 11.36 | 9.20 |
| 22 | B | Sol K | 360.28 | 15.54 | 10.23 |
| 23 | C | Sol O | 173.09 | 8.21 | 16.36 |

TABLE I-continued

| Ex | Coupon | Second Impregnating Dispersion | Avg Peak Load (grams) | Stiffness (N/mm) | Permeability (cc/sec/cm2) |
|---|---|---|---|---|---|
| 24 | C | Sol P | 209.48 | 9.26 | 14.57 |
| 25 | C | Sol Q | 195.57 | 9.04 | 12.78 |
| 26 | C | Sol R | 246.37 | 11.74 | 11.89 |
| 27 | C | Sol S | 297.16 | 14.72 | 9.97 |
| 28 | C | Sol T | 345.88 | 17.37 | 9.46 |
| 29 | D | Sol U | 274.08 | 12.94 | 13.68 |
| 30 | D | Sol V | 301.99 | 13.74 | 12.78 |
| 31 | D | Sol W | 300.41 | 14.79 | 10.99 |
| 32 | D | Sol X | 322.60 | 15.86 | 10.23 |
| 33 | D | Sol Y | 348.64 | 16.98 | 8.44 |
| 34 | D | Sol Z | 385.43 | 19.16 | 7.16 |
| 35 | B | Sol K | 384.85 | 17.32 | 7.41 |

The data in Table I show that the finished coupons had properties that indicate the fired materials are suitable for a filter. Particularly suitable examples have both relatively high strength and relatively high permeability.

EXAMPLE 36

A 5% nano-clay dispersion was prepared by dispersing 70.0 g of Bentolite™SSP nano-clay in 1330.0 g of deionized water. Then 210 g of isopropyl alcohol were added and mixed until homogeneous to form a primary dispersion.

A green ceramic fiber filter prepared according to the above-described procedure, was placed in a 19 cm by 10 cm bowl with one of the flat ends pointed down. About half of the primary dispersion was poured over the top of the filter in a circular manner beginning from the center. The filter was turned over, and the remainder of the primary dispersion was poured onto the filter in the same manner, allowing the entire filter to be penetrated by the dispersion. The excess dispersion was removed by gently shaking the filter and draining it on paper towels. The filter was turned over every hour and air dried at ambient temperature for a total of 4 hours. The air-dried filter was further dried in an oven at 99° C. for 12 hours. The filter was calcined and fired according to the following heating sequence: 2 hours from ambient temperature to 200° C.; hold for 2 hours at 200° C.; 2 hours to 250° C.; 250° C. for 2 hours; 2 hours to 350° C.; hold at 350° C. for 2 hours; 2 hours to 400° C.; hold at 400° C. for 2 hours; 2 hours to 450° C.; hold at 450° C. for 2 hours; 2 hours to 500° C.; hold at 500° C. for 0.5 hour; 1 hour to 1000° C., and then hold at 1000° C. for 0.5 hour. The filter was allowed to cool with the furnace. The filter was not intentionally cooled between the calcining and subsequent firing process.

After firing, the filter was rigid, lightweight, and fairly strong. A dispersion was prepared by dispersing 144 g of boehmite particles (Disperal™ boehmite) in 818 g of deionized water using 3.5 mls of concentrated nitric acid as a dispersant. 160 grams of Sol L was acidified with 0.8 mls of concentrated nitric acid and added to the boehmite dispersion with rapid stirring. After mixing, 480 g of Soln A added and stirred to homogenize. The resulting dispersion, containing the boehmite, colloidal silica, and zirconyl acetate was impregnated into the once impregnated and fired filter in a manner similar to the first impregnation. The impregnated filter was air dried for 4 hours, dried in an oven at 99° C. overnight, and then cooled to room temperature.

An edge-coating dispersion was prepared by adding 178.5 g of aluminum oxide powder (Alcoa™ SG15 alumina available from Alcoa Industrial Chemicals, Bauxite, Ariz.) to 86.6 g of deionized water and mixing to form a thick mixture. Then 1.45 g of a dispersant (Darvan™C dispersant available from R. T. Vanderbuilt Company, Incorporated, Norwalk, Conn.) were added, followed by the addition of 3.75 g of a 39.7% sodium silicate solution having an SiO2/Na20 ratio of 2.75 (PD Sodium Silicate available from PQ Corp., Valley Forge, Pa.). The dispersants thinned the mixture, and 19.83 g of zirconium oxide powder were added. The mixture was treated with a high energy sonifier for 13 minutes. Then 5.95 g of ethylene glycol were added and mixed.

The edge coating was applied by dipping the flat edges of the impregnated and dried ceramic fiber filter into the edge coating dispersion to a depth of about 0.6–1.0 cm. After applying the edge coating dispersion to both edges of the filter, the filter was shaken gently to remove excess coating and air was blown into the coated ends to ensure that the dispersion did not block the channels. The edge-coated filter was dried in air at ambient temperature for about 2 hours, further dried in an oven at 99° C. for 4 hours, and then calcined and fired according to the following sequence: 3 hours from 100° C. to 500° C.; hold at 500° C. for 1 hour; 500° C. to 1000° C. in 2 hours; hold at 1000° C. for 0.5 hour; and cooled with the furnace.

The finished filter was mounted in a metal can and tested for efficiency according to the above test method. At 20 kPa pressure drop, the efficiency in removing the particulate exhaust material was found to be 95.9% efficient. At 40 kPa pressure drop, the efficiency in removing particulate exhaust material was found to be 95.1%.

EXAMPLE 37

A dispersion was prepared by mixing 1400.0 g of Dispersion I with 35.9 g of UF5 SiC powder with a stir bar and then sonicating for 15 minutes. Then 210 g of isopropyl alcohol were added and stirred with a magnetic stirrer to form a homogeneous primary dispersion. A green ceramic fiber filter was formed, impregnated with the dispersion, and dried according to the procedure described in Example 36. The filter was then calcined and fired according to the following sequence: hold for 2 hours at 100° C.; 100° C. to 500° C. in 4 hours; hold at 500° C. for 3 hours; 500° C. to 1000° C. in 2 hours; and hold at 1000° C. for 0.5 hour; and then cool with the furnace.

After the initial impregnation and firing the filter was light in weight but strong. A second impregnation dispersion was prepared by mixing 1156 g of a Dispersion I with 68.0 g of UF5 SiC and 136.0 g of a Sol L. After mixing, the dispersion was sonicated for 15 minutes while stirring to produce a homogeneous mixed particle dispersion. The impregnated, calcined and fired ceramic fiber filter was impregnated a second time and dried as described in Example 36.

An edge coating dispersion was prepared by dispersing 535.5 g of Alcoa 15SG alumina with rapid stirring in 252.0 g of deionized water and adding of 4.35 g of Darvan C, then adding 11.25 g of PD sodium silicate. Then 59.49 g of zirconium oxide powder and 20.3 g of UF 5 SiC were added and the mixture was sonicated while stirring for 20 minutes. Then 17.85 mls of ethylene glycol were added and stirred until homogeneous. The dried, twice impregnated filter was edge coated using this dispersion according to the procedure of Example 36. After drying, the edge-coated filter was dried, calcined, and fired according to the following sequence hold at 100° C. for 2 hours; heat from 100° C. to 500° C. in 3 hours; hold at 500° C. for 1 hour; heat from 500° C. to 1100° C. in 2 hours; hold at 1100° C. for 0.5 hour; then cool with the furnace.

The finished ceramic fiber filter was tested according to the Efficiency and Soot Holding Method. The results showed that at a pressure drop of 20 kPa, the efficiency was 99.4% and the soot holding was 11.0 grams. At a pressure drop of 40, the efficiency was 96.1% and the soot-holding was 34.0 g.

EXAMPLES 38–42

Examples 38–42 illustrate different penetrating agents useful in the first impregnation. A dispersion was prepared by dispersing 2.93 parts of Bentolite™SSP nano-clay and 2.5 parts of silicon carbide powder (1200 black SiC from ElectroAbrasives) in 94.58 parts of deionized water and sonicating to form a homogeneous dispersion. A penetrating agent was mixed into the dispersion to form a primary dispersion.

For Example 38, 26.0 g of isopropyl alcohol were mixed with 200.0 g of the dispersion to form a primary dispersion.

For Example 39, 10.0 g of Tergitol™TMN10 (Union Carbide, Danbury, Conn.) were added and mixed with 1600 g of the dispersion to form a primary dispersion.

For Example 40, 3.58 g of Aerosol OT-S (70%) (Cytec Industries, Inc., West Paterson, N.J.) were added and mixed with 1600 g of the dispersion to form a primary dispersion.

A 9 cm by 9 cm coupon of green, ceramic fiber paper, described above, was impregnated by totally immersing the coupon into the primary dispersion. The impregnated paper was removed from the impregnating solution bath, hung vertically, and allowed to air dry for 2 hours at ambient temperature (approximately 23° C.). The coupon was transferred to an oven at 100° C. and dried overnight.

For Examples 41–42, the remainder of the impregnation solutions for Examples 39 and 40 were used to impregnate green ceramic fiber filters for Examples 41 and 42, respectively, by pouring the impregnation solution into and through the filters until they were totally saturated. The filters were turned over and the process was repeated. The impregnated filters air dried for 24 hours at ambient temperature and then dried in an oven at 85° C. for 24 hours.

The three impregnated test coupons of Examples 38–40 and the two impregnated, green ceramic fiber filters of Examples 41 and 42 were calcined and fired in a large box furnace according to following heating sequence: from room temperature to 250° C. in 1 hour; hold at 250° C. for 5 minutes; from 250° C. to 270° C. in 3 hours; hold at 270° C. for 3 hours; from 270° C. to 300° C. in 2 hours; from 300° C. to 450° C. in 1 hour; hold at 450° C. for 2 hours; from 450° C. to 1000° C. in 2 hours; hold at 1000° C. for 15 minutes; cool with the furnace. The samples were removed after the temperature had fallen below about 200° C.

A second impregnation dispersion was prepared by dispersing and mixing 185.0 g of Bentolite™ SSP nano-clay and 375.0 g of ElectroAbrasives 1200/F black silicon carbide in 4440 g of deionized water. The fired test coupons of Examples 38–40 and the fired ceramic fiber filters of Examples 41–42 were impregnated a second time with this dispersion. The samples were air dried for about 2 hours at ambient temperature and then dried in the oven at 85° C. overnight. The samples were then calcined and fired according to the following sequence: from room temperature to 85° C. in 15 minutes; hold at 85° C. for 2 hours; from 85° C. to 500° C. in 2 hours; hold at 500° C. for 1 hour; from 500° C. to 1100° C. in 3 hours; hold at 100° C. for 1 hour; then cool with the furnace. The samples were removed from the furnace after the furnace temperature had fallen below 200° C.

The fired ceramic filters of Examples 41 and 42 were edge coated and fired according to the procedure in Example 37.

The coupons from Examples 38–40 were tested for permeability and strength and results are shown in the Table II.

TABLE II

| Ex | Penetrating Agent | Peak Load (gram) | Stiffness (N/mm) | Permeability (cc/sec/cm2) |
|----|-------------------|------------------|------------------|---------------------------|
| 38 | Isopropyl alcohol | 230.9 | 10.84 | 15.3 |
| 39 | Tergitol TMN 10 | 326.0 | 12.63 | 2.55 |
| 40 | Aerosol OT-S | 224.5 | 11.12 | 16.32 |

The ceramic fiber filters for Examples 41 and 42 were tested for efficiency in removing diesel exhaust particulate matter using the method described in Example 36. The results are summarized in Table III

TABLE III

| | | Efficiency | | Soot Holding (grams) | |
|---|---|---|---|---|---|
| Ex | Penetrating Agent | @ 10 kPa | @ 20 kPa | @ 20 kPa | @ 40 kPa |
| 41 | Tergitol TMN 10 | 90% | 88.5% | 13.0 | 27.5 |
| 42 | Aerosol OT-S | 95% | 97.5% | 12.5 | 32.0 |

EXAMPLE 43–44

Finished filters were prepared according to the procedure in Example 36 up until the preparation for the edge coating except that the second impregnation step used the different dispersions described below for Examples 43–44. The filters were edge coated using the dispersion, and the drying and firing sequence according to Example 37. The finished filters were tested efficiency and soot holding, and results are shown in Table IV.

EXAMPLE 43

A second impregnation dispersion was prepared by mixing 1400 g of Sol L with 35.9 g of UF5 SiC powder, and sonicating for 15 minutes while stirring.

EXAMPLE 44

A second impregnation dispersion was prepared by dispersing 210.0 g of Disperal™ boehmite in 1190 g of deionized water and adding 5.18 ml of concentrated nitric acid while rapidly stirring. Then 73.68 g of UF5 SiC powder were added and the dispersion was sonicated for about 20 minutes.

EXAMPLE 45

A primary dispersion was prepared by dispersing 52.0 g of Bentolite™SSP nano-clay with 40.2 g of UF5 SIC in 1248 g of deionized water, sonicating for 20 minutes to homogenize and then adding 195 g of isopropyl alcohol. A green ceramic fiber filter was impregnated with the dispersion, dried, calcined, and fired according to the procedure in Example 36. A second impregnation dispersion was prepared by dispersing 57.0 g of Bentolite SSP nano-clay with 75.0 g of UF5 SiC in 1368 g of deionized water. The mixture was sonicated for 20 minutes to homogenize the dispersion. The impregnated, dried and fired filter element was impregnated with the second impregnation dispersion, dried, edge-coated, dried and fired according to the procedure in Example 36. Test results for efficiency are shown in Table IV.

EXAMPLE 46

A primary dispersion was prepared by adding 195 g of isopropyl alcohol to 2600 grams of Dispersion III. A green filter element was impregnated with this dispersion, dried, calcined, and fired according to the procedure in Example 36. The filter was then impregnated a second time with Dispersion III, dried, edge coated, dried, calcined, and fired according to Example 45. Testing for efficiency and soot holding are shown in Table IV.

EXAMPLE 47

A primary dispersion was prepared by dispersing 42.0 g of Bentolite SSP nano-clay and 35.9 g of UF5 SiC in 1358 g of deionized water. The dispersion was sonicated for 20 minutes to homogenize, and 224 g of isopropyl alcohol were added and mixed thoroughly. A green filter was impregnated with the resulting dispersion, dried, calcined, and fired according to the procedure of Example 36. A second impregnation dispersion was prepared by dispersing 35.7 g of Bentolite SSP nano-clay and 70.0 g of 1200/f black SiC in 1154.3 g of deionized water. The dispersion was sonicated for 20 minutes to homogenize, and 140.0 g of Sol L were added and mixed. The once fired filter was impregnated with the dispersion, dried, edge-coated, and dried, calcined, and fired according to the procedure in Example 45.

EXAMPLE 48

A primary dispersion having 2.55% Bentolite SSP nano-clay, 2.18% UF5 SiC and 12.76% isopropyl alcohol was prepared according to Example 47. A green filter was impregnated by immersing the filter into the dispersion three times. During immersion, the filter was turned to allow the air to escape from the filter channels. Excess dispersion was drained from the filter, and the filter was dried, calcined and fired according to the procedure in Example 36.

A second impregnation dispersion was prepared by mixing 1400 g of Sol L with 35.9 g of UF5 SiC powder and sonicating for 15 minutes while stirring to homogenize. The filter was impregnated with the resulting dispersion and dried according to the procedure in Example 36. An edge coating mixture was prepared by dispersing 400.0 g of Alcoa 15SG alumina and 62.5 g of 1200/F black SiC in 196.7 g of deionized water using 62.5 g of PD sodium silicate solution and 3.58 g of Darvan C according to the procedure in Example 37. 7.5 mls of ethylene glycol were added as a drying modifier. The dried filter was edge-coated using this edge-coating dispersion and then dried, calcined, and fired according to the procedure in Example 37.

TABLE IV

| | Efficiency - % | | Soot Holding (grams) | |
|---|---|---|---|---|
| Ex | @ 20 kPa | @ 40 kPa | @ 20 kPa | @ 40 kPa |
| 43 | 100 | 93.9 | 9.5 | 35.5 |
| 44 | 95.8 | 98.4 | nt | nt |
| 45 | 95.8 | 76.3 | nt | nt |
| 46 | 90.5 | 80.0 | 13.5 | 34 |
| 47 | 89.5 | 94.2 | 14.5 | 30.5 |
| 48 | 92.7 | 93.7 | 11.0 | 33.5 | nt = not tested

EXAMPLE 49

A green ceramic filter was prepared according to the above described procedure except that the following plug material was used. The plug material was prepared by mixing 35.97 g of water with 142.24 g of alumina (A3000FL-Al2O3 available from Alcoa) by hand stirring to disperse the alumina. Then 4.14 g of kaolin fiber and 2.52 g of mullite fiber were mixed in. After adding 71.62 g of silica sol (Nalco™ 1050) the mixture was shear mixed with a Cowles blade apparatus at a speed of about 29 inches/sec (73.7 cm/sec). During the shearing 19.74 g of A3000FL alumina and 31.98 g A12TiO5 particles were added. Afterwards, alumina and silicon carbide particles were slowly added in batches as follows: 37.62 g A3000FL alumina, then 21.88 g A3000FL alumina, and then 36.15 g of green SiC. Finally, 5.3 g of blown soybean oil was added. The soybean oil appears to act as a lubricant for the particles. The mixture was then sheared with the Cowles blade at about 10 to 20 inches/sec (38 to 51 cm/sec) for about 10 minutes. The resulting viscosity was between about 3500 to 3920 cps. The viscosity can be further modified as needed by adding, dropwise, water to reduce it or blown soybean oil to raise it. After coating on the paper, the plug material was dried slowly to avoid cracking.

The percentage composition of the plug material is approximately as follows:

| | | | |
|---|---|---|---|
| Al2O3 | 55% | SiC | 8.9% |
| Water | 17% | SiO2 (in Nalco sol) | 8.8% |
| Fiber | 1.6% | Blown soybean oil | 1.3% |
| Al2TiO5 | 7.9% | | |

A critical characteristic of the inventive ceramic fiber based wall flow substrate or filter is its capability to filter out very small particles efficiently. It is widely known that in the diesel exhaust stream, the very small particles, often called nano-particles, are the most dangerous in terms of health hazards (see for example: D. Warheit, W. Seidel, M. Carakostas and M. Hartsky, "Attenuation of Perfluoropolymer Fume Pulmonary Toxicity: Effect of Filters, Combustion Method and Aerosol Age" Pulmonary Toxicity of Perfluropolymer Fumes, Academic Press, pp. 309–329, 1990). The filter can be made, via the process herein disclosed, so as to exhibit a higher nano- particle filtration efficiency than was previously possible. The present filters can filter out greater than about 97%, and even greater than about 98%, of the smaller particles (i.e., those less than 150 nms in diameter) found in a diesel exhaust. The filter can also be made, as herein disclosed, to filter out greater than about 98%, preferably greater than about 99%, and more preferably greater than about 99.5% of the very small particles (i.e., those with diameters between 10 and 20 nms) found in a diesel exhaust. The wall flow substrate can perform similarly as a filter in other particulate exhaust streams.

Nano-particle filtration efficiency was measured by the method of Liu et al (Z. G. Liu, B. M. Verdegan, K. M. A. Badeau and T. P. Sonsalla, SAE Technical Paper 2002-010-1007) using a 2000 model year Cummin's ISB diesel engine with direct injection using an electric dynamometer to control engine torque and speed. The engine was run at ISO 8178 modes. The filter of the '333 invention was characterized using this technique. A commercially available Corning 100 dpi cordierite filter was also tested in this manner, for comparison (Corning Incorporated, Corning, N.Y.). In this test, the efficiency of the filter was tested with regard to particulate particle size. For small particle sizes (in the range of 10–150 nms), the '333 filter averaged greater than about 99% efficiency and for the very small particle sizes (between 10–20 nms), the '333 filter averaged greater than about 99.5% efficiency. The commercially available Corning filter averaged less than 96.5% efficiency between 10–150 nms and less than 90% efficient for the very small particle sizes.

The '333 ceramic fiber-based wall flow substrate or filter can be heated up very rapidly and cooled down very rapidly. In use a filter for a diesel engine exhaust will generally accumulate carbonaceous soot that will require periodic removal via oxidation. Oxidation catalysts can be used to lower the temperature at which the soot will begin to burn but even with the use of oxidation catalysts, additional heat may need to be added to induce soot oxidation. Since the addition of heat by an external source requires the expenditure of energy, it is desirable for the filter to heat up very rapidly when exposed to hotter exhaust gas or when heated externally so as to minimize the energy expenditure required to remove the soot. The ceramic fiber based wall flow substrates described herein can have a very rapid thermal response. The thermal response of the filter can be, desirably, greater than 1.8° C./second, preferably, greater than 2.0° C./second and, more preferably, greater than 2.3° C./second.

The thermal response of the ceramic fiber based filter of the '333 invention and two other commercially available filters (Ibiden Corporation, Ogaki City, Japan SiC 200 filter and a Corning, Corning, N.Y., Cordierite 200 filter) were measured as follows:

A 5.66"×6" composite filter was sleeved in a metallic housing, provided by Fleetguard Inc. of Stoughton, Wis., using a mounting mat supplied by 3M Company of St. Paul, Minn. (Interam 1101 HT, 1540 g/M2). The sleeved filter assembly was connected to the exhaust pipe downstream of a Cummins 3.41 IDI industrial diesel engine. The filter was loaded with soot to a pressure drop of 20 kPa by running the engine at 2400 rpm/12.4 MPa. Once the target pressure drop was achieved, the exhaust gas was by-passed around the sleeved filter assembly. Hot air is then introduced into the filter by passing 0.85 cubic meters per minute (i.e., 30 standard cubic feet per minute) of room air through an Osram Sylvannia Products Inc. Sureheat 072781 process heater supplied by Pyromatic Incorporated (Wauwatosa, Wis.). In this configuration, the process heater is located upstream of the sleeved filter assembly. The heater control is set to 700° C. and measured at the outlet of the process heater. After the outlet temperature reaches 600–650° C., the heater air is passed through the sleeved filter assembly and is run for 20 minutes. Filter temperature is monitored from the downstream end of the filter by inserting a Type K Omega (Omega Instruments, Inc., Stamford, Conn.) thermocouples 7.6 cm deep into the center of the filter. Filter temperature and sleeved filter assembly pressure drop is monitored throughout the test. A plot of temperature versus time for the inner portion of the filter yields a graph that displays the heat-up characteristics of the filter. The change in temperature versus time for the first 181 seconds provides a measure of the heat up rate. The ceramic fiber based filter heated up at a rate of 2.36° C./second, the SiC 200 filter heated up at a rate of 1.00° C./second, and the Cordierite 200 filter heated up at a rate of 1.73° C./second. A more rapid heat up rate such as is exhibited by the inventive filter is desired so that the filter will be able to regenerate with a lower energy penalty.

The '333 inventive ceramic fiber-based substrate can exhibit a high push out strength. A common mode of failure in filter substrates made from wound pleated paper is commonly called push-out or telescoping. In this failure, an interior portion of the filter separates from an exterior portion of the filter allowing the interior portion to push-out or telescope in the direction of the air flow. The ceramic fiber-based wall-flow substrates as described herein can be made to have high push-out strengths, e.g., higher than 0.275 MPa. Such a high push out strength is desirable for a durable, long-lasting filter for diesel engine exhausts.

It can be desirable to harden the outside end surfaces (i.e., that are exposed to the exhaust flowing through the substrate) of the present substrate. This hardening can be accomplished by using a separate coating on the end surfaces. It is believed that such hardening can improve the strength, wearability and/or surface coefficient of friction of the end surface. The materials used for this coating can be the same type of materials used to rigidify the substrate paper. These coating materials preferably include a hard phase (e.g., alpha alumina), durable phases (e.g., zirconia), mullite materials, cordierite materials, silicon or other carbides that can be bonded together with clays, colloidal silica (with or without colloidal alumina), colloidal alumina and mixtures of particles. Penetrating agents can be used, if desired. Similar coating materials can be used on the outer tubular surface of the substrate to improve the crush strength of the substrate and, thereby, enable higher pressure-exerting mounting mats to be used.

SECTION III—U.S. patent application Ser. No. 10/075,035

The following description is taken from above noted U.S. patent application Ser. No. 10/075,035 (the '035 application).

As noted in the '035 application, FIGS. 19–22 and the following description thereof are taken from the noted '913 patent.

FIGS. 19 and 20 show a combination catalytic converter and filter 310 for an internal combustion engine such as diesel engine 312. The combination catalytic converter and filter is provided by a single unitary flow member having an upstream frontside 314 and a downstream backside 316. Member 310 has a plurality of flow channels 318 extending axially from upstream frontside 314 to downstream backside 316. Each channel has left and right sidewalls such as 320 and 322 formed by pleated filter media 324, and top and bottom walls formed by respective upper and lower boundary layers 326 and 328. Left and right sidewalls 320 and 322 extend axially continuously from upstream frontside 314 to downstream backside 316. The sidewalls have upstream sections 330, 332, etc. proximate frontside 314, and downstream sections 334, 336, etc. proximate backside 316. Upstream sections 330, 332, etc. provide a catalytic section 333 treated with a catalyst for the exhaust. Downstream sections 334, 336, etc. provide a filter section 335 and have axially spaced alternately blocking sealants 338, 340, etc. in alternate channels such that exhaust flow must pass through pleated filter media 324 in filter section 335, as shown at arrows such as 337. Each of left and right sidewalls 320, 322, etc. extends axially rectilinearly from catalytic section 333 to filter section 335, maintaining exact axial alignment of the respective channels including the catalyzing and filtering sections thereof. Pleated filter media 324 is a continuous sheet spanning both catalytic section 333 and filter section 335.

In one preferred embodiment, catalytic section 333 is upstream of filter section 335. A first set of alternating blocking sealants 338, etc. are at the upstream ends of respective channels in filter section 335, and a second set of alternating blocking sealants 340, etc. are at downstream ends of respective channels in filter section 335. In this embodiment, it is preferred that the sidewalls of the channels of catalytic section 333 are perforated as shown at 342 such that exhaust flows through catalytic section 333 along a first set of alternate channels such as 343 rectilinearly aligned with a first set of alternate channels such as 344 in filter section 335, and exhaust also flows through catalytic section 333 along a second set of alternate channels such as 346 laterally offset from first set of channels 343 and communicating therewith through the perforations 342, such that exhaust flows through all of the channels of catalytic section 333 notwithstanding the noted alternating blocking sealants 338, 340 in filter section 335. Exhaust flow through all of the channels of catalytic section 333 is desirable to increase surface area for catalytic activity. In this embodiment, the noted first set of alternate channels 343 in catalytic section 333 are open at their downstream ends 347, and exhaust flows rectilinearly from such first set of channels 343 in catalytic section 333 to first set of alternate channels 344 in filter section 335. The downstream ends of the first set of channels 344 in filter section 335 are blocked by the noted second set of alternating blocking sealants 340. The noted second set of alternate channels 346 in catalytic section 333 are blocked at their downstream end by the noted first set of alternating blocking sealants 338 in the upstream ends of second set of alternate channels 348 in filter section 335. Perforations 342 are upstream of the noted first set of alternating blocking sealants 338, such that exhaust flows axially along the noted second set of channels 346 in catalytic section 333 and then laterally through perforations 342 as shown in dashed line at arrows such as 349 in FIG. 20 and joins the flow in the first set of channels 343 in catalytic section 333 flowing axially rectilinearly into the noted first set of channels 344 in filter section 335. Sealant is applied along the upper pleat tips as shown at 339 downstream of perforations 342, to seal the upper tips of pleated filter media 324 to upper boundary layer 326. Sealant is applied along the lower pleat tips as shown at 341 downstream of perforations 342, to seal the lower tips of pleated filter media 324 to lower boundary layer 328.

In another embodiment, the catalytic section may be downstream of the filter section, as shown in FIG. 21 at upstream filter section 352 and downstream catalytic section 354. In a further embodiment, a second catalytic section may be added to the configuration of FIG. 20 downstream of the filter section, such that a filter section is nested between two catalytic sections, i.e. catalyst/filter/catalyst, for example as shown in FIG. 22 at upstream catalytic section 356, downstream filter section 358 and further downstream catalytic section 360. In another embodiment, the filter section of the unitary member is treated with a catalyst. For example, in FIG. 20, filter section 335 is further treated with a catalyst to oxidize soot or collected contaminant, while the catalytic treatment in catalytic section 333 reduces or acts upon another gaseous portion of the exhaust. Thus, the device is provided with different catalytic treatments at different sections so that separate functions occur. In further embodiments, filter sections 352, FIGS. 21 and 358, FIG. 22, may also be provided with catalytic treatment. Other combinations and sequencing are possible.

In preferred form, the device of FIG. 19 is wrapped in a spiral, for example as shown in U.S. Pat. Nos. 4,652,286 and 5,908,480, incorporated herein by reference, to provide a multilayered structure. In such embodiment, one of the upper or lower boundary layers 326 or 328 may be eliminated, because in a spiral wrap the remaining layer provides the boundary for the channels on opposite sides thereof. Boundary layers 326 and/or 328 may be formed of a sheet of filter media or may be impervious to the exhaust flow. Boundary layers 326 and/or 328 may be perforated as shown at 350 and 352 which perforations are laterally aligned with perforations 342. In another embodiment, the single row of channels in FIG. 19 may be stacked, for example as shown in incorporated U.S. Pat. No. 4,652,286, to provide a plurality of rows and columns of channels. In such stacked structure one of the boundary layers 326 or 328 may be eliminated because the remaining layer will provide a boundary layer for the channels on opposite sides thereof, e.g. if top layer 326 is omitted, then layer 328 of the second row of channels will provide the bottom wall for such second row of channels and will provide the top wall for the first row of channels therebelow.

As noted in the '035 application, FIGS. 23–28 and the following description thereof are taken from the noted '300 application.

FIG. 23 shows an exhaust aftertreatment filter 400 for filtering internal combustion engine exhaust flowing along an axial direction 402, for example exhaust from diesel engine 404. The filter is provided by an axially extending cylindrical filter roll 406 spiral-wound from a sheet 408, FIG. 24, having corrugated pleats 410 thereon. First and second axially spaced sealing beads 412 and 414, provided by adhesive sealant or the like, extend laterally across the pleats, one of the beads such as 412 being beneath the pleats, and the other bead such as 414 being on the upper surface of the pleats. The sheet is wound as shown at arrow 416 from a starting side 418 to a terminating side 420, such that the filter roll has a plurality of concentric layers with pleats therebetween defined by wall segments 422, FIG. 26, extending radially in corrugated serpentine manner between pleat tips at axially extending bend lines 424. Wall segments 422 extend axially between first and second distally opposite axial ends 426 and 428, FIGS. 23–25, and define axial flow channels 430 therebetween. Sealing beads 412 and 414 provide first and second sets of plugs 432 and 434, FIG. 25, alternately sealing flow channels 430. Wall segments 422 are alternately sealed to each other by the first set of plugs 432 to define a first set of flow channels 436 closed by plugs 432 and a second set of flow channels 438 interdigitated with first set of flow channels 436 and having open left axial ends in FIG. 25. Wall segments 422 are alternately sealed to each other by the noted second set of plugs 434 axially spaced from first set 432 and closing the noted second set of flow channels 438. First set of flow channels 436 have open rightward axial ends in FIG. 25. The filter construction described thus far as to FIG. 23 is known in the prior art.

In the preferred embodiment, sealing beads 412 and 414 are laterally spaced from starting side 418, leftwardly in FIG. 24, to provide, after the noted rolling at 416, a third set of flow channels 440, FIG. 25, as open unsealed flow channels through an inner central section 442 of the filter roll when wound. Also in the preferred embodiment, sheet 408 and pleats 410 have a cut-out section 444, FIG. 24, along starting side 418 and along left axial end 426, such that after winding, the left axial ends of wall segments 422 of inner section 442 are axially recessed at 446, FIG. 25, from the left axial ends of the wall segments at outer annular section 448 of the filter roll. This is desired to provide better sealing to exhaust tube 450 from the engine, in embodiments where such exhaust tube 450 is used, to be described. The filter roll has an inner central face 452, FIGS. 26, 23, at the left axial ends of the wall segments of central inner section 442, and an outer annular face 454 at the left axial ends of the wall segments of outer section 448. Inner face 452 is spaced axially rightwardly at 446, FIG. 25, from outer face 454 at outer annular section 448. The noted third set of flow channels 440 are open at both the left and right axial ends.

Exhaust flow axially rightwardly in FIG. 25 as shown at arrows 456 flows through outer annular filtering section 448 having the noted alternately sealed flow channels 436 and 438 forcing exhaust to flow through wall segments 422 of the pleated filter media as shown at arrows 458. The exhaust flows through the open left axial ends of flow channels 438, then axially rightwardly therein, then through wall segments 422 of the pleated filter media as shown at arrows 458 into flow channels 436, then axially rightwardly in flow channels 436, and then through the open right axial ends of flow channels 436 as shown at arrows 458. Incoming exhaust flow at arrow 460 flows axially rightwardly through the open left axial ends of flow channels 440, then axially rightwardly in flow channels 440, then through open right axial ends of flow channels 440 as shown at arrow 462. Central inner section 442 is an open-flow section with open flow channels 440. Outer annular section 448 is a filtering section with alternately sealed flow channels 436, 438 forcing exhaust to flow through the pleated filter media as shown at 458. Sealing beads 412, 414 laterally spaced from starting side 418, FIG. 24, provide open-flow section 442 of filter roll 406 when wound. In an alternate embodiment, beads 412, 414 can instead be laterally spaced from terminating side 420, FIG. 24, to provide the open-flow section of the filter roll around the outer annular section thereof, and the filtering section as the central inner section.

Filter roll 406 is provided in an axially extending housing 470, FIG. 27, enclosing the filter roll and having axially distally opposite first and second plenums 472 and 474, an inlet port 476 in plenum 472, and an outlet port 478 in plenum 474. In the embodiment of FIG. 27, inlet exhaust tube 450 of FIGS. 23 and 25 is not used. Engine exhaust flows at 402 into plenum 472 from inlet port 476, and then flows in parallel as shown at arrows 460, 456 through inner and outer sections 442 and 448, respectively, of filter roll 406 to plenum 474 to exit at outlet port 478 as shown at arrows 462, 458. Engine exhaust flows as shown at arrow 460 from inlet plenum 472 through the noted third set of flow channels 440, FIG. 25, from the open left axial ends thereof to the open right axial ends thereof then into plenum 474. This central exhaust flow is not filtered, as illustrated in FIG. 25 at stippled inlet arrow 460 which remains stippled at outlet arrow 462. Engine exhaust also flows as shown at arrows 456 from inlet plenum 472, FIG. 27, into the open left axial ends of the noted second set of flow channels 438, FIG. 25, and then is filtered by passage through wall segments 422 of outer section 448 of the filter roll and then flows out of the open right axial ends of the noted first set of flow channels 436 into plenum 474. This outer annular portion of the exhaust flow is filtered as illustrated in FIG. 25 at stippled inlet arrow 456 and unstippled outlet arrow 458. In FIG. 27, the left axial ends of the central flow channels need not be recessed at 446 because there is no inlet exhaust tube 450 to seal thereat, and hence there is no need to cut-out the section at 444 in FIG. 24.

FIG. 28 shows another embodiment where it is desired to include cut-out section 444 in FIG. 24 to provide the noted recess at 446 in FIG. 25. The filter roll is provided in axially extending housing 470 having axially distally opposite plenums 472 and 474, an outlet port 480 in plenum 472, and inlet tube 450 supplying engine exhaust at 402 to the left axial end of central inner section 442 of the filter roll to supply exhaust to the left open axial ends of the noted third set of flow channels 440. Engine exhaust flows through the third set of flow channels 440 from the open left axial ends thereof to the open right axial ends thereof, then into plenum 474 wherein exhaust flow reverses as shown at 482 and flows into the open right axial ends of the first set of flow channels 436 and then is filtered by passing through wall segments 422 of the outer annular section 448 of the filter roll and flows out of the open left axial ends of the second set of flow channels 438 into plenum 472 and then to outlet port 480 as shown at arrow 484. Plenum 472 has an inlet port 486. Inlet tube 450 extends from inlet port 486 through plenum 472 to the left axial end of central inner section 442. In an alternate embodiment, the inlet and outlet of the housing in FIG. 28 may be reversed such that exhaust flows in the opposite direction, namely exhaust flows into plenum 472 from the now inlet port 480, then into the open left axial ends of the second set of flow channels 438 and then is filtered by passing through wall segments 422 of the outer annular section 448 of the filter roll and then flows out of the open right axial ends of the first set of flow channels 436 into plenum 474 wherein exhaust flow reverses and flows through the third set of flow channels 440 from the open right axial ends thereof to the open left axial ends thereof, then through the now outlet tube 450. In such embodiment, exhaust from diesel engine 404 is supplied to port 480, and port 486 is now an outlet port, with tube 450 now an outlet tube extending from the left axial end of central inner section 442 of the filter roll through plenum 472 to the now outlet port 486.

Pleated media 410 and sheet 408 of the filter are composed of regenerable material, for example ceramic material as in U.S. Pat. Nos. 4,017,347, 4,652,286, 5,322,537, and preferably of a high temperature composite ceramic material as disclosed in U.S. Pat. No. 6,444,006, all incorporated herein by reference. The filter is regenerated by heat, as applied by a separate gas burner, electric resistance heating, microwave energy, etc., for example as disclosed in U.S. Pat. Nos. 5,014,509, 5,052,178, 5,063,736, all incorporated herein by reference.

Corrugated central section 442 of the filter roll provides additional support, which is preferred over merely leaving such central section hollow, to provide a get-home feature for a truck even if the filter clogs. In addition, the starting run of pleated media 410 at 490, FIG. 24, along the span between starting side 418 and the beginning of sealing beads 412, 414, may be coated with an oxidation catalyst material, as in the noted '152 application, to reduce volatile organic fraction (VOF) particulate, and to act as a heater core to initiate soot light-off during operation. Central inner section 442 of the filter roll acts as a flow-through oxidation catalyst when a precious metal is applied to the pleats at 490. The particulate passing through this section would not be eliminated, but there would be reduction by oxidation of the volatile organic fraction. The added catalyst treatment may or may not be desired or needed depending upon application, such as whether the flow needs to be reversed such as in FIG. 28 for packaging or space requirements. The exothermic reaction occurring in central inner section 442 can act as a core heater to initiate filter regeneration. Upon addition of the catalytic treatment, a combination catalytic converter and filter is provided for internal combustion engine exhaust, including a first catalytic section 442 treated with a catalyst for the exhaust, and a second filter section 448 with alternately sealed flow channels 436, 438 forcing exhaust to flow through the pleated filter media. In FIG. 27, the sections are in parallel such that a first portion 460 of the exhaust flows through catalytic section 442 and is catalyzed thereby, and a second portion 456 of the exhaust flows through filter section 448 and is filtered thereby. The exhaust flow through catalytic section 442 is unfiltered. In FIG. 27, housing inlet 476 supplies engine exhaust to both sections 442 and 448, and housing outlet 478 receives exhaust from both sections 442 and 448 including a first catalyzed exhaust portion 462 and a second filtered exhaust portion 458. In FIG. 28, sections 442 and 448 are in series such that engine exhaust flows serially through each. In FIG. 28, housing inlet 486 supplies engine exhaust to section 442, and housing outlet 480 receives engine exhaust from section 448, the exhaust at outlet 480 being both catalyzed and filtered.

FIGS. 29–37 show the invention of the noted '035 application.

FIGS. 29–31 show an exhaust aftertreatment combined filter and catalytic converter 502 for treating exhaust as shown at arrow 504, for example from an internal combustion engine such as diesel engine 506. Device 502 has a plurality of flow channels 508 each having both: a) a flow-through channel 510, FIG. 31, catalytically reacting with the exhaust; and b) a wall-flow channel 512 trapping particulate. Exhaust aftertreatment combined filter and catalytic converter 502 is preferably provided by a plurality of sheets 514, 516, 518, 520. As in the noted '913 patent, one of the upper or lower boundary layers 514 or 520 may be eliminated when the device is wound in a spiral wrap, FIG. 32, because the remaining layer provides the boundary for the channels on the opposite sides thereof. Likewise in a stacked structure with a plurality of rows and columns of channels, one of the boundary layers 514 or 520 may be eliminated because the remaining layer will provide a boundary layer for the channels on the opposite sides thereof, e.g. if top layer 520 is omitted, then layer 514 of the second row of channels will provide the bottom wall for such second row of channels and will provide the top wall for the first row of channels therebelow.

Engine exhaust flows axially along an axial flow direction as shown at arrow 504 along an axis 522 through device 502. Sheet 516 is pleated and forms with sheet 514 the noted plurality of axially extending flow channels 508. Sheet 516 has a plurality of pleats 524 defined by wall segments such as 526 and 528 extending in spaced alternating manner between pleat tips such as 530, 532, 534, 536 at axially extending bend lines such as 538, 540, 542, 544. The pleat tips on one side of sheet 516, such as pleat tips 546 and 548 on the bottom side of the sheet, are in contiguous relation with sheet 514 and bonded thereto by sealant, as in the above applications. The pleat tips on the other side of sheet 516, such as pleat tips 534 and 535 on the top side of the sheet, are in contiguous relation with the upper boundary layer sheet and bonded thereto with sealant, which upper boundary layer may be sheet 520 or may be the next layer wrap of sheet 514 in the case of spiral winding or may be the boundary layer for the row thereabove in the case of stacking. Sheet 518 has a plurality of pleats such as 550 defined by wall segments such as 552 and 554 extending in zig-zag manner between pleat tips such as 556 and 558 at transversely extending bend lines such as 560 and 562 which extend transversely along transverse direction 564 relative to axis 522 and transversely relative to sheet 514. Sheet 514 extends axially along axis 522 and laterally along lateral direction 566 relative to transversely extending bend lines 560, 562 of pleat tips 556, 558 of sheet 518. Axial direction 522, transverse direction 564, and lateral direction 566 are all orthogonal relative to each other.

Sheet 516 is rectangularly pleated and has spanning segments 568 extending laterally between respective adjacent wall segments 526 and 528 of sheet 516 such that the respective flow channel 508 is bounded by distally laterally spaced wall segments 526 and 528 of sheet 516 defining flow channel 508 therebetween, and by a respective spanning segment 568 distally spaced transversely from sheet 514 and defining flow channel 508 therebetween. Wall segments 552 and 554 of sheet 518 are nested in flow channel 508 between wall segments 526 and 528 of sheet 516. At least one of the sheets, preferably sheet 518, and preferably all of the sheets are composed of regenerable filter media material, for example ceramic material as in U.S. Pat. Nos. 4,017,347, 4,652,286, 5,322,537, 6,444,006, all incorporated herein by reference. Sheet 518 is porous material filter media. Sheet 516 is preferably porous to facilitate catalyst coating, to be described, though may be non-porous. Sheets 514 and/or 520 may be porous or non-porous. Other types of regenerable media may be used, for example cordierite, silicon carbide, and other materials. The filter is regenerated by heat, for example heat from the exhaust, or as applied by a separate gas burner, electric resistance heating, microwave energy, etc., for example as disclosed in U.S. Pat. Nos. 5,014,509, 5,052,178, 5,063,736, and U.S. patent application Ser. No. 09/865,098, filed May 24, 2001, now U.S. Pat. No. 6,544,310, Ser. No. 09/935,847, filed Aug. 23, 2001, now U.S. Pat. No. 6,582,490, Ser. No. 09/935,849, filed Aug. 23, 2001, now U.S. Pat. No. 6,540,816, all incorporated herein by reference.

As above noted, flow channel 508 is defined by first and second laterally distally spaced wall segments 526 and 528 of second sheet 516, and a respective spanning segment 568 transversely spaced from first sheet 514. Wall segments 552 and 554 of third sheet 518 have laterally spaced portions 570 and 572, FIG. 31, in the respective flow channel 508 at the upstream end thereof and extending axially to a respective downstream pleat tip 558. Wall segment 552 of sheet 518 at pleat tip 558 is laterally spaced from wall segment 526 of sheet 516. Wall segment 554 of sheet 518 at pleat tip 558 is laterally spaced from wall segment 528 of sheet 516. Wall segments 552 and 554 of sheet 518, spanning segment 568 of sheet 516, and sheet 514 form wall-flow channel 512 therebetween terminating at downstream pleat tip 558 of sheet 518, such that exhaust passes through wall segments 552 and 554 of sheet 518 such that particulate, e.g. soot, is trapped and stored thereat. At least a portion of flow channel 508 is treated with a catalyst, to be described, and provides a flow-through channel. Wall segments 552 and 554 of sheet 518 have lower edges 553 in contiguous relation with sheet 514 and bonded thereto with sealant, and have upper edges 555 in contiguous relation with spanning segments 568 and bonded thereto with sealant.

Wall segments 552 and 554 of sheet 518 converge to a V-shaped apex pointing downstream at pleat tip 558, FIG.

31. Wall segment 552 of sheet 518 has a first face 574, laterally facing wall segment 554 of sheet 518, and has a second opposite face 576 laterally facing wall segment 526 of sheet 516. Wall segment 554 of sheet 518 has a first face 578 laterally facing wall segment 552 of sheet 518, and has a second opposite face 580 laterally facing wall segment 528 of sheet 516. Wall segment 526 of sheet 516 has a face 582 laterally facing wall segment 552 of sheet 518. Wall segment 528 of sheet 518 has a face 584 laterally facing wall segment 554 of sheet 518. This structure provides a number of substrate surfaces which can be treated with one or more catalysts. In the preferred embodiment, at least one of the noted faces 574, 576, 578, 580, 582, 584 is catalytically treated. In one embodiment, faces 576 and 580 are catalytically treated. In another embodiment, faces 574 and 578 are catalytically treated. In a further embodiment, faces 574, 576, 578, 580 are catalytically treated. In a further embodiment, faces 582 and 584 are catalytically treated. In further embodiments, to be described, face 582 is treated with different catalytic materials, for example to provide a first catalytic reaction or reduction in flow-through channel 510 immediately adjacent wall-flow channel 512, and a different catalytic reaction further downstream in flow-through channel 510. In this embodiment, face 584 is likewise treated with different catalytic materials to provide different catalytic reactions along flow-through channel 510. In another embodiment, all of the faces 574, 576, 578, 580, 582, 584 are catalytically treated. This latter embodiment is illustrated in FIG. 33, with catalytically treated surface 586 on faces 574, 578, catalytically treated surface 588 on faces 576, 580, and catalytically treated surface 590 on faces 582, 584. Catalytically treated surface 590 may include a first upstream section 592 treated with a first catalytic material, and a second downstream section 594 treated with a second different catalytic material, for providing different catalytic reactions, to be further described.

FIG. 34 shows another embodiment and uses like reference numerals from above where appropriate to facilitate understanding. In FIGS. 29–33, sheet 518 is nested in flow channels 508 from the upstream end 602 of the device. In FIG. 34, sheet 604 is like sheet 518, but sheet 604 is nested in flow channels 508 from the downstream end 606 of the device. In this embodiment, wall segments 608 and 610 of sheet 604 converge to a V-shaped apex pointing upstream at pleat tip 612. The construction of FIG. 34 may be rolled or stacked, as above and may be catalytically treated at various surfaces, as above.

FIGS. 35 and 36 show another embodiment and use like reference numerals from above where appropriate to facilitate understanding. Sheet 604 in FIG. 34 is replaced by sheet 620 in FIG. 35. Sheet 620 is nested in flow channels 508 from downstream end 606. Sheet 620 has wall segments 622 and 624 having laterally spaced upstream portions 626 and 628 in the respective flow channel 508 and extending axially to a respective downstream pleat tip 630. Wall segments 622 and 624 of sheet 620 converge to a V-shaped apex pointing downstream at pleat tip 630. The wall-flow channel 632 in FIG. 35 trapping particulate such as soot in a V-shaped apex pointing downstream is preferred over the wall-flow channel 634 in FIG. 34 having the noted V-shaped apex pointing upstream.

In FIGS. 35 and 36, wall segment 622 of sheet 620 at pleat tip 630 is laterally spaced from wall segment 526 of sheet 516. Wall segment 624 of sheet 620 at pleat tip 630 is laterally spaced from wall segment 528 of sheet 516. Wall segments 622 and 624 of sheet 620, the respective spanning segment 568 of sheet 516, and sheet 514 form wall-flow channel 632 therebetween terminating at downstream pleat tip 630 of sheet 620, such that exhaust passes through wall segments 622 and 624 of sheet 620, which wall-flow channel traps and stores particulate thereat. The flow channel upstream and/or downstream of wall-flow channel 632 is treated with a catalyst, to be described, providing a flow-through channel catalytically reacting with the exhaust.

Sheet 620, FIGS. 35, 36, has third and fourth laterally spaced wall segments 636 and 638 in the same flow channel 508 as the first and second wall segments 622 and 624 of sheet 620. First and third wall segments 622 and 636 of sheet 620 extend axially to an upstream pleat tip 640 in flow channel 508. Wall segments 622 and 636 converge to a V-shaped apex pointing upstream at pleat tip 640. Pleat tip 640 extends along a transverse bend line along the noted transverse direction 564. Second and fourth wall segments 624 and 638 of sheet 620 extend axially to another upstream pleat tip 642 in flow channel 508. Second and fourth wall segments 624 and 638 converge to a V-shaped apex pointing upstream at pleat tip 642. Pleat tip 642 extends along a transverse bend line extending along the noted transverse direction 564. Pleat tips 640 and 642 of sheet 620 are laterally spaced from each other in flow channel 508 along the noted lateral direction 566. Pleat tip 630 of sheet 620 is axially spaced from pleat tips 640 and 642 of sheet 620. Third wall segment 636 of sheet 620 is laterally between wall segment 526 of sheet 516 and first wall segment 622 of sheet 620. Fourth wall segment 638 of sheet 620 is laterally between wall segment 528 of sheet 516 and second wall segment 624 of sheet 620.

First wall segment 622 of sheet 620 has a first face 644 laterally facing second wall segment 624 of sheet 620, and has a second opposite face 646 laterally facing third wall segment 636 of sheet 620. Second wall segment 624 of sheet 620 has a first face 648 laterally facing first wall segment 622 of sheet 620, and has a second opposite face 650 laterally facing fourth wall segment 638 of sheet 620. Third wall segment 636 of sheet 620 has a face 652 laterally facing first wall segment 622 of sheet 620. Fourth wall segment 638 of sheet 620 has a face 654 laterally facing second wall segment 624 of sheet 620. This construction provides a number of substrate surfaces, at least one of which is catalytically treated for catalytic reaction with the exhaust. In one embodiment, faces 646, 650, 652, 654 are catalytically treated. In another embodiment, faces 644 and 48 are catalytically treated. In another embodiment, faces 644, 646, 648, 650, 652, 654 are catalytically treated, as shown at catalytic coating surfaces 656, 658, FIG. 37. In another embodiment, wall segments 526 and 528 of sheet 516 upstream of wall-flow channel 632 are catalytically treated as shown at 660, providing a flow-through channel 662 catalytically reacting with the exhaust upstream of wall-flow channel 632, in addition to the catalytic reaction downstream of wall-flow channel 632 as shown at flow-through channel 664. In a yet further embodiment, catalytic surface 660 has a first upstream portion 666 treated with a first catalytic material, and a second upstream portion 668 treated with a second different catalytic material, providing differing catalytic reactions with the exhaust upstream of wall-flow channel 632 at sheet 620. In further embodiments, wall segments 526 and 528 of sheet 516 can have portions upstream and downstream of sheet 518 or sheet 620, one or both of which such upstream and downstream portions are catalytically treated.

Sheet 516 extends axially along the noted axial direction 522 from upstream axial end 602 to downstream axial end 606. In the preferred embodiment, the sheet providing the wall-flow channels, e.g. sheet 518 or sheet 620, is provided by a continuous sheet rather than individual V-shaped segments. It is preferred that the continuous sheet have a set of pleat tips at one of the axial ends 602 or 606 of sheet 516. In the embodiment of FIGS. 29–33, the set of pleat tips 556 of sheet 518 are at the upstream axial end 602 of sheet 516. In this embodiment, sheet 518 has another set of pleat tips 558 axially spaced downstream from the set of pleat tips 556 of sheet 518. In the embodiment of FIGS. 35–37, the set of pleat tips 670 of sheet 620 are at the downstream axial end 606 of sheet 516. In this embodiment, sheet 620 has another set of pleat tips 640, 642 axially spaced upstream from the set of pleat tips 670 of sheet 620. Further in such embodiment, sheet 620 has a further set of pleat tips 630 axially spaced upstream from the set of pleat tips 670 and axially spaced downstream from the set of pleat tips 640, 642. The set of pleat tips 640, 642 has two pleat tips per flow channel 508, and the set of pleat tips 630 has one pleat tip per flow channel 508.

The disclosed exhaust aftertreatment combined filter and catalytic converter is preferably provided by a plurality of sheets, at least one of which comprises filter media, preferably at least the third sheet 518 or 604 or 620, and further preferably all of the noted sheets. The first and second sheets 514 and 516 define a plurality of flow channels 508 having various portions catalytically treated and providing a plurality of flow-through channels 511, 512, 510, FIG. 31, 662, 632, 664, FIG. 35, passing exhaust therethrough and catalytically reacting therewith. Channels 512 and 632 additionally provide wall-flow channels axially overlapped with the respective flow-through channels, i.e. the wall-flow channels and the flow-through channels have sections which overlap each other along their axial length, e.g. 512, 510, 632, 664. The third sheet 518 or 604 or 620 defines with at least one of the first and second sheets the noted plurality of wall-flow channels 512 or 632, passing the exhaust through the third sheet and trapping and storing particulate such as soot thereat.

In the preferred embodiment, at least second sheet 516 is catalytically treated, and at least third sheet 518 or 604 or 620 is a filter media sheet. In further preferred embodiments, all of the sheets are filter media sheets and all of the sheets are catalytically treated. Third sheet 518 or 604 or 620 is preferably treated on both sides thereof, namely both the upstream facing side and the downstream facing side, as above described. In each of the embodiments, plural catalytically treated serially sequential surfaces are provided along which exhaust flows. For example, in FIGS. 31 and 33, exhaust flows firstly along first sequential catalytically treated surfaces 586 at faces 574, 578, then secondly along second sequential catalytically treated surfaces 588 at faces 576, 580, then thirdly along third sequential catalytically treated surfaces 590 at faces 582, 584. In FIG. 33, exhaust flows along sequential catalytically treated surfaces 592, and then along sequential catalytically treated surfaces 594. In FIGS. 35 and 37, exhaust flows along sequential catalytically treated surfaces 666, then along sequential catalytically treated surfaces 668, then along sequential catalytically treated surfaces 656 at faces 644, 648, then along sequential catalytically treated surfaces 658 at faces 646, 650, then along sequential catalytically treated surfaces 658 at faces 652, 654. The combination of the flow-through channels and the wall-flow channels have plural catalytically treated surfaces in axially overlapped channel sections, for example axially overlapped channel sections 512, 510, in FIG. 31, and axially overlapped channel sections 632, 664 in FIG. 35.

The disclosed construction is particularly useful in exhaust emission control regeneration methods and systems, to be described, including diesel engine exhaust aftertreatment and regeneration, and including $NO_x$ abatement.

The noted exhaust emission control method involves: passing the exhaust through a particulate filter from an upstream side thereof to a downstream side thereof to trap exhaust particulate in the particulate filter; after passage through the particulate filter, passing the exhaust along a catalyst downstream of the particulate filter; regenerating the particulate filter by combusting the trapped particulate, and producing a combustion product from the combustion of the particulate; and regenerating the downstream catalyst with the noted combustion product. The downstream catalyst is provided in sufficiently close proximity to the diesel particulate filter to allow more selective utilization of the noted combustion product for assisting in abatement of $NO_x$ as described below. Exhaust is passed axially along an axial flow path comprising a flow charnel 508 having a wall-flow channel 512, 632 providing the diesel particulate filter and having a flow-through channel 510, 664 axially aligned with the wall-flow channel and providing the catalyst. The noted sufficiently close proximity is provided by axially overlapping sections of the wall-flow channel and the flow-through channel, as above noted. Other embodiments may be used to provide the noted sufficiently close proximity. The method is particularly useful for diesel engine exhaust, wherein the downstream catalyst is an $NO_x$ adsorber.

In a particularly desirable diesel engine exhaust aftertreatment control and regeneration method, the noted combustion product is a soot oxidation product, e.g. CO, and the noted downstream $NO_x$ adsorber is regenerated with the assistance of CO derived from the oxidation of the diesel particulate matter. The downstream $NO_x$ adsorber is provided in sufficiently close proximity to the diesel particulate filter to maximize the probability that the CO will assist in regeneration of the $NO_x$ adsorber as described below. Preferably, the CO assists $NO_x$ adsorber regeneration by releasing stored $NO_x$, for example according to $Ba(NO_3)_2 + 3CO \rightarrow BaCO_3 + 2NO + 2CO_2$. Furthermore, the CO preferably assists in regeneration of the $NO_x$ adsorber by reducing the released $NO_x$ to benign $N_2$, for example according to $NO + CO \rightarrow 1/2 N_2 + CO_2$. Furthermore, the CO preferably assists in regeneration of the $NO_x$ adsorber by oxidizing CO (either through one of the above two reactions, or by reaction with $O_2$ over the noble metal component of the $NO_x$ adsorber according to $CO + 1/2 O_2 \rightarrow CO_2$) with substantial heat release. Close proximity of the particulate filter to the $NO_x$ adsorber allows efficient utilization of this heat to assist regeneration of both devices.

The disclosed method is particularly useful for reducing wasteful loss of CO to parasitic oxidation in an emission control regeneration system for diesel engine exhaust wherein exhaust is passed through a diesel particulate filter from an upstream side thereof to a downstream side thereof to trap diesel exhaust particulate, including soot, in the diesel particulate filter. The diesel particulate filter is regenerated by combusting the soot to produce CO. An $NO_x$ adsorber is provided downstream of the diesel particulate filter, and enhances the chances of the CO helping regeneration of the $NO_x$ adsorber by locating the downstream $NO_x$ adsorber in sufficiently close proximity to the downstream side of the diesel particulate filter. The exhaust is passed axially along an axial flow path 504 through a flow channel 508 having a wall-flow channel 512, 632 providing the diesel particulate filter and having a flow-through channel 510, 664 providing the downstream $NO_x$ adsorber. The noted chances of the CO helping regeneration of the $NO_x$ adsorber are enhanced by axially aligning the flow-channel and the wall-flow channel along the axial flow path, as above described, concomitantly providing both the noted sufficiently close proximity and the noted axial alignment by axially overlapping sections of the wall-flow channel and the flow-through channel. Other embodiments may be used to provide the noted sufficiently close proximity.

In the '035 emission control system for diesel engine exhaust, the diesel particulate filter passes the exhaust therethrough from an upstream end to a downstream end and traps diesel exhaust particulate, including soot. In a further embodiment, at least one of such ends is coated with a catalyst facilitating heat generation and soot combustion to regenerate the diesel particulate filter. In preferred form, each of the upstream and downstream ends is coated with a catalyst facilitating heat generation and soot combustion to regenerate the diesel particulate filter at each of such ends, which is where soot tends to accumulate.

As above noted, the disclosed construction is particularly useful for facilitating exhaust aftertreatment and regeneration methods and systems, including enhanced $NO_x$ abatement in diesel engine exhaust. The latter method involves trapping and storing soot with a wall-flow channel, oxidizing the soot, for example according to C+Oxidant→CO, providing a flow-through channel sufficiently proximate the wall-flow channel to further carry out the reaction of the CO with the $NO_x$ stored over $NO_x$ adsorber material, for example according to $Ba(NO_3)_2+3CO \rightarrow BaCO_3+2NO+2CO_2$; also carrying out the reaction of reducing the released $NO_x$ to benign $N_2$, for example according to $NO+CO \rightarrow 1/2N_2+CO_2$; also, oxidizing the CO (either through one of the above two reactions, or by reaction with $O_2$ over the noble metal component of the $NO_x$ adsorber according to $CO+1/2O_2 \rightarrow CO_2$) with substantial heat release. Close proximity of the particulate filter to the $NO_x$ adsorber allows efficient utilization of this heat to assist regeneration of both devices. This method involves providing the wall-flow channel and the flow-through channel in a combined filter and catalytic converter having axially overlapped channel sections providing sufficiently close proximity of the wall-flow channels and flow-through channels to carry out the noted further reaction. The wall-flow channel and the flow-through channel have axially overlapped channel sections, as shown at 511, 512, 510, FIG. 31, and 662, 632, 664, FIG. 35. The device has plural surfaces including at least one filter surface and at least one catalytic surface, the surfaces forming the flow-through channel passing exhaust through such channel and along the catalytic surface and catalytically reacting therewith, and defining in the noted axially overlapped sections the wall-flow channel passing the exhaust through filter media at the filter surface and trapping particulate thereat. Other embodiments may be used to provide the noted sufficiently close proximity.

In usual prior art configurations, a lean $NO_x$ trap or adsorber and a diesel particulate filter are two separate modules placed consecutively in one or another order along the exhaust system. Such configuration presents a number of problems. As to chemical efficiency, the reduction of $NO_2$ with soot leading to harmless products, namely $NO_2+C \rightarrow NO+CO \rightarrow 1/2N_2+CO_2$, is thermodynamically favorable. However, in traditional prior art configurations, when the lean $NO_x$ trap or adsorber and diesel particulate filter represent two separate units, selectivity to the noted process is low because CO is parasitically oxidized before reaching the $NO_x$ adsorber. In fact, $NO_2$ is known to assist regeneration of the diesel particulate filter, but soot does not usually help in reducing $NO_2$ to $N_2$. Thus, the reducing capacity of soot is not utilized for $NO_x$ abatement; instead, external reductants have to be injected in the system for such purpose. As to heat management, temperature is a critical issue in regeneration of both the lean $NO_x$ trap and the diesel particulate filter. For a number of applications, implementation of the lean $NO_x$ trap and the diesel particulate filter would require additional heating, e.g. electrical, microwave, burning of hydrocarbons, etc., during regeneration events. Separate heating of the lean $NO_x$ trap and the diesel particulate filter would pose additional engineering complications and extra fuel penalty. Heating of only the upstream unit may be inefficient due to the temperature losses between the two units. Both the lean $NO_x$ trap and the diesel particulate filter under certain operating conditions may produce a significant exotherm, for example the diesel particulate filter during soot combustion, and the lean $NO_x$ trap following the injection of the reductant. With the separated locations of the lean $NO_x$ trap and the diesel particulate filter, the heat generated by one component is not effectively utilized by the other component, especially if the heat is produced over the downstream unit. As to engineering, each of the two possible consecutive component combinations compromises the performance of the entire system to some extent. For example, if the diesel particulate filter is located upstream of the lean $NO_x$ trap, then particulates, which may be formed during injections of the reductant for the lean $NO_x$ trap regeneration, would escape directly to the atmosphere. Further, total space requirements are significant for two separate units.

The '035 construction and method combines the lean $NO_x$ trap and the diesel particulate filter into one unit. This provides a number of advantages. As to chemical advantages, the close proximity of the soot and the trapped $NO_x$ allows utilization of the reducing power of soot to assist $NO_x$ release and abatement, thus reducing the requirements for external reductant, and hence lowering the filet penalty. As to improved heat management, heat losses are decreased, and there is better utilization of the operational exotherms. Lower overall heat mass improves cold start operation and minimizes external heat requirements, hence fuel penalty, for regeneration of the lean $NO_x$ trap and diesel particulate filter. Usage of the low heat mass substrates emphasizes this advantage. As to engineering advantages, combination of the two elements eliminates the noted operational compromises, and minimizes space requirements. The overall result is lower fuel penalty and reduced size of the aftertreatment system. In one embodiment, the combination of the lean $NO_x$ trap and diesel particulate filter is achieved by coating the lean $NO_x$ trap material over the diesel particulate filter substrate. In further embodiments, close proximity of $NO_x$ adsorbing material and soot allows utilization of reductant, derived from soot oxidation, for the $NO_x$ adsorber regeneration, i.e. $NO_x$ release and reduction to $N_2$, and also improves heat efficiency of the system. The combined lean $NO_x$ trap and diesel particulate filter has numerous applications for exhaust aftertreatment, including in EGR, exhaust gas recirculation, equipped engines (brings the soot/$NO_x$ ratio closer to stoichiometty) and in low exhaust temperature engine applications, requiring active regeneration.

In exhaust gas purification of a lean burn or diesel engine, the lean $NO_x$ trap and the diesel particulate filter components are arranged in close, preferably intimate, proximity to each other. Due to such arrangement, the reductant derived from soot can assist regeneration of the lean $NO_x$ trap and destruction of $NO_x$. Also, the heat efficiency of the system is improved. These two factors contribute to lower fuel penalty associated with the regeneration of the lean $NO_x$ trap and the diesel particulate filter. A significant advantage of the diesel particulate filter being ahead of the $NO_x$ adsorber is extended interval time, i.e. the length of time, between regenerations.

In a further aspect, the '035 system provides integrated four-way catalytic substrates for use in controlling diesel engine particulate and gaseous emissions. The substrates integrate wall-flow diesel particulate filters with flow-through catalytic converters. The substrates are space efficient and simultaneously remove the four primary pollutants produced by diesel engines, namely particulate matter, oxides of nitrogen, carbon monoxide, and hydrocarbons. With the '035 construction, a single device can provide enough independent surfaces for the coatings of proven catalysts to regenerate particulate filters and to reduce the three gaseous pollutants. Because of increasingly stringent standards, significant reduction in particulates, oxides of nitrogen, carbon monoxide, and hydrocarbon emissions from diesel engine applications will be required. Currently in engine aftertreatment technology, diesel particulates are controlled through the application of soot traps that are coated with proven catalytic elements for the purpose of trap regeneration. On the other hand, emissions of $NO_x$ are converted into nitrogen through the use of flow-through converters which are coated with $NO_x$ reduction catalytic elements, while emissions of CO and HC are converted into $CO_2$ and $H_2O$ by the use of separate flow-through converters that are coated with CO and HC reduction catalytic elements. In contrast, the '035 construction and method provides a complete aftertreatment system including wall-flow channels and flow-through channels to support different catalyst coatings for controlling the four primary pollutants.

The '035 construction provides flow channels as shown at 508, including particulate traps or wall-flow channels such as 512, 632, 634 integrated with flow- through channels such as 511, 510, 662, 664. Engine exhaust gases flow across and into the substrates through flow channels 508. Diesel particulate emissions are filtered by traps 512, 632, 634. Traps 512, 632 with their V-shape pointing downstream with walls 552, 554, 622, 624 converging to an apex at pleat tip 558, 630, provide a more uniform flow pattern than conventional wall-flow traps such as provided by alternately plugged flow channels, for example U.S. Pat. Nos. 4,652,286, 5,322,537, both incorporated herein by reference. The uniform flow pattern increases the soot holding capacity of the traps, and reduces flow restriction of the system. The downstream faces 576, 580 of the wall- flow channels or traps 512 and the faces 582, 584 of the flow-through channels 510 are coated with catalytic elements for $NO_x$ conversion and for CO and HC reduction, respectively. Clean gases exit the flow channels at downstream end 606. The substrates are preferably of composite ceramic material as above noted, though alternatively can be made through molding or extrusion with cordierite, silicon carbide, and other materials. The substrates are compact and efficient. The wall-flow channels and flow-through channels are integrated with optimized flow channels 508. The integrated substrates perform with high soot holding capacity and low restriction in the engine exhaust system.

For SCR, selective catalytic reduction, systems, it is preferred to coat surfaces 576, 580, 646, 650 with $NO_x$ catalyst elements, and to coat surfaces 582, 584 with oxidation catalyst elements for controlling ammonia slip and CO and HC emissions. Desirable SCR systems are those shown in U.S. patent application Ser. No. 09/981,171, filed Oct. 17, 2001, now U.S. Pat. No. 6,449,947, and Ser. No. 09/981,157, filed Oct. 17, 2001, now U.S. Pat. No. 6,601,385, both incorporated herein by reference. Because wall-flow channels or traps 512, 632 and channel surfaces 582, 584, 636, 638 are more closely located compared with conventional systems with more than one element or substrate, the present construction is more thermally efficient. In FIG. 33, the flow-through channels 510 are made longer and can be coated part of the way with $NO_x$ catalyst elements as shown at 592, and coated the rest of the way with CO and HC catalyst elements as shown at 594. For lean $NO_x$ or $NO_x$ adsorber applications, surfaces 576, 580, 582, 584 are coated with oxidation catalyst, e.g. precious metal, on a ceramic composite substrate for HC/CO control and diesel particulate filtering, and lean $NO_x$ catalyst or $NO_x$ adsorber is coated at surfaces 592, 594, FIG. 33, on a ceramic composite substrate for $NO_x$ control. For SCR applications, an SCR catalyst is coated at surfaces 576, 580, 582, 584, FIGS. 31, 33, on a ceramic composite substrate for $NO_x$ control and diesel particulate filtering, and an oxidation catalyst is coated on surfaces 592, 594 for CO/HC control and ammonia slip.

In a further aspect, the '035 construction provides a diesel exhaust aftertreatment device which incorporates components to control diesel particulates and $NO_3$ in a manner to facilitate regeneration of the filter by combustion of captured particulates such as soot. Diesel engines emit undesirable levels of $NO_x$, particulates, CO, and hydrocarbons HC. Typically, diesel particulate filters are used to control particulate emissions, while a variety of technologies, for example urea selective catalytic reduction, lean $NO_x$ and $NO_x$ adsorber technologies, are used to control $NO_x$. CO and HC are typically controlled using precious metal, e.g. Pt, platinum, catalysts. The '035 construction enhances regeneration of the diesel particulate filter and $NO_x$ removal in a compact, simple and efficient structure.

In a further implementation, the device is provided with localized heating. For example, localized heaters 682, FIG. 37, electrical, thermal and/or microwave, may be provided by electrical and/or thermal conductors wound with the sheets in the filter roll, providing regeneration at lateral slices of the filter roll lying in a plane extending transversely and radially relative to the filter roll axis, for example as in U.S. patent application Ser. No. 09/935,849, filed Aug. 23, 2001, now U.S. Pat. No. 6,540,816 incorporated herein by reference. In a further embodiment, an injector 680 is provided to inject urea or ammonia into the SCR section.

In another embodiment, FIG. 22, the structure of the noted '913 patent is utilized, and a series of holes or perforations provided through the channel walls downstream of the second set of plugs to facilitate flow through all channels of the final section. A first set of upstream channel plugs are provided at 690, and a second set of downstream channel plugs are provided at 692. A first set of holes or perforations can be provided at 694 and/or channel walls 696 can be filter material through which the exhaust flows. A second set of holes or perforations 698 in channel walls 700 downstream of the second set of plugs 692 facilitate flow through all channels of the final section at 360. Various sections of the device may be coated with one or more catalysts.

The '035 system also provides a technique for applying three or more different coatings along the length of the device. For example, consider a device with entry, intermediate, and final sections. One axial end of the sheet is dipped into coating material to coat the entry section, followed by drying, then dipping of the other axial end of the sheet into the coating material to coat the final section. A different coating can be accomplished on the intermediate section by initially coating the entry section with an easily removed wax or resin, then dipping the sheet into the different coating material past the entry section, and onto the intermediate section, and then also coating the final section by dipping that end in a different coating. The part is then dried and fired to melt or burn away the wax or resin and fix the coating on the intermediate section and on the final section. Now the part is dipped a final time to coat only the entry section. This technique can also be performed by reversing the roles of the entry and final sections, i.e. coating the final section with the wax or resin. The process can be expanded to more than three sections with further steps and wax or resin temporary coatings. This enables production of a catalyst/filter/catalyst or similar part with nested sections each having a unique catalyst formulation.

In another embodiment, flow channels 508 are provided by extruded cordierite, which may be formed in a stacked array having a plurality of rows stacked on each other. In this embodiment, the extrusion is performed as a first step, providing the flow-through channels, and then folded pleated zig-zag sheet 518 or 604 or 620 is inserted into such channels in nested relation to provide the wall-flow channels or traps.

The '035 system provides an exhaust emission control method including: passing exhaust through a particulate filter from an upstream side thereof to a downstream side thereof to trap exhaust particulate in the particulate filter; after passage through the particulate filter, passing the exhaust along a catalyst downstream of the particulate filter; regenerating the particulate filter by combusting the trapped particulate, and producing a combustion product from the combustion of the trapped particulate; and using the combustion product to assist regeneration of the downstream catalyst. The downstream catalyst is provided in sufficiently close proximity to the particulate filter to carry out a thermodynamically favorable reaction with the combustion product. The exhaust is passed axially along an axial flow path including a flow channel having a wall-flow channel providing the particulate filter and having a flow-through channel axially aligned with the wall-flow channel in the flow channel and providing the downstream catalyst. The downstream catalyst is provided in the noted sufficiently close proximity to the particulate filter by axially overlapping sections of the wall-flow channel and the flow-through channel. Other embodiments may be used to provide the noted sufficiently close proximity. The system is particularly desirable for use in a diesel engine exhaust system wherein the particulate filter is a diesel particulate filter trapping diesel exhaust particulate, including soot, and wherein the downstream catalyst is an $NO_x$ adsorber having an $NO_x$ storage element and an $NO_x$ catalyst, wherein the $NO_x$ storage element is selected from the group consisting of alkali and alkaline earth oxide compounds, preferably in the form of oxide, carbonate or nitrate, with the $NO_x$ storage element preferably selected from the group consisting of compounds of Ba, Li, Na, K and Ca, and wherein the catalyst is a precious metal catalyst, such as Pt. In such embodiment, the combustion product is CO, and the downstream $NO_x$ adsorber is provided in sufficiently close proximity to the diesel particulate filter to carry out the thermodynamically favorable reaction with CO, such that the downstream $NO_x$ adsorber is regenerated with the CO derived from the diesel particulate filter in the noted sufficiently close proximity thereto. The reaction includes $NO+CO \rightarrow 1/2N_2+CO_2$. The method further includes oxidizing soot in the diesel particulate filter, providing the downstream $NO_x$ adsorber in sufficiently close proximity to the diesel particulate filter to further carry out the reaction according to $NO+CO \rightarrow 1/2N_2+CO_2$. The method also generates $CO_2$ from CO according to $O_2+CO \rightarrow CO_2$. The system further provides a method of reducing wasteful loss of CO to oxidation in an exhaust emission control regeneration method for diesel engine exhaust wherein the exhaust is passed through a diesel particulate filter from an upstream side thereof to a downstream side thereof to trap diesel exhaust particulate, including soot, in the diesel particulate filter, wherein the diesel particulate filter is regenerated by combusting the soot to produce CO, the method including providing an $NO_x$ adsorber downstream of the diesel particulate filter, and enhancing the chances of the CO helping regeneration of the downstream $NO_x$ adsorber by locating the downstream $NO_x$ adsorber in sufficiently close proximity to the downstream side of the diesel particulate filter. The exhaust is passed axially along an axial flow path having a flow channel having a wall-flow channel providing the diesel particulate filter and having a flow-through channel providing the downstream $NO_x$ adsorber, and enhancing the noted chances by axially aligning the flow-through channel and the wall-flow channel along the noted axial flow path. The system concomitantly provides both the noted sufficiently close proximity and the noted axial alignment by axially overlapping sections of the wall-flow channel and the flow-through channel. The system further provides an exhaust emission control regeneration method for diesel engine exhaust, including regenerating a diesel particulate filter having trapped diesel exhaust particulate, including soot, by combusting the trapped particulate and producing a combustion product from the combustion of the trapped particulate, and using the combustion product to regenerate a catalyst downstream of the diesel particulate filter, wherein the combustion product is CO, and the catalyst an $NO_x$ adsorber downstream of the diesel particulate filter, and regenerating the downstream $NO_x$ adsorber with the CO, the downstream $NO_x$ adsorber being in sufficiently close proximity to the diesel particulate filter to carry out a thermodynamically favorable reaction with the CO. The system further provides an exhaust emission control method for a diesel engine exhaust system having a diesel particulate filter trapping diesel particulate, including soot, and an $NO_x$ storage element downstream of the diesel particulate filter and storing $NO_x$, the method including regenerating the diesel particulate filter by combusting the soot to produce CO, and reacting the CO with the stored $NO_x$ to release the latter. The system further provides an exhaust emission control method for a diesel engine exhaust system having a diesel particulate filter trapping diesel particulate, including soot, and an $NO_x$ adsorber downstream of the diesel particulate filter, the method including regenerating the diesel particulate filter by combusting the soot to produce CO, oxidizing the CO to generate heat, and using the heat to assist regeneration of the downstream $NO_x$ adsorber, and further including oxidizing the CO with a catalyst, wherein the catalyst is a precious metal catalyst. The '035 emission control system for diesel engine exhaust includes a diesel particulate filter passing the exhaust therethrough from an upstream end to a downstream end and trapping diesel exhaust particulate, including soot, wherein at least one of the ends is coated with a catalyst facilitating heat generation and soot combustion to regenerate the diesel particulate filter, the catalyst being selected to facilitate oxidation and combustion of the soot, wherein the catalyst is preferably a precious metal catalyst, and further preferably wherein each of the upstream and downstream ends is coated with a catalyst facilitating heat generation and soot combustion to regenerate the diesel particulate filter at each of the ends, for example each of the axial ends of the filter roll in FIGS. 25–27 where the plugs are located and where most of the soot tends to accumulate.

In another embodiment, an improved filter is provided for filtering fluid, including a gas containing particulate to be filtered, such as internal combustion engine exhaust, including diesel exhaust, whether or not the device is catalytically treated to additionally provide a catalytic reaction or reduction.

Section IV—Present Application

A filter is provided for diesel exhaust and hot gas applications for enhanced control of particles in the nanoparticle (<about 1 micron) size range. A hybrid or composite fibrous-granular (including fibrous-particulate) filter material has a permeability of >about $3\times10^{-2}$ m$^2$ and an inertial resistance coefficient <about $1\times10^6$ m$^{-1}$. The fiber substrate provides high porosity for reduced pressure drop and increased contaminant loading (capacity), plus provides a support network for a binder to obtain increased strength in a rigidified filter for high flow velocities and temperatures of diesel exhaust and hot gas filtration. A granular or particulate binder holds the structure together, increases surface area, and provides collectors less than about 5 μm (micron) in size to facilitate nanoparticle filtration. The hybrid material can be like the filter materials disclosed in sections I or II, exhibiting characteristics of granular structures and fibrous structures. An oxidization catalyst may be provided with the hybrid fibrous-granular filter material to reduce the concentration of gaseous contaminants that condense into nanoparticles at ambient temperature. In further embodiments, the hybrid material is used in combination with other DPF (diesel particulate filter) or DOC (diesel oxidization catalyst) elements to control nanoparticles in diesel exhaust and hot gas emissions.

It is advantageous to reduce not only the mass concentration of diesel particle emissions, as is currently done, but also the number concentration of these particles, particularly in the nanoparticle size range, i.e. submicron, which are not readily removed by settling, i.e. it is desired to reduce not only the mass of the particles but also the number of particles.

DPFs are required for engine particle emission control in order to meet tightening environmental regulations. Most notable among the DPFs in use today are extruded monolithic filters made of densely packed, granular porous structures of cordierite or silicon carbide (SiC). These filters utilize surface filtration through cake formation to remove diesel particulate emissions. Diesel particles are deposited on the surface of the filter media. As the cake or contaminant layer builds in thickness, filtration efficiency improves. In order to achieve high filtration efficiency and maintain structural integrity at the high temperatures (>about 200° C., and including >about 450° C. for diesel aftertreatment) and flow velocities (Reynolds Number >about 200) typical of diesel exhaust and hot gas filtration, a low porosity of about 50% is typical and is limited by the countervailing need to maintain structural integrity. That is, there is a trade-off between porosity and structural integrity in these types of filters. The need for structural integrity limits the porosities to lower values than otherwise desired. The high temperatures, necessitates the use of materials, such as ceramics or other suitable inorganic materials, able to withstand temperature excursions in excess of about 350 to 450° C. As a result, these DPFs are characterized by relatively high flow restriction and large thermal mass.

Particulate emissions from diesel engines have a tri-modal distribution pattern, with the largest number in the nuclei-mode as shown in solid line at 706 in FIG. 38, and the greatest mass in the accumulation-mode, as shown in dashed line at 708 in FIG. 38. To control filtering of coarse particles larger than about 1 μm and nanoparticles smaller than about 1 μm, it is preferred that filter materials be composed of both fine and nanosized collectors, preferably ceramic fibers or particles. This can give increased surface area and roughness desired for nanofiltration.

Filtration mechanisms have been reviewed and summarized by Liu, "Numerical Investigation of Particle Filtration Process in Fibrous Filters", Z. G. Liu Ph.D. Thesis, University of Wisconsin-Madison, 1993. Diffusion is largely responsible for collecting particles <about 200 nm (nanometers). In addition to diffusion, collection of these particles can be attributed to van der Waals attraction and other possible forces, such as diffusiophoresis, thermophoresis, and electrostatic force. Diffusion efficiency can be enhanced by minimizing the diffusion distance and maximizing the collecting surface area. This can be achieved by utilizing both fine and nanosized collectors, e.g. ceramic fibers and particles, in the filters. The effect of diffusion decreases as the size of particles increases. For particles larger than about 200 nm, this effect becomes negligible, "Filtration of Aerosols", C. N. Davies, Journal of Aerosol Science, Vol. 14, No. 2, pgs. 147–161, 1983.

Coarse particles are collected by interception and inertial impaction filtration mechanisms. These mechanisms can be described using a single fiber or a single sphere model. In such models, there exists a critical particle trajectory plane within which particles are captured by interception and/or inertial impaction, and outside of which there is no particle capture. The filtration efficiency is inversely related to the size of the filtering material. While inertial impaction is effective for removing coarse particles greater than about 2 microns, i.e. 2000 nm, FIG. 39, it becomes less effective as the particle size decreases to below about 1 micron, i.e. 1000 nm, so that interception and diffusion become the dominant filtration mechanisms. With further decreasing particle size, i.e. moving leftwardly in FIG. 39, interception becomes less effective, and diffusion is the dominant filtration mechanism. This is shown in FIG. 39 which illustrates efficiency as a function of particle size. FIG. 39 further illustrates the effect with increasing flow velocity, e.g. from $U_0$=1 cm/second (centimeter per second) to $U_0$=10 cm/second, where $U_0$ is face velocity, namely the flow velocity at the face of the media, perpendicular thereto.

There is a range of particle size corresponding to the accumulation mode in FIG. 38 where none of the above noted filtration mechanisms have a dominant effect on suspended diesel particles in the exhaust gas, i.e. all of the noted filtration mechanisms have a drop in efficiency. This low efficiency gap is shown at 712 and 714 in FIG. 39, and is known in the prior art as the MPR (Most Penetrating Region) in the noted efficiency profile in a plot of particle number efficiency vs. size of the particles. The Most Penetrating Region (MPR) is defined as the particle size range between about 50 and 500 nanometers (nm). The minimum filtration efficiency can be improved by decreasing the collector size, increasing surface roughness, and/or increasing the filter surface area, i.e. as fiber, particle or grain is decreased, the depth of the trough at 712 or 714 is decreased, and the collection efficiency percentage at such points becomes greater. Filter efficiency increases with either decreasing fiber size or decreasing grain or particle size.

Traditional cordierite and SiC monolithic DPFs utilize granular collectors, wherein the collectors are not fibers. In the present application, ideally, a large pore size is preferred for high media permeability and storage capacity, while fine granular particles are preferred for efficient collection of nanoparticles. Since a decrease in grain size and porosity increases the flow restriction, and decreases storage capacity and increases removal efficiency, there is a fundamental limitation and trade- off to simultaneous optimization of these performance parameters using granular-only media, e.g. cordierite. These filters rely on the soot cake for removal of containment particles, i.e. most contaminant removal occurs within the contaminant cake that builds up on the surface of the filter. As a result, particle removal efficiency changes with time and the thickness of the cake. Thus, removal efficiency increases with time as the soot cake builds, but decreases with time during filter regeneration when the soot is burned off as shown in FIG. 40. FIG. 40 shows the fractional efficiency of a 200 cpsi (cells per square inch) cordierite filter with a 10.5 inch diameter, 12 inch length, 1 millimeter channel width, and 159 square feet of wall face area during ISO Mode 6 (International Standards Organization ISO 8178-4: 1996, "Reciprocating Internal Combustion Engine-Exhaust Emission Measurement Cycles For Different Engine Applications"). The filter was loaded for a total of 100 minutes during testing at four previous Modes (namely Modes 8, 1, 6, 11), and then the flow conditions were allowed to stabilize for ten minutes at Mode 6. Fractional efficiency data was then collected every four minutes starting at this ten minute time and ending 22 minutes later. During such time, the soot laden DPF was regenerating, and the data shows a noticeable decline in removal efficiency. This reduction in efficiency is undesirable in filters intended to control nanoparticle emission. In contrast, fibrous filters do not suffer the trade-off between removal efficiency, restriction, and storage capacity. Fibers of much finer size than a typical grain of cordierite or silicon carbide can be packed to allow a large pore size (high pore size, low packing density) and high media permeability, providing lower restriction and increased storage capacity and higher efficiency than granular media. However, fibers this fine do not provide adequate structural support for the media structure.

In the present invention, a hybrid material is used, containing both fibers and granular particles to solve the above noted problems. The granular particles are preferably distributed relatively uniformly throughout the hybrid material with respect to the axial, lateral and depth direction, though non-uniform particle distribution may also be acceptable, including lower or higher concentrations of granular particles at or near the surface of the hybrid material. It may be desirable to have lower concentrations near the surface to enhance depth filtration. It may be desirable to have higher concentrations near the surface to enhance surface filtration. It may also be desirable to have a controlled concentration gradient (e.g., stepped, smoothly increasing or decreasing) of granular particles to obtain the desired filtration characteristics. The material accomplishes nanoparticle filtration and resulted from continuing development work from the above noted applications in the above noted sections. Such further work has defined structural features necessary or desirable to enhance nanoparticle control in diesel emission and hot gas filtration applications. Such work has been applied to control diesel particulate emissions including in combinations of structures optimizing nanoparticle control, including not only nanoparticles generated within diesel engines, but also nanoparticles formed by oxidation of $SO_x$ or $NO_x$, and by condensation of volatile organic compounds upon cooling. Sulfates form by oxidation of $SO_x$. Nitrates form by oxidation of $NO_x$. The noted work has further developed nanoparticle control involving not only filtering out nanoparticles but also reducing the concentrations of volatiles and other chemicals that are precursors to nanoparticles.

The hybrid filter is composed of fibrous and granular portions. The paper/fibrous structure portion gives high porosity, while the binder/particulate portion rigidifies the part, adds strength, and significantly increases surface area and roughness. Fibrous media for diesel exhaust application is known in the prior art, for example sintered fibrous media as disclosed in U.S. Pat. Nos. 4,652,286, 5,322,537, and in SAE Paper 860010 "Diesel Particulate Trap of Corrugated Honeycomb Fabricated with Mullite Fiber Ceramics", Mihara et at, SAE 1986. International Congress and Exposition, Detroit, Mich., Feb. 24–28, 1986. The Mihara et al type filter was considered for the present application, however in order to meet the stringent durability requirements of a diesel exhaust application, high binder concentrations were found to be necessary, which in turn lowered BET (Brunauer Emmett Teller) surface area. In contrast, nanofiltration in the present application can be provided by a depth filter having high porosity, high permeability, high pore size, low density, high surface roughness, and high internal surface area (e.g. BET media surface). The combination of acceptable durability and high surface roughness and internal surface area for nanofiltration of diesel exhaust is a significant advance over the art.

The pressure drop and the initial loading of the present hybrid material were analyzed and numerically modeled. The results were also validated experimentally.

For the analytical model, the following equations were used for the hybrid material:

$$\frac{\partial (\rho v_i)}{\partial x} = (-1)^i \left( \frac{4\sqrt{3}}{b} \right) \rho v_w, \quad (1)$$

$$\frac{\partial}{\partial x}(\rho v_i^2) = -\frac{\partial p_i}{\partial x} - \frac{1}{2} c f_i \mu \frac{v_i}{d_{ii}^2}, \quad (2)$$

$$f_i = \frac{1}{16} \left[ 0.0481 + \frac{0.0494}{(Re_w + 4.7)^{0.8}} \right]^{-1}, \quad (3)$$

$$-\nabla p = \frac{\mu v_w}{\alpha} + \frac{1}{2} \beta \rho v_w^2, \quad (4)$$

where i=1, 2 with 1 representing an inlet channel and 2 representing an outlet channel, respectively, and using the following nomenclature:

b: side width of equilateral triangle, m
c: parameter for equilateral triangular channel flow
$f_i$: inlet and outlet channel correction factors
p: pressure, Pa
$\bar{p}$: dimensionless pressure
Δp = pressure drop of the filter
$Re_w$: wall flow Reynolds number
$v_x$: x-directional velocity component, m/s
$v_y$: y-directional velocity component, m/s
$v_z$: z-directional velocity component, m/s
$v_1$: inlet channel axial velocity, m/s -continued $v_2$: outlet channel axial velocity, m/s
$v_w$: wall flow velocity, m/s
$\overline{v_1}$: dimensionless inlet channel velocity
$\overline{v_2}$: dimensionless outlet channel velocity
$\overline{v_w}$: dimensionless wall flow velocity
$w_t$: porous wall thickness, m
$\alpha$: permeability of porous wall, m$^2$ $\beta$: inertia resistance coefficient of porous wall, $\frac{1}{m}$ $\mu$: exhaust dynamic viscosity, $\frac{kg \cdot m}{s}$ $\rho$: exhaust gas density, kg/m$^3$ Re: channel Reynolds number, $\frac{v_0 d_h}{v}$ A: cross-sectional area of triangular channel, m$^2$ $d_h$: channel hydraulic diameter, $\frac{4A}{S}$, m h: triangular channel height,
L: channel length, m
S: wetted channel perimeter, 3b, m
$v_0$: characteristics channel velocity, m/s
$\lambda$: exhaust gas mean free path, m
$v$: exhaust kinematic viscosity, m/s$^2$ $$\gamma = \frac{1}{8} \frac{\alpha \beta}{L} Re,$$

$$C_1 = 12\left(\frac{\alpha}{bw_t}\right)\left(\frac{L}{b}\right) Re,$$

$$C_2 = 6\sqrt{3} \, Cf_1 \left(\frac{\alpha}{bw_t}\right)\left(\frac{L}{b}\right)^2,$$

$$C_3 = 6\sqrt{3} \, Cf_2 \left(\frac{\alpha}{bw_t}\right)\left(\frac{L}{b}\right)^2.$$

The non-dimensional pressure drop is then calculated with the following equation:

$$\Delta \overline{p}_{channel} = \overline{p_1}(0) - \overline{p_2}(1) = \overline{p_2}(0) + \Delta \overline{p}(0) - \overline{p_2}(1) \quad (5)$$

$$= C_1 + C_3 \int_0^1 \overline{v_2}(\overline{x}) d\overline{x} + \overline{v_w}(0) + \gamma \overline{v}_w^2(0).$$

The numerical model is based on the technique of computational fluid dynamics. The flow fields and pressure distributions of the porous channel flows are computed numerically by solving the following continuity and Navier-Stokes equations expressed in Cartesian coordinates:

$$\frac{\partial v_x}{\partial x} + \frac{\partial v_y}{\partial y} + \frac{\partial v_z}{\partial z} = 0, \quad (6)$$

$$v_x \frac{\partial v_x}{\partial x} + v_y \frac{\partial v_x}{\partial y} + v_z \frac{\partial v_x}{\partial z} = -\frac{1}{\rho}\frac{\partial p}{\partial x} + \frac{\mu}{\rho}\left(\frac{\partial^2 v_x}{\partial x^2} + \frac{\partial^2 v_x}{\partial y^2} + \frac{\partial^2 v_x}{\partial z^2}\right), \quad (7)$$

$$v_x \frac{\partial v_y}{\partial x} + v_y \frac{\partial v_y}{\partial y} + v_z \frac{\partial v_y}{\partial z} = -\frac{1}{\rho}\frac{\partial p}{\partial y} + \frac{\mu}{\rho}\left(\frac{\partial^2 v_y}{\partial x^2} + \frac{\partial^2 v_y}{\partial y^2} + \frac{\partial^2 v_y}{\partial z^2}\right), \quad (8)$$

$$v_x \frac{\partial v_z}{\partial x} + v_y \frac{\partial v_z}{\partial y} + v_z \frac{\partial v_z}{\partial z} = -\frac{1}{\rho}\frac{\partial p}{\partial z} + \frac{\mu}{\rho}\left(\frac{\partial^2 v_z}{\partial x^2} + \frac{\partial^2 v_z}{\partial y^2} + \frac{\partial^2 v_z}{\partial z^2}\right), \quad (9)$$

where $v_x$, $v_y$, $v_z$ are x, y, and z directional velocity components, respectively. The porous walls are simulated with the following equation:

$$-\nabla p = \frac{\mu v_w}{\alpha} + \frac{1}{2}\beta \rho v_w^2. \quad (10)$$

The permeability $\alpha$ and the inertial resistance coefficient $\beta$ of the hybrid material were obtained through experiment, and, in equations (4) and (10), are functions of the characteristics of the filter media. Permeability is the conductivity of a porous media with respect to permeation by a Newtonian fluid. It is an increasing function of porosity (high for fibrous media). The inertial resistance coefficient is a correction factor to account for dynamic pressure drop due to high velocity. It is related to media properties, e.g. porosity pore connectivity, surface roughness, surface area, etc., and is low for fibrous media.

FIGS. 41–46 show non-dimensional distributions of inlet channel, outlet channel, and wall flow velocities (initial soot loading patterns) at different Reynolds numbers. The figures show predicted velocity profiles at the inlet side, outlet side, and through-wall (i.e. wall-flow) as a function of axial location x along the length L of a hybrid media diesel particulate spiral-wound filter for various Reynolds numbers. The hollow squares are analytical inlet channel velocity. The solid squares are numerical inlet channel velocity. The hollow circles are analytical outlet channel velocity. The solid circles are numerical outlet channel velocity. The hollow triangles are analytical wall-flow velocity. The solid triangles are numerical wall-flow velocity. The two models show good agreement in terms of the velocity profiles. Of note are the wall- flow velocity results which show that soot loading will be greatest at the ends of the channels. In FIG. 47, the models are compared to experimental results by showing the pressure drop of a diesel particulate spiral-wound filter made of the hybrid material as a function of Reynolds numbers. FIG. 47 shows a comparison of pressure drop across a hybrid diesel particulate filter as a function of Reynolds number obtained using the analytical model, the numerical model, and experimental results. The hollow diamonds in FIG. 47 are analytical pressure drop. The solid diamonds In FIG. 47 are numerical pressure drop. The hollow circles in FIG. 47 are experimental pressure drop. While both models predict similar trends, the analytical model is in better quantitative agreement with the experimental results.

Figure 48:
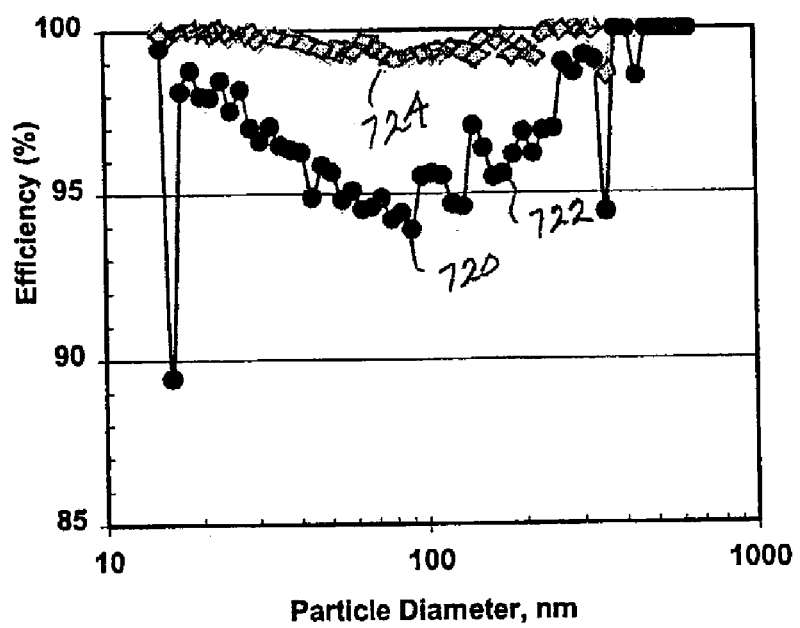

FIG. 48 is a comparison of the fractional efficiency of a hybrid diesel particulate filter in accordance with the present invention (hollow diamonds) and a 100 cpsi (cells per square inch) cordierite diesel particulate filter (solid circles) at ISO (International Standards Organization) Mode 8. The hybrid filter had a 10.5 inch diameter, 9 inch length, 3 millimeter pleat height, and 74 square feet of wall surface area. The 100 cpsi cordierite filter had a 10.5 inch diameter, 12 inch length, and 112 square feet of wall surface area. Each filter was exposed to 65 minutes of exhaust flow prior to data collection. The efficiency patterns across the particle size range exhibit the previously noted minimum in efficiency in the nanoparticle size range, as shown at low point 720 for curve 722 for the cordierite DPF. In contrast, there is no substantial drop in efficiency for the composite hybrid DPF of the present invention as shown at curve 724 having a substantially constant flat efficiency profile.

Figure 49:
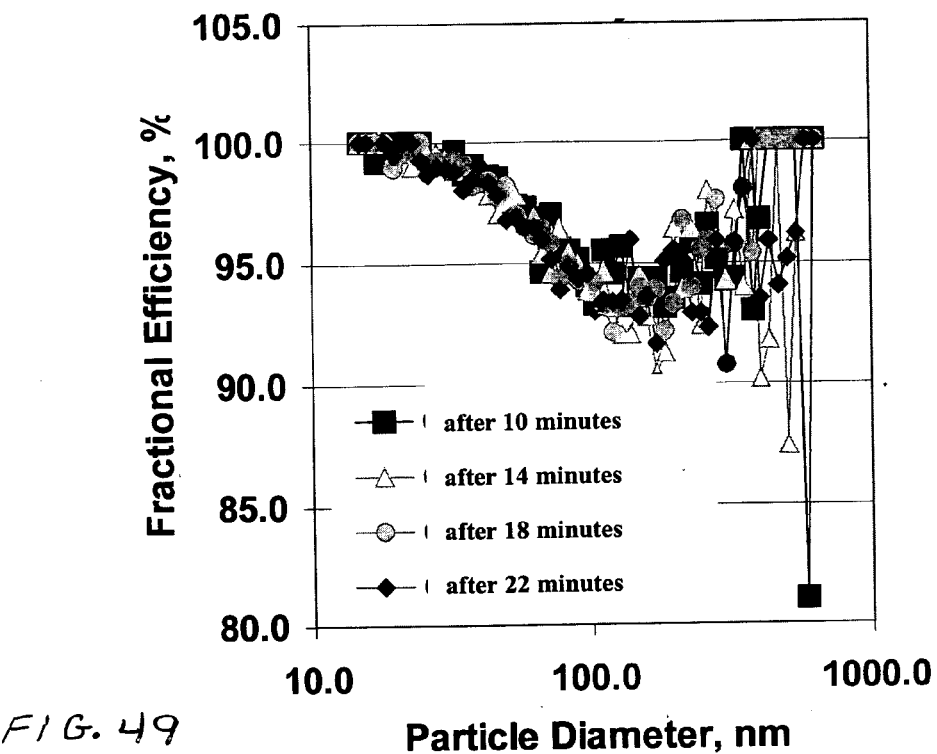

FIG. 49 shows the fractional efficiency of a second embodiment of a hybrid diesel particulate filter in accordance with the present invention, namely a hybrid filter having a 10.5 inch diameter, 9 inch length, 3.5 millimeter pleat height, and 54 square feet of wall face area during ISO Mode 6. This hybrid filter was tested at a wall face velocity 3.4 times higher than the 200 cpsi cordierite filter of FIG. 40. As with the test conditions in FIG. 40, the hybrid filter of FIG. 49 was loaded for a total of 100 minutes during testing at four previous Modes (namely Modes 8, 1, 6, 11), and the flow conditions were then allowed to stabilize for ten minutes at Mode 6. Fractional efficiency data was then collected every four minutes starting at the ten minute time and ending 22 minutes later. During this time, the soot laden DPF was regenerating and the data shows only a slight drop in removal efficiency over this time period, i.e. the filter has a substantially constant efficiency during regeneration, in contrast to FIG. 40.

Figure 50:
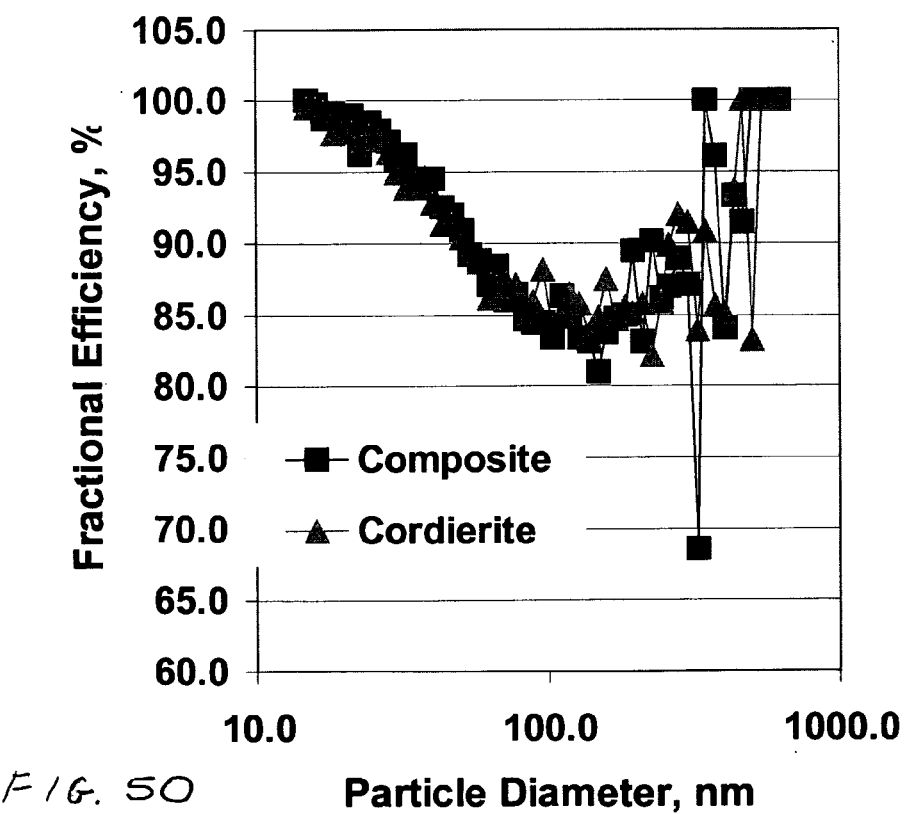

FIG. 50 compares the fractional efficiency of the hybrid filter of FIG. 49 to the cordierite filter of FIG. 40 during ISO Mode 8. Both filters started out clean. Flow conditions were allowed to stabilize for ten minutes before efficiency data was collected. For clean filters (under these conditions there was little soot accumulation), the hybrid filter exhibited about the same efficiency as the 200 cpsi granular cordierite filter despite the 3.4 times higher wall face velocity, i.e. despite the much higher wall face velocity through the hybrid filter, the efficiencies are about the same when the soot cake has not had time to fully develop on the cordierite filter.

In the data noted above, the clean 200 cpsi cordierite filter and the second noted embodiment 3.5 millimeter pleat height hybrid filter exhibit similar MPR efficiencies at ten minutes (ISO Mode 8). The MPR efficiency increases as soot loads. During regeneration in ISO Mode 6, the cordierite efficiency drops rapidly, while the hybrid efficiency changes more slowly. The efficiency oscillates between the initial efficiency (for clean and newly regenerated DPFs) and some higher efficiency (for fully established soot cake for cordierite and for a fully loaded hybrid filter). The difference in MPR efficiency behavior over time due to regeneration is due to differences in the mode of filtration of the two filters. Cordierite, with its low porosity, small pore size and low permeability, acts as a cake filter. MPR efficiency of a cake filter is governed by the properties of the soot cake and changes with cake development. As the soot cake is providing the filtration for the cordierite, one would expect a more rapid efficiency drop during burning of the cake. In contrast, the hybrid filter, with its higher porosity, larger pore size and permeability, acts as a depth filter. MPR efficiency of depth filters is primarily controlled by the properties of the filter media, i.e. collector size, surface area, surface roughness, porosity and thickness. For the hybrid depth filter, the media properties govern removal, hence the MPR efficiency drop is slower. Due to differences in the structure of the accumulated soot (as a cake in cordierite versus dispersed through-out the depth of the hybrid filter), combustion of the soot cake may also propagate faster in cordierite than the hybrid filter, also contributing to the observed change in efficiency.

A lower efficiency was observed for the noted second embodiment 3.5 millimeter pleat height hybrid filter of FIG. 49 than the noted first embodiment 3.0 millimeter pleat height hybrid filter of FIG. 48. This is due to a variety of effects. The difference in pleat height causes about a 37% higher wall face velocity for the second embodiment of FIG. 49 relative to the first embodiment of FIG. 48. Efficiency is inversely related to velocity. The difference in pleat height also influences the flow and soot distribution patterns within the element. The increased soot loading for the first embodiment of FIG. 48 relative to the second embodiment of FIG. 49 (at the time of data collection) means that the first embodiment hybrid filter accumulated more soot within its structure, which increases efficiency. It is anticipated that further development of these and other changes in the hybrid structure can desirably use these differences to advantage to achieve higher or lower MPR efficiency, for example larger/smaller pleat height, more/less refractory binder particles, higher/lower firing temperatures, smaller/larger diameter fibers, more/less porosity, etc., as described above, and as further described hereinafter.

Figure 51:
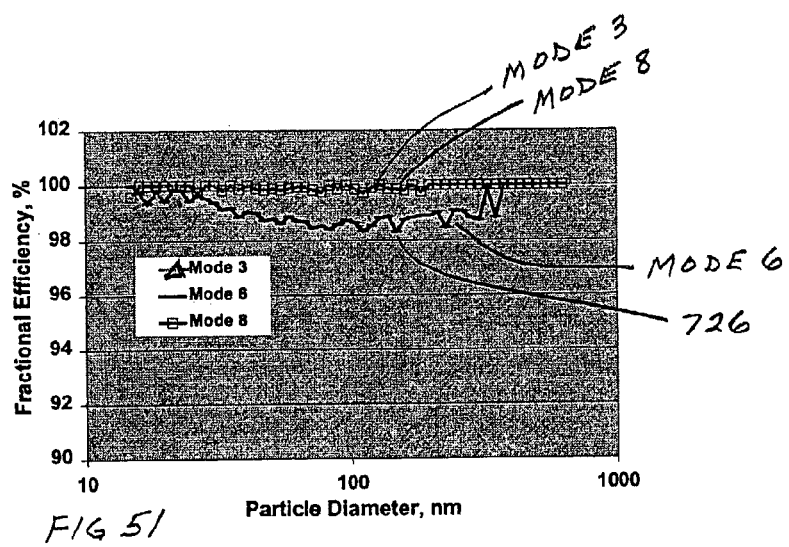
Figure 52:
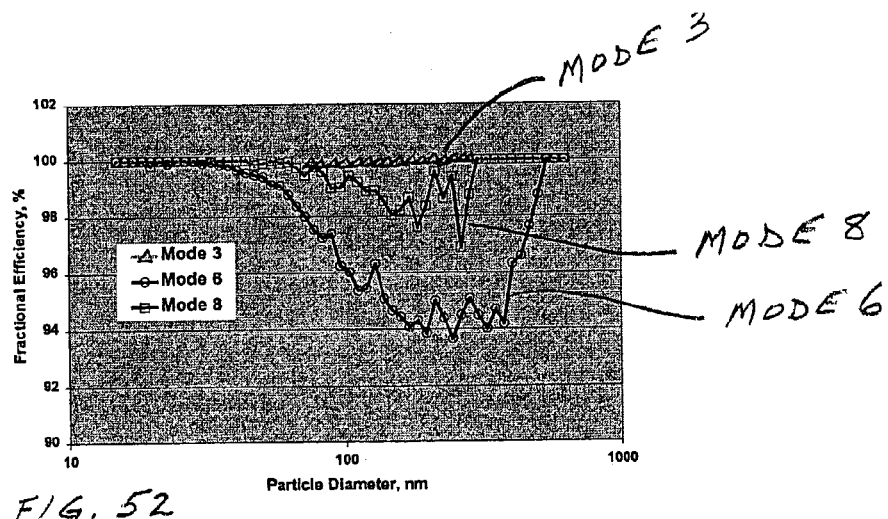
Figure 53:
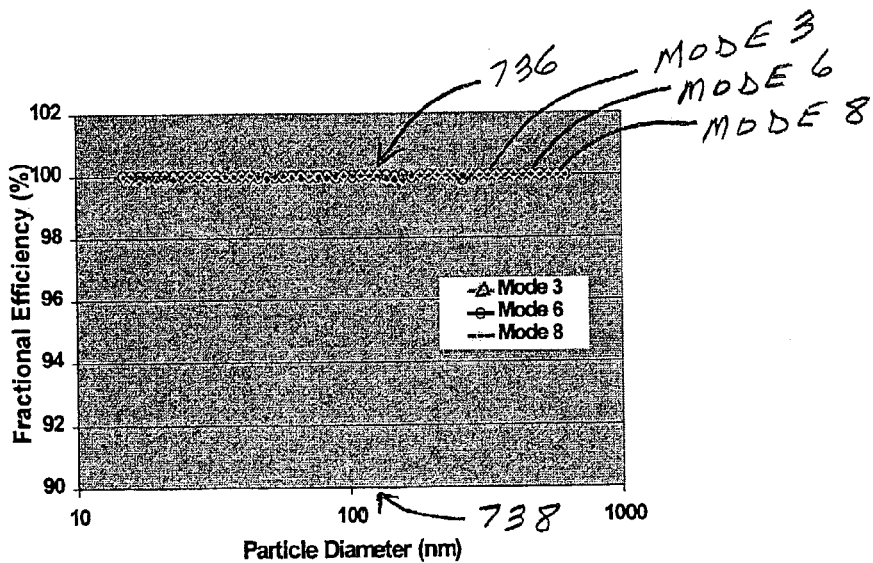

FIG. 51 shows the fractional efficiency of a granular cordierite DPF at ISO Modes 3, 6, 8. FIG. 52 shows the fractional efficiency of a granular SiC DPF at ISO Modes 3, 6, 8. FIG. 53 shows the fractional efficiency of a DPF of the noted first embodiment hybrid filter at ISO Modes 3, 6, 8. The SiC DPF was processed in accordance with the above noted CVI (Chemical Vapor Impregnation) process of Section I. The hybrid filter is preferably processed in accordance with the above noted sol-gel process of Section It. The fractional efficiencies are generally high, but with some reductions in efficiency at ISO modes of high engine load, for example Mode 6 in FIG. 51 for the granular cordierite DPF, and Modes 6 and 8 in FIG. 52 for the silicon carbide diesel particulate filter. In FIG. 51, the efficiencies for ISO Modes 3 and 8 are substantially the same, and substantially constant across the range of particle diameters. In FIG. 52, the efficiency for ISO Mode 3 is substantially constant across the range of particle diameters. In FIG. 53, the efficiencies for ISO Modes 3, 6 and 8 are substantially the same, and substantially constant across the range of particle diameters. For the cordierite diesel particulate filter, FIG. 51, the lowest efficiency occurs during ISO Mode 6 due to regeneration, as shown at trough 726, with a minimum efficiency at a particle size range of approximately 100–250 nm. The SiC DPF also experienced its lowest efficiency during ISO Mode 6, as shown at trough 728, and with such minimum efficiency trough occurring at a particle size of approximately 250 nm. ISO Mode 6 has a high temperature (approximately 1000° C.) and a high flow rate that during regeneration, it is believed, damaged the surface cake of contaminant and disrupted the cake filtration. When the surface cake is disrupted in this manner, portions of the underlying filter structure, as opposed to the cake, perform the filtration. Each filter has its own particle size range of greatest penetration, with lowest efficiency. In contrast, the filter of FIG. 53 does not exhibit the noted efficiency drops of FIGS. 51 and 52, and instead is characterized by a substantially flat and constant efficiency profile, even at ISO Mode 6 which had caused the dips in efficiency in FIGS. 51 and 52.

FIGS. 54–58 show microstructures of various filter media. FIG. 54 shows a monolithic cordierite cross-section. FIG. 55 shows silicon carbide coated alumina fiber using the CVI (Chemical Vapor Impregnation) process of Section I above. FIG. 56 is a replication of FIG. 2 noted above showing filter media using the CVI process disclosed in section I. FIG. 57 shows a hybrid fibrous granular filter media with dendrites using a CVI process similar to that disclosed in section I but with accelerated nucleation. FIG. 58 shows a hybrid fibrous granular filter media using the sol-gel process noted above in Section II. Table 1 below is a comparison of various filter media, including: in the first column, the sol-gel hybrid media of FIG. 58 processed according to the noted sol-gel process; in the second column, a prior art fibrous media purchased from Matsushita Electric Industrial Company and which is believed to be the fitter described in the above noted Mihara et at prior art; and in the third column, the cordierite monolithic granular media of FIG. 54.

TABLE 1

| Property | Sol-gel hybrid Media | Matsushita Fibrous Media | Cordierite Monolithic Media |
|---|---|---|---|
| Filter Bulk Density (g/cm$^3$) | 0.15–0.26 | ~0.23 | 0.46 |
| Pore Volume (cm$^3$/gm) | 2.96 | ~2 | 0.53 |
| Porosity (%) | 85 | 80 | 49 |
| Media Density (g/cm$^3$) | 0.38 | 0.5 | 1.2 |
| Median Pore Size (μm by Hg intrusion) | 40.4 | 28.1 | 14.2 |
| Open Pore Size μm by Capillary Flow) | 11 | — | 6 |
| Permeability (m$^2$) | $8.00 \times 10^{-12}$ | — | $6.10 \times 10^{-13}$ |
| Inertial Resistance Coefficient (m$^{-1}$) | $7.40 \times 10^5$ | — | $5.40 \times 10^7$ |
| BET Surface (m$^2$/gm) | 2–4 | — | 0.18 |
| Media Surface (m$^2$/cm$^3$) | 0.5–2.4 | — | 0.20 |

In the microstructure of the present hybrid filter, diffusion is the dominant mechanism for the capture of nanoparticles, as noted above. Diffusional capture can be increased by increasing the surface roughness and available media surface area in the path of the particle. In comparison with the sol-gel hybrid filter media, granular filter media, e.g. cordierite and silicon carbide monolithic granular filters, and the Matsushita fibrous filter, have a more closely packed particulate structure, and hence, as shown in Table 1, have higher filter bulk density, lower pore volume, lower porosity, higher media density, lower median pore size, lower open pore size, lower permeability, higher inertial resistance coefficient, smaller BET surface, and smaller media surface. The hybrid fibrous granular filter obtains the advantages of both granular and fibrous media. The fibrous base uses fibers large enough to support the structure, but fine enough for nanoparticle filtration. Multiple granular-like particles, such as nanoclay particles and refractory particles extend out from the surface of the fibers, FIG. 58, providing structural support (strengthening and binding the matrix) and for enhanced removal efficiency of nanoparticles. This structure allows for small collector size while maintaining the preferred larger pore sizes. Because the grains are attached to the fiber surfaces and do not need to be self-closed, large pores will not collapse or be subject to the high restriction found in the other filters, like the Matsushita and cordierite filters. The granular portion of the hybrid filter media can be the result of a material composed of clay and silicon carbide particles. These particles bond to the fiber matrix, increasing the surface area and generating a hybrid composite structure that contains both fibers and particles, FIG. 58. A significant aspect to achieve nanofiltration is to provide depth media filtering of nanoparticles, providing high porosity, high permeability, high pore size, low density, with high surface roughness and internal surface area (e.g. BET, media surface). It is anticipated that further improved nanofiltration capability will be achieved by incorporating more refractory particles and nanoparticles (particles with a diameter of <about 1 micron) in the binder e.g silicon carbide, other carbides, borides, oxides, or other highly refractory compounds that have a surface area in excess of about 2 m$^2$/gm after processing, or more preferably in excess of about 30 m$^2$/gm. These particles increase the surface area of the collectors in the filter. A less refractory binder phase can be used to provide high surface area, however the bonding particle has a much lower free surface area after firing because the diffusion of atoms which allows bonding also causes a reduction in the surface area of the particles. In the present hybrid filter, the binders (both clay and SiC) are not sintering or reducing surface area as the binder in the above noted Mihara et al filter. Sintering reduces interparticle porosity. Addition of refractory nanoparticles that are not bonding agents greatly increases the surface area. Multiple impregnation steps can be used to obtain a desired surface area. A bonding agent (i.e. an agent which aids adhesion of the nanoparticles to the rest of the composite filter media) is used in conjunction with these, but the quantity of the bonding agent should be kept low relative to the refractory nanoparticles. Alternatively, a lower firing temperature could be used to fix high surface area nanoparticles. As many applications will use catalysts with maximum use temperatures <about 800° C., a lower firing temperature could be used and less refractory nanoparticles could be used to increase surface area. For further disclosure, reference is made to co-authored SAE Technical Paper 2002-01-0323 "Design, Development and Performance of a Composite Diesel Particulate Filter", Miller et al, SAE 2002 World Congress, Detroit, Mich., Mar. 4–7, 2002, incorporated herein by reference and included herewith as attached appendix A.

Of note is the increased surface area of the hybrid structure that results while maintaining high porosity. This translates into greater removal efficiency with reduced pressure drop. The lower filter bulk density for the hybrid structure provides the resultant DPF with lower thermal mass, thus requiring less heat to raise its temperature for regeneration. The other filters of Table 1 exhibit smaller median pore size and permeability than the hybrid media, and lower particle removal efficiency. This indicates that much of the pore structure of the other filters is not accessible to fluid flow. The high surface area of the hybrid structure provides benefits not only in terms of particle removal (particularly at nanoparticle sizes), but also in terms of catalyst application. High surface area catalyst wash coats are often applied to DPFs to facilitate soot regeneration. Typically, these wash coats have surface areas about 10 to 100 times greater than the DPF. When applied to the hybrid structure, less coating is needed. As seen in Table 1, the hybrid DPF media has lower filter bulk density, greater pore volume, greater porosity, less media density, greater median pore size, greater open pore size, greater permeability, lower inertial resistance coefficient, greater BET surface, and greater media surface. Of particular note in Table 1 is the dramatic increase in surface area per gram substrate of the hybrid media (2–4) over the cordierite granular media (0.18) and the silicon carbide granular media (0.28). The surface area increase of the hybrid media over the cordierite granular media ranged from a factor of about 11 to a factor of about 37. The surface area increase of the hybrid media over the silicon carbide granular media ranged from a factor of about 7 to a factor of about 22. This provides greater surface area for collection of contaminant or deposition of catalyst or sorbate material. This also enhances particle capture and efficiency. Further of note in Table 1 is the significant increase in pore volume of the hybrid media (2.96) over the cordierite granular media (0.53) and the silicon carbide granular media (0.29) and the Matsushita fibrous media (~2). The porous volume per gram substrate for the hybrid media increased by a factor of about 5 over the cordierite granular media, and increased by a factor of about 10 over the silicon carbide granular media, and by a factor of 50% over the Matsushita fibrous media. Further of note in Table 1 is the greater media pore size of the hybrid media (40.4) over the cordierite granular media (14.2) and the silicon carbide granular media (9.8) and the Matsushita fibrous media (28.1). The media pore size for the hybrid media increased by a factor of nearly 3 over the cordierite granular media, and by a factor of 4 over the silicon carbide granular media, and by a factor of nearly 1.5 over the Matsushita fibrous media. These provide greater porosity and more volume for contaminant, catalyst, sorbate, etc. These also provide greater permeability and less restriction to flow through the substrate.

The following is a description of the sealant plug material at the alternately opposite ends of the axial flow channels, for wall-flow filters.

Description of Plug Material

A ceramic plugging material is used to seal the alternate ends of the channels in the filter. The following procedure was used in the preparation of a material for this purpose. 17 grams of LUDOX® AM-30 colloidal silica from Dupont was mixed with 20 grams of tap water and thickened with 0.3 grams of BERMOCOLL™ E351FQ from Akzo Nobel. 5 grams of HYCAR® 26-315 acrylic latex from Noveon was added as an intermediate organic binder. 29 grams of Alcoa unground A2 calcined alumina was added along with 29 grams of Exolon ESK F500 silicon carbide and 37 grams of 48M tabular alumina from C-E Minerals with moderate low shear mixing. The viscosity of this mixture was measured using a Brookfield LVT viscometer with a number 4 spindle at 30 rpm and found to be roughly 1000 cps. Additional E351FQ of about 0.1 to 0.2 grams was added to the mixture to bring the viscosity to roughly 3000 centipoise. The material when dried to 150 C is water insoluble and has a moisture loss of roughly 25%. Upon subsequent calcining to 1000° C. or higher there is an additional 2–3% weight loss and the material bonds to form a high temperature refractory plug.

Other variations have been examined to reduce density and improve the rheological properties of the material. In an improved example, the larger particle size tabular alumina is removed and a milled refractory fiber is used. In yet another improvement the rheological properties are improved by the formation of a pseudoplastic gel structure. The viscosity behavior of the gelled mixture is such that the shear rate behavior yields a 5–10 fold or greater increase in viscosity with a ten fold reduction in shear rate. This is beneficial for the application of plug material, since the mixture thins during application and flows into the pleat voids, then thickens so that the plug material will not run out of the channel. An example of this formulation follows. 40 grams of 1042 silica sol from ONDEO-Nalco and 24 grams of HYCAR® 26-315 from Noveon are added to 160 grams tap water. To this mixture is added 50 grams of Enfil SM90-SAB-T40 milled fiber from Thermal Ceramics Inc., 160 grams unground A2 alumina from Alcoa, 64 grams of F500 silicon carbide from Exolon Esk and 12 grams of Natka Kaolin clay from W. R. Grace. Finally 19 grams of AL20 colloidal alumina from Nyacol Technologies was added as the gel forming counterpart to the colloidal silica. This mixture is preferably mixed with a small Cowles blade at a medium shear rate. About 2 minutes mixing was required for the viscosity to build to the desired level of 3000 centipoise as measured with the Brookfield LVT viscometer and number 4 spindle at 30 rpm. When measured at 3 rpm, the viscosity is roughly 18,000 centipoise.

Other possible modifications include alternate refractory ceramic fibers of alumina, mullite, alumino-silicate or bio-soluble fiber and calcined powders of titania or zirconia in various granular sizes that tailor the density and thermal expansion of the final plug material.

The following is a description of the adhesive for bonding the pleated sheet at its pleat or bend lines to the flat sheet.

Description of Adhesive

An inorganic binder material is used to bond between pleated and flat layers of media in the filter. This material is prepared by the addition of spray-dried alumina to a colloidal alumina with added particulates to form a thickened and sticky inorganic paste. In the primary example 55 grams of AL20SD spray-dried alumina from Nyacol Technologies is added to 250 grams AL20 colloidal alumina from Nyacol with high shear mixing to obtain a thoroughly dispersed material. 6 grams of F500 silicon carbide from Exolon ESK was also added for visual indication of application and to provide some small particulate in the interface. This mixture will thicken slightly over time but is initially 600–1200 centipoise as measured with the Brookfield LVT viscometer and number 4 spindle at 30 rpm.

Slightly higher or levels of AL20SD may be used to increase the viscosity and AL20 liquid may be added to lower viscosity. This mixture must be dried completely at a temperature of 150° C. before additional water based treatments are applied and will yield a weight loss of about 68%.

In addition to the nanofiltration aspects noted above, a further mechanism is provided for controlling nanoparticles emitted in diesel applications. Volatile gases, including hydrocarbons, may condense downstream of a DPF (diesel particulate filter) or DOC (diesel oxidation catalyst) giving rise to nanoparticles, as noted above. $SO_x$ and $NO_x$ are nanoparticle precursors. In order to control these sources of nanoparticles the parent gases are removed. $SO_x$ is formed from sulfur compounds originally present in the fuel or lube oil. Upon combustion and/or oxidization by the DOC, $SO_x$ is formed, which continues to react to form sulfate nanoparticles. $NO_x$ is formed from $N_x$ gas during the combustion process or by the DOC. $NO_x$ further reacts to form nitrate nanoparticles. In order to control nanoparticle formation downstream of the DPF, one or more strategies are employed, including: the use of low sulfur fuels and lube oils to avoid the production of sulfate nanoparticles; the use of EGR (exhaust gas recirculation), SCR (selective catalytic reduction), and $NO_x$ adsorbers or other $NO_x$ control strategies to prevent the production of nitrate nanoparticles; the use of an oxidation catalyst, e.g. Pt (platinum), Pd (palladium), or other appropriate precious metal, to reduce the concentration of volatile hydrocarbons that condense to form nanoparticles. The nanoparticle filter used in conjunction with these strategies reduces or prevents the emission of nanoparticles by locating the nanoparticle filter at a point in the system where the gases have cooled enough that sulfates and/or, nitrates form and can be removed by filtration and/or by coating the nanoparticle filter with an oxidization catalyst. Nanoparticles are removed by filtration and, at the same time, volatile hydrocarbons are oxidized to prevent the formation of hydrocarbon nanoparticles. This approach has the added benefit of lowering the soot regeneration temperature of the nanoparticle filter. In further embodiments, a DOC or a conventional prior art catalyzed DPF is placed either upstream or downstream of the nanoparticle filter to oxidize volatile nanoparticles and nanoparticle pre-cursors. Ideally, the DOC or catalyzed DPF would be upstream of the nanoparticle filter in order to decrease its contaminant loading and increase service life.

Catalyst may be applied to the nanofilter in several different ways, including: as a wash coat; incorporated into the hybrid filter as a component of the binder used to rigidify the structure and increase its surface area; or as a product of the combustion of a fuel-born diesel catalyst dissolved in the fuel and burned by the engine. A wash coat may tend to accumulate on the surface of the filter, rather than throughout the depth of the structure and at the channel ends where it is most needed. The fuel-born catalyst method does not suffer this drawback, but is less practical in a production environment because it requires running the engine and ideally careful monitoring, to ensure that catalyst is applied correctly.

In implementing the nanoparticle filter as part of an aftertreatment system, with any increase in particle removal efficiency, there is a risk of shortening the service life of the filter as the amount of contaminant captured per unit time is increased. In diesel emission control, this is undesirable, as either the time to filter- plugging or the time between filter regeneration cycles is shortened, with corresponding penalties in the form of service life, service costs and/or fuel economy. This can be minimized or avoided by using two DPF elements in series, with a primary DPF element not optimized for nanoparticle control (to capture and retain the larger diesel particulates), and a secondary DPF optimized for nanoparticle control. The primary and secondary DPFs may be present as two separate DPFs arranged in series and connected by appropriate plumbing or tubing, or two separate DPF elements mounted within a common housing and arranged in series, or a single DPF element with distinct sections for the control of coarse particles and for the control of nanoparticles. These embodiments are further discussed hereinafter. Either or both DPFs may be coated with an oxidization catalyst to lower regeneration temperature and to oxidize volatile hydrocarbons that may form nanoparticles upon cooling.

Use of the hybrid filter media enables construction of a filter (10, FIG. 1; 210, 219, FIGS. 8–10; 310, FIGS. 19, 20; 400, FIG. 23; 502, FIG. 29) for filtering nanoparticles in a hot gas flowing along an axial flow direction (32, FIG. 1; 402, FIGS. 23, 27, 28; 504, FIGS. 29–31, 33–35, 37), namely particles <about 1 micron in a gas greater than about 200° C. The filter includes a first sheet (12, FIGS. 1, 3, 5; 214, FIGS. 8, 9; 328, FIG. 19; 408, FIGS. 24, 26; 514, FIGS. 29, 30, 32) and a second sheet (14, FIGS. 1, 3, 5, 7; 216, FIG. 8; 324, FIGS. 19, 20; 410, FIG. 24; 516, FIGS. 29, 30, 32, 36). The second sheet has a plurality of pleats (16, FIGS. 1, 3, 5, 7; 524, FIG. 30) defined by wall segments (18, 20, FIGS. 1, 3; 320, 322, FIG. 19; 422, FIGS. 23–26; 526, 528, FIGS. 30, 31, 33–37) extending in zig-zag manner between pleat tips (22, 24, 26, FIGS. 1, 3; 530, 532, 534, 536, FIG. 30) at axially extending bend lines (424, FIGS. 23–25, 26; 538, 540, 542, 544, FIG. 30). The pleat tips on one side of the second sheet are in contiguous relation with and preferably adhesively bonded to the first sheet to define axial flow channels (28, FIGS. 1, 3; 226, FIGS. 9, 10; 318, FIG. 20; 430, FIGS. 23, 24, 26; 508, FIGS. 29, 32, 34, 35, 37). At least one and preferably both of the sheets are composed of the above noted hybrid filter media material composed of the combination, in the same sheet, of: a) fibrous filter media having a plurality of fibers 730, FIG. 56; and b) granular filter media having a plurality of granules such as particles 732 extending from the surfaces of the fibers. The fibers include ceramic fibers, and the granules are bonded to the fibers. Preferably, the granular filter media is composed of granules of ceramic nanoparticles bonded to the fibers. In the preferred embodiment, the granular filter media is formed as above, and is composed of agglomerates of ceramic particles bonded to and disposed so as to thereby bond together said fibers at spaced locations along and at intersections of said fibers, and further composed of an inorganic binder material having a ceramic component comprising at least one of a ceramic precursor material and a ceramic material, and in a further embodiment of a nano-clay material, and in yet further embodiments of agglomerates of ceramic particles bonded to and disposed so as to thereby bond together the fibers, the agglomerates of ceramic particles comprising a chemically stabilized β-cristobalite formed from pyrolyzed particles of montmorillonite clay. As noted, in the preferred embodiment the granules comprise non-sintered refractory particles bonded to the fibers. Further in the preferred embodiment, the granules comprise refractory nanoparticles bonded to the fibers with a strengthening bonding agent, and wherein the refractory nanoparticles are not bonding agents. Further in the preferred embodiment, the fibers include ceramic fibers, and the granules are non-sintered ceramic particles bonded to the fibers. Further in the preferred embodiment, the granular filter media is composed of agglomerates of particles bonded to and disposed so as to thereby bond together the fibers at spaced locations along and at intersections of the fibers and providing depth media filtering of nanoparticles. The depth media has BET surface >about 1.0 $m^2/gm$. The granules are in a binder comprising refractory nanoparticles having a surface area preferably >about 2 $m^2/gm$, and further preferably >about 30 $m^2/gm$. Further in the preferred embodiment, the fibrous filter media comprises refractory ceramic fibers, and the granular filter media comprises agglomerates of ceramic particles bonded to and disposed so as to thereby bond together the refractory ceramic fibers at spaced locations along and at intersections of the refractory ceramic fibers and diffusionally capturing nanoparticles at the noted locations and below the surface of the filter media sheet.

Further in the preferred embodiment, the nanoparticle filter has a permeability >about $3 \times 10^{-12}$ $m_2$ and an inertial resistance coefficient <about $1 \times 10^6$ $m^{-1}$, particularly when the hot gas is diesel exhaust flowing along the noted axial flow direction. The filter is impregnated with particles by a sol-gel process and the particles bonded to the fibers to form a rigidified filter material by heating. Alternatively, the filter is impregnated with silicon carbide by a CVI process and cured by heating to form a rigidified filter material. Further preferably, at least one of the noted sheets is coated with an oxidization catalyst to reduce concentration of gaseous contaminants that condense into nanoparticles at ambient temperature. The filter captures particles in the noted MPR (Most Penetrating Region) 712, 714, FIG. 39. The filter is characterized by a substantially constant efficiency profile 724, FIG. 48, 736, FIG. 53, in a plot of particle number efficiency vs. size of the particles, including diffusional capture of particles on the order of $10^1$ nm, FIGS. 39, 48, 53, inertial impaction and interception capture of particles on the order of $10^3$ nm, and diffusion and interception capture of particles on the order to $10^2$ nm, all at substantially the same efficiency, including in the MPR 724, 738 of the plot, FIGS. 48, 53. As above noted, the hot gas has a tri-modal particulate emission distribution, FIG. 38, namely a coarse mode with particle size on the order of $10^3$ to $10^4$ nm, an accumulation mode with particle size on the order of $10^1$ to $10^3$ nm, and a nuclei mode with particle size on the order of $10^1$ nM. The accumulation mode has the greatest mass of particles (dashed line 708 in FIG. 38), and the nuclei mode has the greatest number of particles (solid line 706 in FIG. 38). The efficiency of the present filter is substantially uniform, FIGS. 48, 53, in all of the noted coarse, accumulation and nuclei modes, including for particle size on the order of $10^2$ nm in the MPR. As above noted, the filter is regenerable to burn off collected contaminant, and in the preferred embodiment is further characterized by a substantially constant efficiency during regeneration, FIG. 49. Further in the preferred embodiment, the noted filter media of the filter has a porosity $\geq$about 85%. Further in the preferred embodiment, the noted filter media of the filter is further characterized by the following, in combination: pore volume $\geq$about 2.5 cm$^3$/gm; porosity $\geq$about 85%; median pore size >about 30 microns; open pore size >about 10 microns; BET surface >about 1.0 m$^2$/gm; and media surface >about 0.4 m$^2$/cm$^3$.

Referring to FIG. 59, a filter system 750 is provided for filtering nanoparticles in diesel exhaust flowing along an axial flow direction 752 from upstream at 754 to downstream at 756, the nanoparticles having a size <1 micron. The system includes a diesel exhaust treatment element 758, and a nanoparticle filter 760 in series with diesel exhaust treatment element 758 and filtering nanoparticles including particles in the MPR. In one embodiment, the diesel exhaust treatment element is a DPF (diesel particulate filter), preferably a wall-flow filter (such as a cordierite monolithic filter or a SiC CVI fibrous filter). Nanoparticle filter 760 is downstream of the DPF. In another embodiment, diesel exhaust treatment element is at least one of: a DOC, diesel oxidization catalyst; an NO$_x$, nitrous oxide, adsorber; and an SCR, selective catalytic reduction, catalyst.

In a further embodiment, filter system 750 filters nanoparticles and coarse particles in diesel exhaust flowing along axial flow direction 752, the coarse particles being larger than the nanoparticles. Element 758 is a coarse particle filter 762 (such as a cordierite monolithic filter or a SiC CVI fibrous filter) initially filtering the coarse particles in the diesel exhaust. Nanoparticle filter 760 is in series with and downstream of coarse particle filter 762 and receives diesel exhaust from coarse particle filter 762 after the noted initial filtering of coarse particles, such that the coarse particles do not clog nanoparticle filter 760, whereby nanoparticle filter 760 can be dominantly tailored to filtering nanoparticles. In one embodiment, nanoparticle filter 760 is tailored to filtering nanoparticles in the MPR, and coarse particle filter 758 is tailored to filtering particles outside of the MPR, e.g. above the MPR. In a further embodiment, an oxidization catalyst is provided in at least one of filters 762 and 760 to reduce concentration of gaseous contaminants that condense into nanoparticles at ambient temperature, and oxidizing volatile compounds that condense into nanoparticles, to prevent formation of nanoparticles therefrom, and aiding in regeneration of the filter. In the preferred embodiment, the catalyst is selected to oxidize volatile compounds selected from the group consisting of sulfates and nitrates. In one embodiment, the coarse particle filter is a wall-flow filter. In another embodiment, as noted above, the coarse particle filter is a granular structure monolithic DPF, diesel particle filter. In another embodiment, the coarse particle filter is a fibrous ceramic filter.

Nanoparticle filter 760 is constructed as noted above, including the noted first and second sheets, the second sheet having a plurality of the noted pleats defined by the noted wall segments extending in zig-zag manner between the noted pleat tips at the noted axially extending bend lines, the pleat tips on one side of the second sheet being in contiguous relation with and preferably adhesively bonded to the first sheet to define the noted axial flow channels, at least one of the sheets and preferably both comprising the noted hybrid filter media material composed of the combination, in the same sheet, of: a) fibrous filter media having a plurality of fibers 730; and b) granular filter media having a plurality of granules 732 extending from the surfaces of the fibers. Nanoparticle filter 760 captures particles in the MPR 712, 714, 724, 738, and has a permeability >about $3 \times 10^{-2}$ m$^2$ and an inertial resistance coefficient <about $1 \times 10^6$ m$^{-1}$.

Coarse particle filter 762 is constructed as described above, including the noted first and second sheets, the second sheet having the noted plurality of pleats defined by the noted wall segments extending in zig-zag manner between the noted pleat tips at the noted axially extending bend lines, the pleat tips on one side of the second sheet being in contiguous relation with the first sheet to define the noted axial flow channels, the wall segments extending axially between upstream and downstream ends 764 and 766, the wall segments being alternately sealed to each other by a first upstream set of plugs 768 to define a first set of flow channels 770 closed by the first set of plugs 768, and a second set of flow channels 772 interdigitated with the first set of flow channels and having open upstream ends 774, the wall segments being alternately sealed to each other by a second downstream set of plugs 776 closing the second set of flow channels 772, the first set of flow channels 770 having open downstream ends 778. Nanoparticle filter 760 is constructed as described above, including the noted first and second sheets, the second sheet having the noted plurality of pleats defined by the noted wall segments extending in zig-zag manner between the noted pleat tips at the noted axially extending bend lines, the pleat tips on one side of the second sheet of the nanoparticle filter being in contiguous relation with and preferably adhesively bonded to the first sheet to define the noted axial flow channels, the wall segments of the nanoparticle filter extending axially between upstream and downstream ends 780 and 782, the wall segments of the nanoparticle filter being alternately sealed to each other by a first upstream set of plugs 784 to define a first set of flow channels 786 closed by the first set of plugs 784, and a second set of flow channels 788 interdigitated with the first set of flow channels 786 and having open upstream ends 790, the wall segments of the nanoparticle filter being alternately sealed to each other by a second downstream set of plugs 792 closing the second set of flow channels 788, the first set of flow channels 786 having open downstream ends 794.

In the embodiment of FIG. 59, a first housing 796 has an upstream inlet 798 and a downstream outlet 800, and houses coarse particle filter 762 therebetween. A second housing 802 has an upstream inlet 804 and a downstream outlet 806, and houses nanoparticle filter 760 therebetween. Connector tube 808 connects outlet 800 of housing 796 to inlet 804 of housing 802.

FIG. 60 shows another embodiment and uses like reference numerals from above where appropriate to facilitate understanding. In FIG. 60, a housing 810 has an upstream inlet 812 and a downstream outlet 814, and houses both coarse particle filter 762 and nanoparticle filter 760 therebetween in the same housing 810. Coarse particle filter 762 and nanoparticle filter 760 are separated by an axial gap 816 axially spacing the second set of plugs 776 of coarse particle filter 762 from the first set of plugs 784 of nanoparticle filter 760.

FIG. 61 shows a further embodiment and uses like reference numerals from above where appropriate to facilitate understanding. In FIG. 60, there is no axial gap 816 as in FIG. 60. Instead, in FIG. 61, the first set of plugs 784 of nanoparticle filter 760 is the second set of plugs 776 of coarse particle filter 762 such that nanoparticle filter 760 and coarse particle filter 762 share a common set of plugs and are axially contiguous thereat such that diesel exhaust flows from upstream inlet 812 then axially through the open upstream ends 774 of the second set of flow channels 772 of coarse particle filter 762 as shown at arrows 819, then through the wall segments 818 of coarse particle filter 762, then through the open downstream ends 778 of the first set of flow channels 770 of coarse particle filter 762, then directly axially, as shown at arrow 820, into open upstream ends 790 of the second set of flow channels 788 of nanoparticle filter 760 as shown at arrows 791, then through wall segments 792 of nanoparticle filter 760, then through the first set of flow channels 786 of nanoparticle filter 760, then through the open downstream ends 794, then to downstream outlet 814. Coarse particle filter 762 and nanoparticle filter 760 share the same noted first sheets and share the same noted second sheets. The first set of flow channels 770 of coarse particle filter 762 are axially aligned with and in open axial communication with the second set of flow channels 788 of nanoparticle filter 760. The second set of flow channels 772 of coarse particle filter 762 are axially aligned with the first set of flow channels 786 of nanoparticle filter 760 but blocked from axial communication therewith by the noted common set of plugs 776, 784. In a further embodiment, an oxidization catalyst coating is provided on at least one of the noted sheets of one or both of coarse particle filter 762 and nanoparticle filter 760, to reduce concentration of gaseous contaminants that condense into nanoparticles at ambient temperature and oxidizing volatile hydrocarbons to prevent formation of hydrocarbon nanoparticles.

The present invention provides a method for filtering nanoparticles in a hot gas, namely particles <about 1 micron in a gas about 200° C., including providing a fibrous support network composed of a plurality of fibers 730, providing a plurality of granules 732 extending from the surfaces of the fibers, wherein both the fibers and granules withstand gas temperatures >about 200° C. and further preferably >about 450° C., as above noted. The granules are bonded to the fibers preferably without sintering. The granules are provided preferably as ceramic particles bonded to the fibers.

The invention further provides a method for treating diesel exhaust, including filtering nanoparticles <about 1 micron in the diesel exhaust and oxidizing volatile compounds selected from the group consisting of sulfates and nitrates to prevent formation of nanoparticles therefrom. In a further embodiment, the method involves oxidizing $NO_x$. In a further embodiment, the method involves oxidizing $SO_x$. In one embodiment, the oxidizing step is performed prior to the filtering step, e.g. the oxidization catalyst is upstream of the nanoparticle filter. In another embodiment, the oxidizing step is performed after the filtering step, e.g. the oxidization catalyst is downstream of the nanoparticle filter. In another embodiment, the oxidizing step is performed concurrently with the filtering step, e.g., the oxidization catalyst is provided on the nanoparticle filter. Further in accordance with the preferred method, the nanoparticles are filtered with the noted nanoparticle filter, and the nanoparticle filter is coated with an oxidization catalyst to oxidize volatile compounds to reduce concentration of gaseous contaminants that condense into nanoparticles at ambient temperature. In one embodiment, an oxidation catalyst coating is applied to the nanoparticle filter as a wash coat. In another embodiment the oxidation catalyst coating is applied to the nanoparticle filter by vapor deposition. In another embodiment, the oxidation catalyst coating is applied to the nanoparticle filter as a product of combustion of fuel-born diesel catalyst. In a further embodiment, the nanoparticles are filtered with the nanoparticle filter, and the nanoparticle filter is provided with a catalyst oxidizing volatile compounds and oxidizing trapped soot and lowering the regeneration temperature of the nanoparticle filter.

The invention further provides a method for filtering diesel exhaust, including separating particle filtration into first and second serial stages, e.g. 758 and 760, optimizing the second stage for filtration of nanoparticles <about 1 micron, optimizing the first stage for filtration of particles larger than the nanoparticles, and passing the diesel exhaust initially through the first stage and then through the second stage.

It is recognized that various equivalents, alternatives and modifications are possible within the scope of the appended claims.

What is claimed is:

1. A filter comprising a hybrid filter media for filtering nanoparticles in a gas flowing along an axial flow direction and having a gas temperature greater than about 200° C., said hybrid filter media comprising first and second sheets, said second sheet having a plurality of pleats defined by wall segments extending in a zig-zag manner between pleat tips at axially extending bend lines, the pleat tips on one side of said second sheet being in contact with said first sheet to define axial flow channels, at least one sheet of said sheets comprising, in the same sheet, a) fibrous filter media having a plurality of fibers; and b) granular filter media having a plurality of particles extending from surfaces of said fibers, wherein the gas flows through said at least one sheet and said at least one sheet provides depth media filtering of nanoparticles.

2. The filter according to claim 1 wherein said particles comprise refractory particles bonded to said fibers.

3. The filter according to claim 1, wherein said particles comprise refractory nanoparticles bonded to said fibers with a strengthening bonding agent, and wherein said refractory nanoparticles are not bonding agents.

4. The filter according to claim 1 wherein said fibers include ceramic fibers, and said particles are ceramic particles bonded to said fibers.

5. The filter according to claim 1 wherein said granular filter media is composed of nanoparticles bonded to said fibers.

6. The filter according to claim 1 wherein said granular filter media is composed of agglomerates of particles bonded to and disposed so as to thereby bond together said fibers at spaced locations along and at intersections of said fibers.

7. The filter according to claim 6 wherein said hybrid filter media has a depth BET surface area greater than about 1 $m^2/gm$.

8. The filter according to claim 1 wherein said particles are in a binder comprising refractory nanoparticles having a surface area greater than about 2 $m^2/gm$.

9. The filter according to claim 8 wherein said surface area is greater than about 30 m²/gm.

10. The filter according to claim 1 wherein said granular filter media is composed of an inorganic binder material having a ceramic component comprising at least one of a ceramic precursor material and a ceramic material.

11. The filter according to claim 1 wherein said granular filter media is composed of agglomerates of ceramic particles bonded to and disposed so as to thereby bond together said fibers, said agglomerates of ceramic particles comprising β-cristobalite and silicon carbide.

12. The filter according to claim 1 wherein said one sheet has a face surface, said fibrous filter media comprises refractory ceramic fibers, and said granular filter media comprises agglomerates of ceramic particles bonded to and disposed so as to thereby bond together said refractory ceramic fibers at spaced locations along and at intersections of said refractory ceramic fibers.

13. The filter according to claim 1 wherein said fibrous filter media is impregnated with said particles by a sol-gel process, and said particles are bonded to said fibers so as to form said hybrid filter media by heating the impregnated fibrous filter media.

14. The filter according to claim 1 wherein said fibrous filter media is impregnated with said particles by a CVI (Chemical Vapor Impregnation) process, and said particles are bonded to said fibers so as to form said hybrid filter media by heating the impregnated fibrous filter media.

15. A filter comprising a hybrid filter media for filtering nanoparticles in a gas flowing along an axial flow direction and having a gas temperature greater than about 200° C., said hybrid filter media comprising first and second sheets, said second sheet having a plurality of pleats defined by wall segments extending in a zig-zag manner between pleat tips at axially extending bend lines, the pleat tips on one side of said second sheet being in contact with said first sheet to define axial flow channels, the hybrid filter media having a permeability greater than about $3 \times 10^{-12}$ m² and an inertial resistance coefficient less than about $1 \times 10^6$ m⁻¹.

16. The filter according to claim 15 wherein said gas is diesel exhaust flowing along said axial flow direction.

17. The filter according to claim 16 wherein at least one of said sheets is coated with an oxidation catalyst.

18. The filter according to claim 15 wherein said hybrid filter media captures particles in the MPR (Most Penetrating Region).

19. The filter according to claim 18 wherein said hybrid filter media has a substantially constant efficiency profile in a plot of particle number efficiency versus size of said particles, including diffusional capture of particles on the order of $10^1$ nm, inertial impaction and interception capture of particles on the order of $10^3$ nm, and diffusion and interception capture of particles on the order $10^2$ nm at substantially the same efficiency in said MPR of said plot.

20. The filter according to claim 19 wherein said gas has a tri-modal particulate emission distribution comprising (i) a coarse mode with particle size on the order of $10^3$ to $10^4$ nm, (ii) an accumulation mode with particle size on the order of $10^1$ to $10^3$ nm, and (iii) a nuclei mode with particle size on the order of $10^1$ nm, said accumulation mode having the greatest mass of particles, said nuclei mode having the greatest number of particles, and wherein said efficiency of said hybrid filter media is substantially uniform in all of said modes including for particle size on the order of $10^2$ mm in said MPR.

21. The filter according to claim 15 wherein said hybrid filter media is regenerable to burn off collected contaminant, and has a substantially constant efficiency during regeneration.

22. The filter according to claim 15 wherein said filter is a wall-flow filter.

23. The filter according to claim 15 wherein said hybrid filter media has a porosity greater than about 85%.

24. The filter according to claim 15 wherein said hybrid filter media has:

a pore volume greater than or equal to about 2.5 cm³/gm;

a porosity greater than or equal to about 85%;

a median pore size greater than about 30 microns;

an open pore size greater than about 10 microns;

a BET surface greater than about 1.0 m₂/gm; and a media surface greater than about 0.4 m²/cm³.

25. The filter according to claim 1, wherein the hybrid filter media has a permeability greater than about $3 \times 10^{-12}$ m² and an inertial resistance coefficient less than about $1 \times 10^6$ m⁻¹.

* * * * *

UNITED STATES PATENT AND TRADEMARK OFFICE
CERTIFICATE OF CORRECTION

| | |
|---|---|
| PATENT NO. | : 7,052,532 B1 |
| APPLICATION NO. | : 10/325001 |
| DATED | : May 30, 2006 |
| INVENTOR(S) | : Z. Gerald Liu et al. |

It is certified that error appears in the above-identified patent and that said Letters Patent is hereby corrected as shown below:

<u>Title Page</u>

Item [73] Assignee, after "3M Innovative Properties Company, St. Paul, Minnesota (US)" insert -- and Fleetguard, Inc., Nashville, Tennessee (US) --, therefor.

Signed and Sealed this

Eighth Day of July, 2008

JON W. DUDAS
*Director of the United States Patent and Trademark Office*